(12) United States Patent
Asada et al.

(10) Patent No.: US 7,950,854 B2
(45) Date of Patent: May 31, 2011

(54) HYDRODYNAMIC BEARING TYPE ROTARY DEVICE AND RECORDING AND REPRODUCING APPARATUS EQUIPPED WITH SAME

(75) Inventors: Takafumi Asada, Osaka (JP); Hiroaki Saito, Ehime (JP); Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 896 days.

(21) Appl. No.: 11/905,354

(22) Filed: Sep. 28, 2007

(65) Prior Publication Data

US 2008/0080797 A1    Apr. 3, 2008

(30) Foreign Application Priority Data

Sep. 29, 2006 (JP) ................................ 2006-267654

(51) Int. Cl.
*F16C 32/06* (2006.01)
(52) U.S. Cl. ........................................ 384/107; 384/100
(58) Field of Classification Search .................. 384/100, 384/107, 112, 115, 119
See application file for complete search history.

(56) References Cited

U.S. PATENT DOCUMENTS

| | | | | |
|---|---|---|---|---|
| 5,822,846 A * | 10/1998 | Moritan et al. | ............... | 384/120 |
| 6,250,807 B1 * | 6/2001 | Mori et al. | ..................... | 384/100 |
| 6,456,458 B1 * | 9/2002 | Ichiyama | .................... | 360/99.08 |
| 7,021,829 B2 * | 4/2006 | Tamaoka | ........................ | 384/112 |
| 7,357,577 B2 * | 4/2008 | Bausch | .......................... | 384/119 |
| 7,374,340 B2 * | 5/2008 | Sekii et al. | ..................... | 384/107 |
| 7,411,762 B2 * | 8/2008 | Tamaoka | ....................... | 384/115 |
| 7,435,002 B2 * | 10/2008 | Nakagawa et al. | ........... | 384/107 |
| 7,492,548 B2 * | 2/2009 | Asada et al. | ............... | 360/99.08 |
| 7,521,830 B2 * | 4/2009 | Chen et al. | ..................... | 384/119 |
| 7,556,433 B2 * | 7/2009 | Kurimura et al. | ............. | 384/107 |
| 7,808,139 B2 * | 10/2010 | Shindo et al. | .................. | 384/112 |
| 2004/0113501 A1 * | 6/2004 | Tokunaga et al. | ............. | 384/107 |
| 2006/0051001 A1 * | 3/2006 | Nishimura et al. | ........... | 384/100 |

FOREIGN PATENT DOCUMENTS

| | | | |
|---|---|---|---|
| JP | 8-331796 | | 12/1996 |
| JP | 2560501 | | 10/1997 |
| JP | 2004019705 A | * | 1/2004 |
| JP | 2004-116623 | | 4/2004 |
| JP | 2005233419 A | * | 9/2005 |

* cited by examiner

*Primary Examiner* — Marcus Charles
(74) *Attorney, Agent, or Firm* — Wenderoth, Lind & Ponack, L.L.P.

(57) ABSTRACT

A hydrodynamic bearing type rotary device includes radial hydrodynamic grooves and thrust hydrodynamic grooves forming communicating channels, communicating holes designed to communicate the groove end of the radial hydrodynamic groove on the side opposite the thrust hydrodynamic grooves with the groove end of the thrust hydrodynamic groove on the side opposite the radial hydrodynamic grooves, and a circulation route composed by the communicating hole, the radial hydrodynamic groove, and the thrust hydrodynamic groove. Lubricating oil is circulated by means of a pump force of the hydrodynamic groove. The hydrodynamic bearing device prevents the formation of low-pressure parts from the bearing portion, preventing the accumulation of air bubbles, and thereby preventing the occurrence of oil film breakage at the radial hydrodynamic groove and the thrust hydrodynamic groove.

8 Claims, 46 Drawing Sheets

HYDRODYNAMIC BEARING TYPE ROTARY DEVICE AND RECORDING AND REPRODUCING APPARATUS EQUIPPED WITH SAME

BACKGROUND OF THE INVENTION

1. Field of the Invention

The present invention relates to a hydrodynamic bearing type rotary device which utilizes a hydrodynamic bearing. The present invention additionally relates to a recording and reproducing apparatus that is equipped with such a device.

2. Description of the Related Art

In recent years the amount of memory in recording apparatuses has increased, and their data transfer rates have also increased. Because of this, the bearings used by such recording apparatuses must increasingly provide high levels of precision when spinning, as well as reliability. To that end, hydrodynamic bearing type rotary devices well suited to high speed rotation are used in these recording apparatuses.

A hydrodynamic bearing type rotary device rotates without contact between the shaft and the sleeve by using oil or other lubricating fluids introduced into the space between the shaft and the sleeve, with a pumping force being created by hydrodynamic grooves during rotation. The hydrodynamic bearing type rotary device is suited to high-speed rotation, because there is no contact and therefore no mechanical friction.

Hereinafter is a description of an example of an existing hydrodynamic bearing type rotary device, using FIGS. 26 through 36. As shown in FIG. 26, conventional hydrodynamic bearing type rotary devices include a sleeve 21', a shaft 22', a flange 23', a thrust plate 24', a seal cap 25', oil 26', a hub 27', a base 28', a rotor magnet 29', and a stator 30'. The shaft 22' is integrated with the flange 23' and is rotatably inserted into a bearing hole 21A' in the sleeve 21'.

The flange 23' is accommodated in a step 21C' in the sleeve 21'. A radial hydrodynamic groove 21B' is formed in at least one of the external peripheral surface of the shaft 22' and the internal peripheral surface of the sleeve 21'. Thrust hydrodynamic grooves 23A' and 23B' are formed respectively on the surface of the flange 23' opposite the sleeve 21', and on the surface of the flange 23' opposite the thrust plate 24'. The thrust plate 24' is fixed to the sleeve 21'. Bearing portion clearances in the vicinity of at least the hydrodynamic grooves 21B', 23A', and 23B' are filled with the lubricating oil 26'. The pouch-shaped bearing portion clearances formed by the sleeve 21', the shaft 22', and the thrust plate 24' are also entirely filled with the lubricating oil 26' as necessary. The seal cap 25' has a fixed part 25A' attached to the top end surface of the sleeve 21', as well as a tapered part 25B' and a ventilation hole 25C'. A communicating hole 21G' is provided substantially parallel to the bearing hole 21A', and is provided so as to communicate an oil collector of the seal cap 25' (the groove end of the radial hydrodynamic groove 21B' on the side opposite the thrust hydrodynamic grooves) with the external periphery of the flange 23' (the groove end of the thrust hydrodynamic groove 23B' on the side opposite the radial hydrodynamic groove). The communicating hole 21G', the radial hydrodynamic groove 21B', and the thrust hydrodynamic groove 23B' constitute a circulating channel for the oil 26'. The numerical symbol 35' denotes an air bubble included in the bearing interior.

The sleeve 21' is fixed to the base 28'. The stator 30' is fixed to the base 28' so as to face the rotor magnet 29'. The rotor magnet 29' generates suction force in the axial direction through flux leakage, and pushes the hub 27' towards the thrust plate 24' with a force of about 10 to 100 grams.

The hub 27' is fixed to the shaft 22', and the rotor magnet 29', a recording disk 31', a spacer 32', a clamper 33', and a screw 34' are fixed to the hub.

The operation of the conventional hydrodynamic bearing type rotary device shown in FIG. 26 will now be described using FIGS. 26 through 28.

The groove patterns of the radial hydrodynamic groove 21B' and the thrust hydrodynamic groove 23B' are designed so that when the shaft 22' rotates, the pump force of the radial hydrodynamic groove 21B', having a herringbone pattern, and the pump force of the thrust hydrodynamic groove 23B', having a herringbone pattern or a spiral pattern, combine to convey the oil 26' in the clearance of the tapered part 25B' of the seal cap 25' through the bearing hole 21A' towards the external peripheral surface of the flange 23', in the direction of the black arrows as shown in the drawings. The oil 26' flows into the communicating hole 21G' via the thrust hydrodynamic groove 23B' and is circulated back into the tapered part 25B' in the seal cap 25'. The shaft 22' can thereby be rotated without coming into contact with the sleeve 21' or the thrust plate 24'. As a result, data can be recorded and reproduced the rotating recording disk 31' by a magnetic head or an optical head (not shown).

In FIGS. 27 and 28, the radial hydrodynamic groove 21B' has an asymmetrical herringbone pattern in which the top half shown in FIG. 28 (L' in FIG. 28) is longer than the bottom half (S' in FIG. 28). The thrust hydrodynamic groove 23B' has a spiral groove pattern as shown in FIG. 28, and the rotation of the shaft 22' draws out the oil 26' from the radial bearings in the direction of the arrow shown in FIG. 27, causing the oil 26' to flow and circulate towards the external peripheral surface of the flange 23'. Thus the thrust hydrodynamic groove 23B' creates a force that draws the oil in the radial hydrodynamic groove 21B', as shown in FIG. 28. The pressure distribution between the radial bearing portion and the thrust bearing portion as shown in FIG. 28 then forms low-pressure parts, indicated by Pt'(−) or Pr'(−). When such low-pressure parts are created, air bubbles 35' trapped in the oil 26' accumulate in low-pressure parts. Problems have arisen in regard to wear and burn of the bearing portion (the radial bearing portion and the thrust bearing portion), caused when the air bubbles 35' in low-pressure parts expand due to the difference in pressure, causing oil film breakage to occur at the radial hydrodynamic groove 21B' or the thrust hydrodynamic groove 23B'. Wear and burn of the bearing portion is a significant problem, as it leads to a complete failure of operation of the rotary apparatus or entire recording apparatus. The radial hydrodynamic groove 21B' in FIG. 27 is shown with an asymmetrical pattern, but the same problem occurs with a symmetrical pattern, where the top half and bottom half shown in FIG. 27 are of equal lengths (where L'=S' in FIG. 27).

FIGS. 29 and 30 show a second structure of a conventional hydrodynamic bearing type rotary device. The second conventional hydrodynamic bearing type rotary device includes a sleeve 121 configured integrally with a second sleeve 121D, a shaft 122, a cover plate 136, oil 26', a base 28', and a hub 27', as shown in FIG. 29. The shaft 122 is rotatably inserted into a bearing hole 121A in the sleeve 121. A radial hydrodynamic groove 121B is formed in at least one of the external peripheral surface of the shaft 122 and the internal peripheral surface of the sleeve 121. A thrust hydrodynamic groove 121H is formed on at least one of the bottom surface of the hub 27' and the top surface of the sleeve 121. The cover plate 136 is fixed to the sleeve 121, the second sleeve 121D, or a base 28'. Bearing portion clearances in the vicinity of at least the hydrodynamic grooves 121B and 121H are filled with oil 26'. The pouch-shaped bearing portion clearances formed by the sleeve 121, the shaft 122, and the cover plate 136 are also entirely filled with oil 26' as necessary. A communicating hole 121G is provided so as to communicate both ends of the bearing portions composed of the radial hydrodynamic groove 121B and the thrust hydrodynamic groove 121H. The numerical symbol 35' denotes an air bubble trapped inside the bearing portion.

The following is a description of the operation of the second conventional hydrodynamic bearing type rotary device shown in FIGS. 29 and 30.

When the shaft 122 rotates, the thrust hydrodynamic groove 121H creates pressure as shown with Pt' in FIG. 30, lifting the shaft 122. The radial hydrodynamic groove 121B creates pressure as shown with Pr', causing the shaft 122 to rotate without contact. The groove pattern of the radial hydrodynamic groove 121B approximates a herringbone pattern. The groove pattern of the thrust hydrodynamic groove 121H is a spiral pattern. The groove patterns of the radial hydrodynamic groove 121B and the thrust hydrodynamic groove 121H are designed so that when the shaft 122 rotates, the pump force of the radial hydrodynamic groove 121B and the pump force of the thrust hydrodynamic groove 121H combine to convey the oil 26' in the direction of the black arrows shown in FIGS. 29 and 30. The oil 26' is then repeatedly circulated while flowing into the communicating hole 121G sequentially through the thrust hydrodynamic groove 121H and the bearing hole 121A.

The radial hydrodynamic groove 121B has an asymmetrical herringbone pattern in which the top half (L' in FIG. 30) is longer than the bottom half (S' in FIG. 30) as shown in FIG. 30, and the thrust hydrodynamic groove 121H has a spiral pattern as shown in FIG. 30. Because of this, the rotations of the shaft 122 cause the thrust hydrodynamic groove 121H to draw the oil 26' from the radial hydrodynamic groove 121B in the direction of the white arrow as shown in FIG. 29. The pressure distribution between the radial bearing portion and the thrust bearing portion then forms low-pressure parts, indicated by Pt'(−) or Pr'(−) in FIG. 30. When such low-pressure parts are created, the air bubbles 35' trapped in the oil 26' accumulate in those low-pressure parts.

Problems have arisen in regard to wear and burn of the bearing portion, caused when the air bubbles 35' in low-pressure parts expand due to the difference in pressure, causing oil film breakage to occur at the radial hydrodynamic groove 121B or the thrust hydrodynamic groove 121H. Wear and burn of the bearing portion is a significant problem, as it leads to a complete failure of operation of the rotary apparatus or entire recording apparatus. The radial hydrodynamic groove 121B in FIG. 29 is shown with an asymmetrical pattern, but the same problem occurs with a symmetrical pattern, where the top half and bottom half shown in FIG. 30 are of equal lengths (where L'=S' in FIG. 30).

FIGS. 31 and 32 show a third structure of a conventional hydrodynamic bearing type rotary device. The third conventional hydrodynamic bearing type rotary device includes a sleeve 221 configured integrally with a second sleeve 221D, a shaft 222, a cover plate 236, oil 26', a base 28', and a hub 27', as shown in FIG. 31. The shaft 222 is integrated with the flange 223 and is rotatably inserted into a bearing hole 221A in the sleeve 221. Radial hydrodynamic grooves 221E and 221F are formed in at least one of the external peripheral surface of the shaft 222 and the internal peripheral surface of the sleeve 221. A main thrust hydrodynamic groove 221J is formed in at least one of the opposite surfaces of the hub 27' and the second sleeve 221D.

A sub-thrust hydrodynamic groove 221H is formed in at least one of the flange 223 and the bottom of the sleeve 221. The cover plate 236 is fixed to the sleeve 221, the second sleeve 221D, or the base 28'. Bearing portion clearances in the vicinity of at least the hydrodynamic grooves 221E, 221F, and 221H are filled with the oil 26'. The pouch-shaped bearing portion clearances formed by the sleeve 221, the shaft 222, and the cover plate 236 are also entirely filled with oil 26' as necessary. A communicating hole 221G is provided to communicate both ends of a bearing portion composed of the radial hydrodynamic grooves 221E and 221F, and the thrust hydrodynamic groove 221H. The numerical symbol 35' denotes an air bubble trapped inside the bearing portion.

The operation of the third conventional hydrodynamic bearing type rotary device shown in FIG. 31 will now be described using FIGS. 31 and 32. When the shaft 222 rotates, the main thrust hydrodynamic groove 221J creates pressure, lifting the shaft 222. The sub-thrust hydrodynamic groove 221H creates pressure as shown by Pt' in FIG. 32, conveying the oil 26'. The radial hydrodynamic grooves 221E and 221F create pressure as shown by Pr', causing the shaft 222 to rotate without contact. The groove patterns of the radial hydrodynamic groove 221E and 221F approximate herringbone patterns. The groove pattern of the sub-thrust hydrodynamic groove 221H approximates a spiral pattern. The groove patterns of the radial hydrodynamic grooves 221E, 221F and the sub-thrust hydrodynamic groove 221H are designed so that when the shaft 222 rotates, the pump force of the radial hydrodynamic grooves 221E and 221F and the pump force of the sub-thrust hydrodynamic groove 221H combine to convey the oil 26' in the direction of the black arrow shown in FIGS. 31 and 32. The oil 26' is then repeatedly circulated while flowing into the communicating hole 221G sequentially through the sub-thrust hydrodynamic groove 221H and the bearing hole 221A.

However, the sub-thrust hydrodynamic groove 221H has a spiral groove pattern as shown in FIG. 32, and at least one of the radial hydrodynamic groove 221E and 221F has an asymmetrical herringbone pattern in which the bottom half shown in FIG. 32 (L' in FIG. 32) is longer than the top half (S' in FIG. 32). Because of this, the rotations of the shaft 222 cause the radial hydrodynamic groove 221F to draw the oil 26' from the sub-thrust hydrodynamic groove 221H in the direction of the white arrow as shown in FIG. 31. The pressure distribution between the radial bearing portion and the sub-thrust bearing portion then forms low-pressure parts, indicated by Pt'(−) or Pr'(−) in FIG. 32. When such low-pressure parts are created, the air bubbles 35' trapped in the oil 26' accumulate in those low-pressure parts. Problems have arisen in regard to wear and burn of the bearing portion, caused when the air bubbles 35' in low-pressure parts expand due to the difference in pressure, causing oil film breakage to occur at the radial hydrodynamic groove 221F or the sub-thrust hydrodynamic groove 221H. Wear and burn of the bearing portion is a significant problem, as it leads to a complete failure of operation of the rotary apparatus or entire recording apparatus.

FIGS. 33 and 34 show a fourth structure of a conventional hydrodynamic bearing type rotary device. The fourth conventional hydrodynamic bearing type rotary device includes a shaft 322, a flange 323, a sleeve 321, oil 26', a top cover 336, a hub 327, and a base 28'. The disk 31' and the rotor magnet 29' are attached to the hub 327. A lid 338 is attached to the base 28'. The shaft 322 is integrated with the flange 323. The shaft 322 is inserted into the bearing hole 321A of the sleeve 321 in such a manner as to be rotatable in a relative manner. The flange 323 faces the bottom surface of the sleeve 321 and forms a bearing portion. A radial hydrodynamic groove 321B is formed in at least one of the external peripheral surface of the shaft 322 and the internal peripheral surface of the sleeve 321. A thrust hydrodynamic groove 323A is provided in at least one of the bottom surface of the sleeve 321 and the top surface of the flange 323. The top cover 336 forms a clearance with the sleeve 321 and is fixed to either the sleeve 321 or the hub 327. The shaft 322 is attached to the base 28'. The disk 31' and the rotor magnet 29' are attached to the hub 327. A stator (not shown) is fixed to the base 28' at a position that faces the external peripheral surface of the rotor magnet 29'. The rotor magnet 29' generates suction force in the axial direction, which is downward in the drawing, pushing the sleeve 321 toward the flange 323 with a force of about 10 to 50 grams. The bearing portion clearances formed by the sleeve 321, the shaft 322, the top cover 336, and a lower cover 337 are entirely filled with oil 26' as necessary. A communicating hole 321G is provided to communicate both ends of a bearing portion composed of the radial hydrodynamic groove 321B and the thrust hydrodynamic groove 323A. The numerical symbol 35' denotes an air bubble trapped inside the bearing portion.

The following is a description of the operation of the fourth conventional hydrodynamic bearing type rotary device shown in FIGS. 33 and 34. When the sleeve 321 rotates, the thrust hydrodynamic groove 323A creates pressure as shown by Pt' in FIG. 34, lifting the sleeve 321. The radial hydrodynamic groove 321B creates pressure as shown by Pr' in FIG. 34, causing the sleeve 321 to rotate without contact. The groove pattern of the radial hydrodynamic groove 321B approximates a herringbone pattern. The groove pattern of the thrust hydrodynamic groove 323A approximates a spiral pattern.

The groove patterns of the radial hydrodynamic groove 321B and the thrust hydrodynamic groove 323A are designed so that when the sleeve 321 rotates, the pump force of the radial hydrodynamic groove 321B and the pump force of the thrust hydrodynamic groove 323A combine to convey the oil 26' in the direction of the black arrows shown in FIG. 34. The oil 26' is then repeatedly circulated while flowing into the communicating hole 321G sequentially through the thrust hydrodynamic groove 323A and the bearing hole 321A.

However, the thrust hydrodynamic groove 323A has a spiral groove pattern as shown in FIG. 34, the radial hydrodynamic groove 321B has an asymmetrical herringbone pattern in which the bottom half shown in FIG. 34 (L' in FIG. 34) is longer than the top half (S' in FIG. 34). Because of this, the rotations of the sleeve 321 cause the radial hydrodynamic groove 321B to draw the oil 26' from the thrust hydrodynamic groove 323A in the direction of the arrow as shown in FIG. 33. The pressure distribution between the radial bearing portion and the thrust bearing portion then forms low-pressure parts, indicated by Pt'(−) or Pr'(−) in FIG. 34. When such low-pressure parts are created, the air bubbles 35' trapped in the oil 26' accumulate in those low-pressure parts. Problems have arisen in regard to wear and burn of the bearing portion, caused when the air bubbles 35' in low-pressure parts expand due to the difference in pressure, causing oil film breakage to occur at the radial hydrodynamic groove 321B or the thrust hydrodynamic groove 323A. Wear and burn of the bearing portion is a significant problem, as it leads to a complete failure of operation of the rotary apparatus or entire recording apparatus. The thrust hydrodynamic groove 323A in FIG. 33 is shown with a fishbone-shape pattern, but the same problem occurs with a spiral pattern.

FIGS. 35 and 36 show a fifth structure of a conventional hydrodynamic bearing type rotary device. The fifth conventional hydrodynamic bearing type rotary device includes a shaft 422, a flange 423, a sleeve 421, oil 26', a top cover 436, a hub 427, and a base 28'. The shaft 422 is integrated with the flange 423. The shaft 422 is inserted into a bearing hole 421A of the sleeve 421 in such a manner as to be rotatable in a relative manner. The flange 423 faces the bottom surface of the sleeve 421 and forms a bearing portion. Radial hydrodynamic grooves 421B and 423C are formed in at least one of the external peripheral surface of the shaft 422 and the internal peripheral surface of the sleeve 421. A thrust hydrodynamic groove 423A is provided in at least one of the bottom surface of the sleeve 421 and the top surface of the flange 423. The top cover 436 forms a clearance with the sleeve 421 and is fixed to either the sleeve 421 or the hub 427. The shaft 422 is attached to the base 28'. A disk (not shown) and a rotor magnet (not shown) are attached to the hub 427. A stator (not shown) is fixed to the base 28' at a position that faces the rotor magnet. The bearing portion clearances formed by the sleeve 421, the shaft 422, and the top cover 436 are entirely filled with oil 26' as necessary. A communicating hole 421G is provided so as to communicate both ends of the bearing portions composed of the radial hydrodynamic groove 421B and the thrust hydrodynamic groove 423A. The numerical symbol 35' denotes an air bubble trapped inside the bearing portion.

The following is a description of the operation of the fifth conventional hydrodynamic bearing type rotary device shown in FIGS. 35 and 36. When the sleeve 421 rotates, the thrust hydrodynamic groove 423A creates pressure as shown by Pt in FIG. 36, lifting the sleeve 421. The radial hydrodynamic grooves 421B and 421C create pressure as shown by Pr', causing the sleeve 421 to rotate without contact. The groove pattern of the radial hydrodynamic groove 421B approximates a herringbone pattern. The groove pattern of the thrust hydrodynamic groove 423A approximates a spiral pattern.

The groove patterns of the radial hydrodynamic groove 421B and the thrust hydrodynamic groove 423A are designed so that when the sleeve 421 rotates, the pump force of the radial hydrodynamic groove 421B and the pump force of the thrust hydrodynamic groove 423A combine to convey the oil 26' in the direction of the black arrows shown in FIG. 36. The oil 26' is then repeatedly circulated while flowing into the communicating hole 421G sequentially through the thrust hydrodynamic groove 423A and the bearing hole 421A.

However, the thrust hydrodynamic groove 423A has a spiral groove pattern as shown in FIG. 36, the radial hydrodynamic groove 421B has an asymmetrical herringbone pattern in which the bottom half shown in FIG. 36 (L' in FIG. 36) is longer than the top half (S' in FIG. 36). Because of this, the rotations of the sleeve 421 cause the radial hydrodynamic groove 421B to draw the oil 26' in the vicinity of the thrust hydrodynamic groove 423A or the radial hydrodynamic groove 421C in the direction of the white arrow as shown in FIG. 35. The pressure distribution between the radial bearing portion and the thrust bearing portion then forms low-pressure parts, indicated by Pt'(−) or Pr'(−) in FIG. 36. When such low-pressure parts are created, the air bubbles 35' trapped in the oil 26' accumulate in those low-pressure parts. Problems have arisen in regard to wear and burn of the bearing portion, caused when the air bubbles 35' in low-pressure parts expand due to the difference in pressure, causing oil film breakage to occur at the radial hydrodynamic groove 421B. Wear and burn of the bearing portion is a significant problem, as it leads to a complete failure of operation of the rotary apparatus or entire recording apparatus.

[Patent Document 1] Japanese Laid-open Patent Application No. 8-331796

[Patent Document 2] Japanese Utility Model Application No. 2560501

[Patent Document 3] Japanese Laid-open Patent Application No. 2004-116623

Problems to be Solved by the Invention

In conventional hydrodynamic bearing type rotary devices, when oil is circulated by the pump force (also referred to as the circulating force or conveying force) of the hydrodynamic grooves at the bearing portion formed by the radial hydrodynamic groove and the thrust hydrodynamic groove, oil is not circulated in such a manner that pressure is applied by a hydrodynamic groove positioned upstream in the bearing portion, but rather a pressure is generated in the direction that oil is suctioned by a hydrodynamic groove positioned downstream in the bearing portion. This causes low-pressure parts in the bearing portion, causing air bubbles trapped in the oil to accumulate. Problems then arise when the air bubbles expand due to the difference in pressure, causing oil film breakage to occur at the radial hydrodynamic groove or the thrust hydrodynamic groove, causing wear and burn of the bearing portion.

BRIEF SUMMARY OF THE INVENTION

The hydrodynamic bearing type rotary device according to the present invention comprises a shaft; a sleeve; a hub; a radial bearing portion; a thrust bearing portion; a communicating hole; and a lubricant. The shaft is relative-rotatably inserted with a clearance into the bearing hole in the sleeve. The hub is attached to a member which is the sleeve or the shaft. The radial bearing portion has a radial hydrodynamic groove formed in at least one of the external peripheral surface of the shaft and the internal peripheral surface of the sleeve. The thrust bearing portion has a thrust hydrodynamic groove formed in at least one of the surface of the sleeve opposite the hub and the surface of the hub opposite the sleeve, or with at least one of the surface of the sleeve opposite the shaft and the surface of the shaft opposite the sleeve. At least one communicating hole is provided. The communicating hole enables communication between a groove end of the radial hydrodynamic groove on the side opposite the thrust hydrodynamic groove and a groove end of the thrust hydrodynamic groove on the side opposite the radial hydrodynamic groove. The lubricant is filled into the radial bearing portion, the thrust bearing portion, and the communicating hole. The groove pattern of at least one of the radial hydrodynamic groove and the thrust hydrodynamic groove creates a conveying force for conveying the lubricant from the thrust bearing portion to the radial bearing portion, or from the radial bearing portion to the thrust bearing portion, and is also formed in such a manner that the magnitude of the conveying force created in the radial hydrodynamic groove and the magnitude of the conveying force created in the thrust hydrodynamic groove differ.

The groove pattern of at least one of the radial hydrodynamic groove and the thrust hydrodynamic groove is known as a push-type groove pattern, creating a conveying force for conveying the lubricant from the thrust bearing portion to the radial bearing portion, or from the radial bearing portion to the thrust bearing portion. Forming a configuration so that a difference in magnitude exists between the conveying force in the radial hydrodynamic groove and the thrust hydrodynamic groove causes the lubricant to circulate among the radial bearing portion, the thrust bearing portion, and the communicating hole.

The shaft as described herein has a flange portion, which is formed integrally with the shaft and is wider in diameter than the shaft.

The following four groove patterns can be considered for the groove pattern of the radial hydrodynamic groove and thrust hydrodynamic groove discussed above.

The first groove pattern is a radial hydrodynamic groove pattern, which is formed to create a conveying force for conveying lubricant from the radial hydrodynamic groove towards the thrust hydrodynamic groove when the shaft or the sleeve rotates.

When such a pattern is used, no conveying force is created at the thrust hydrodynamic groove that would convey lubricant from the thrust hydrodynamic groove towards the radial hydrodynamic groove. The magnitude of the conveying force created in the radial hydrodynamic groove accordingly differs from the magnitude of the conveying force created in the thrust hydrodynamic groove.

The second groove pattern is either a radial hydrodynamic groove pattern, formed to create a conveying force for conveying lubricant from the radial hydrodynamic groove towards the thrust hydrodynamic groove when the shaft or the sleeve rotates, or a thrust hydrodynamic groove pattern, formed to create a conveying force for conveying lubricant from the thrust hydrodynamic groove towards the radial hydrodynamic groove. In this case, the groove patterns are each formed so that the conveying force created by the radial hydrodynamic groove is greater than the conveying force created by the thrust hydrodynamic groove. The pressures created at the radial bearing portion and the thrust bearing portion is oriented in such a way as to push against each other in the flow channels.

The third groove pattern is a thrust hydrodynamic groove pattern, formed to create a conveying force for conveying lubricant from the thrust hydrodynamic groove towards the radial hydrodynamic groove when the shaft or the sleeve rotates. When such a pattern is used, no conveying force is created at the radial hydrodynamic groove that would convey lubricant from the radial hydrodynamic groove towards the thrust hydrodynamic groove, and so the magnitude of the conveying force created at the thrust hydrodynamic groove will differ from the magnitude of the conveying force created at the radial hydrodynamic groove.

The fourth groove pattern is either a radial hydrodynamic groove pattern, formed to create a conveying force for conveying lubricant from the radial hydrodynamic groove towards the thrust hydrodynamic groove when the shaft or the sleeve rotates, or a thrust hydrodynamic groove pattern, formed to create a conveying force for conveying lubricant from the thrust hydrodynamic groove towards the radial hydrodynamic groove. In this case, the groove patterns are each formed so that the conveying force created by the thrust hydrodynamic groove is greater than the conveying force created by the radial hydrodynamic groove. The pressures created at the radial bearing portion and the thrust bearing portion is oriented in such a way as to push against each other in the flow channels.

By forming the groove pattern of at least one of the radial hydrodynamic groove and the thrust hydrodynamic groove in one of the patterns described above, it becomes possible to reduce the creation of low-pressure parts between the radial hydrodynamic groove and the thrust hydrodynamic groove. It also becomes possible to circulate lubricant among the radial bearing portion, the thrust bearing portion, and the communicating hole.

As a result, the formation of air bubbles in low-pressure parts is minimized, and in the event that air bubbles become trapped in the radial bearing or thrust bearing portions, the circulating will enable the air bubbles to be discharged, preventing lubricant film breakage at the radial bearing and thrust bearing portions.

The hydrodynamic bearing type rotary device according to the present invention is configured so that the relationships Pr>Pp1 and Pt>Pp1 are satisfied, or so that Pr>Pp2 and Pt>Pp2 are satisfied, where Pr is a capillary pressure function at the clearance of the radial bearing portion, Pt is a capillary pressure function at the clearance of the thrust bearing portion, Pp1 is a capillary pressure function at the communicating hole, a cross section of which is either a substantially rectangular shape or a D-cut shape, and Pp2 is a capillary pressure function at the communicating hole, a cross section of which is substantially round.

The following describes Pr, the capillary pressure function at the clearance of the radial bearing portion; Pt, the capillary pressure function at the clearance of the thrust bearing portion; Pp1, the capillary pressure function at the communicating hole, a cross section of which is either a substantially rectangular shape or a D-cut shape; and Pp2, the capillary pressure function at the communicating hole, a cross section of which is substantially cylindrical.

Pr, the capillary pressure function at the clearance of the radial bearing portion, is given by Equation (6), which is derived from the following Equations 1 through 5 when the radial bearing portion clearance is substantially cylindrical.

$$Fro = \pi \times Do \times \gamma \times \cos\theta \qquad (1)$$

$$Fri = \pi \times Di \times \gamma \times \cos\theta \qquad (2)$$

$$Di = Do - 2 \times r \qquad (3)$$

$$Fr = Fro + Fri \qquad (4)$$

$$Ar = \pi \times (Do^2 - Di^2)/4 \qquad (5)$$

$$Pr = Fr/Ar \qquad (6)$$

The coefficients are as follows:
γ: surface tension of lubricant [N/m]
θ: contact angle of lubricant [radians]
Do: outside diameter of cylinder [m]
r: lubricant film thickness on cylinder [m]
Pr: capillary pressure function at the radial bearing portion clearance [Pa]

Pt, the capillary pressure function at the clearance of the thrust bearing portion, is given by Equation (9), which is derived from the following Equations (7) and (8) when the thrust bearing portion clearance is a substantially thin, round plate.

$$Ft = 2\pi \times Dt \times \gamma \times \cos\theta \qquad (7)$$

$$At = \pi \times Dt \times S \qquad (8)$$

$$Pt = Ft/At \qquad (9)$$

The coefficients are as follows:
Dt: outside diameter of thrust bearing portion [m]
S: lubricant film thickness in thrust bearing portion (amount of thrust lift) [m]
Pt: capillary pressure function at the thrust bearing portion clearance [Pa]

Pp1, the capillary pressure function at the communicating hole, is given by Equations (12) and (13), which are derived from the following Equations (10) and (11) when a cross section of the communicating hole is either a substantially rectangular shape or a D-cut shape.

$$Fp1 = 2 \times (u + t) \times \gamma \times \cos\theta \qquad (10)$$

$$Ap1 = u \times t \qquad (11)$$

$$Pp1 = Fp1/Ap1 \qquad (12)$$

$$= 2 \times \gamma \times \cos\theta \times (u + t)/(u \times t) \qquad (13)$$

The coefficients are as follows:
u: width of cross section [m]
t: opposite end dimension of cross section [m]
Pp1: Capillary pressure function at the communicating hole [Pa]

Pp2, the capillary pressure function at the communicating hole, is given by Equations (16) and (17), which are derived from the following Equations (14) and (15) when a cross section of the communicating hole is a substantially round shape.

$$Fp2 = \Pi \times dp \times \gamma \times \cos\theta \qquad (14)$$

$$Ap2 = \Pi \times dp^2/4 \qquad (15)$$

$$Pp2 = Fp2/Ap2 \qquad (16)$$

$$= 4 \times \gamma \times \cos\theta/dp \qquad (17)$$

The coefficients are as follows:
dp: Inside diameter of communicating hole [m]
Pp2: capillary pressure function at the communicating hole [Pa]

As shown above, forming a configuration such that the relationships Pr>Pp1 and Pt>Pp1 are satisfied, or so that Pr>Pp2 and Pt>Pp2 are satisfied, for the capillary pressure function Pr, the capillary pressure function Pt, the capillary pressure function Pp1, and the capillary pressure function Pp2, facilitates the lubricant moving from the communicating hole to the clearance in the radial bearing portion or to the clearance in the thrust bearing portion, and hinders the lubricant in the clearance of the radial bearing portion or in the clearance of the thrust bearing portion from leaking from the clearance of the radial bearing portion or from the clearance in the thrust bearing portion. Furthermore, it is possible to prevent air bubbles from collecting in the radial bearing portion clearance or in the thrust bearing portion clearance.

A synergistic effect can be obtained by forming the groove pattern of at least one of the radial hydrodynamic groove and the thrust hydrodynamic groove into a so-called push-type pattern, by circulating the lubricant among the radial bearing portion, the thrust bearing portion, and the communicating hole, and by forming a configuration such that the above capillary pressure functions Pr, Pt, Pp1, and Pp2 satisfy either the relationships Pr>Pp1 and Pt>Pp1, or Pr>Pp2 and Pt>Pp2. A more definite result can be obtained by preventing the occurrence of lubricant film breakage in the radial hydrodynamic groove and the thrust hydrodynamic groove.

Effect of the Invention

According to the present invention, lubricant is circulated by pressure applied by a hydrodynamic groove positioned upstream to a bearing portion, ceasing the formation of low-pressure parts from the bearing portion, preventing the accumulation of air bubbles, and preventing the occurrence of lubricant film breakage at the radial hydrodynamic groove and the thrust hydrodynamic groove.

DETAILED DESCRIPTION OF THE INVENTION

Embodiments that specifically depict the best mode for carrying out the present invention are described hereinbelow together with the drawings.

Embodiment 1

The following is a description of a typical configuration and four images.

Figure 1:
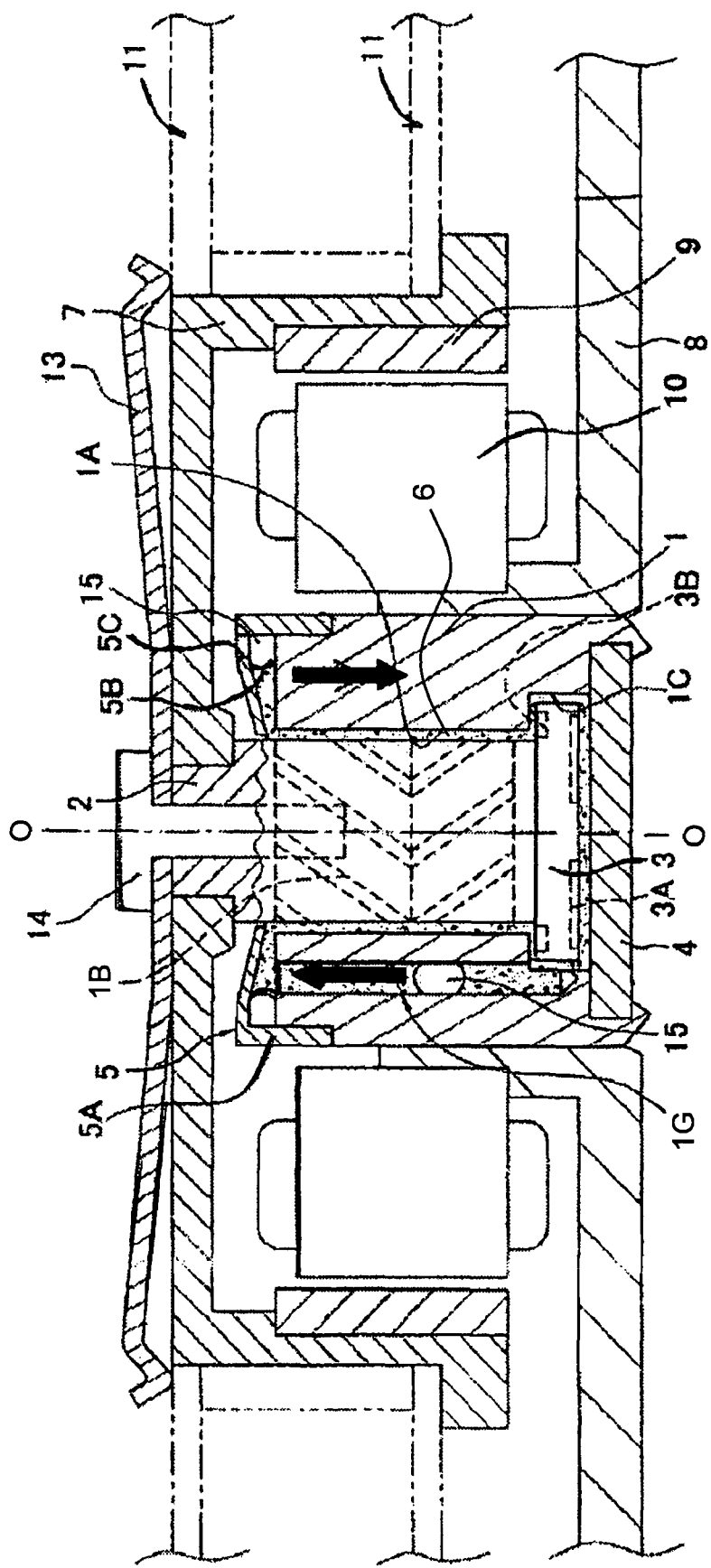
FIG. 1 is a cross-sectional view showing the hydrodynamic bearing device of Embodiment 1 of the present invention.

FIG. 1 is used to describe the hydrodynamic bearing type rotary device of Embodiment 1. The hydrodynamic bearing type rotary device of the present invention includes a sleeve 1; a shaft 2; a flange 3; a thrust plate 4; a seal cap 5; lubricating oil (lubricant) 6 composed of oil, superfluid grease, an ionic liquid, or the like; a hub 7; a base 8; a rotor magnet 9; and a stator 10, as shown in FIG. 1.

The shaft 2 is integrated with the flange 3, and is rotatably inserted into a bearing hole 1A in the sleeve 1. The flange 3 is accommodated in a step 1C in the sleeve 1. A radial hydrodynamic groove 1B is formed in at least one of the external peripheral surface of the shaft 2 and the internal peripheral surface of the sleeve 1. Thrust hydrodynamic grooves 3A and 3B are formed respectively on the surface of the flange 3 facing the thrust plate 4, and on the surface of the flange 3 facing the sleeve 1. The thrust plate 4 is fixed to either the sleeve 1 or the base 8. Bearing portion clearances in the vicinity of at least the hydrodynamic grooves 1B, 3A, and 3B are filled with the lubricating oil 6. The pouch-shaped bearing portion clearances formed by the sleeve 1, the shaft 2, and the thrust plate 4 are also entirely filled with the lubricating oil 6 as necessary. (The sleeve 1 has an open end at the side nearer the hub 7, which is described later, and a closed end at the side nearer the thrust plate 4.) The seal cap 5 has a fixed part 5A attached to the top end surface of the sleeve 1, as well as a tapered part 5B, and a ventilation hole 5C. A communicating hole 1G is provided substantially parallel to the bearing hole 1A, and is provided so as to communicate an oil collector of the seal cap 5 (corresponding to the groove end of the radial hydrodynamic groove 1B on the side opposite the thrust hydrodynamic grooves) with the external periphery of the flange 3 (corresponding to the groove end of the thrust hydrodynamic groove 3B on the side opposite the radial hydrodynamic groove). The communicating hole 1G, the radial hydrodynamic groove 1B, and the thrust hydrodynamic groove 3B are aligned together, constituting a channel for circulating the lubricating oil 6. The numerical symbol 15 denotes an air bubble included in the bearing portion interior. The communicating hole 1G may be formed inside the sleeve 1 (see FIG. 1), on the external periphery of the sleeve (see FIG. 10), or on the internal periphery of the member that covers the external periphery of the sleeve 1.

The sleeve 1 is fixed to the base 8. The stator 10 is fixed to the base 8 so as to face the rotor magnet 9. The magnet 9 generates suction force in the axial direction through flux leakage, and pushes the hub 7 towards the thrust plate 4 with a force of about 10 to 100 grams. The hub 7 is fixed to the shaft 2, and a rotor magnet 9, a recording disk 11, a spacer 12, a clamper 13, and a screw 14 are fixed to the hub.

Figure 6:
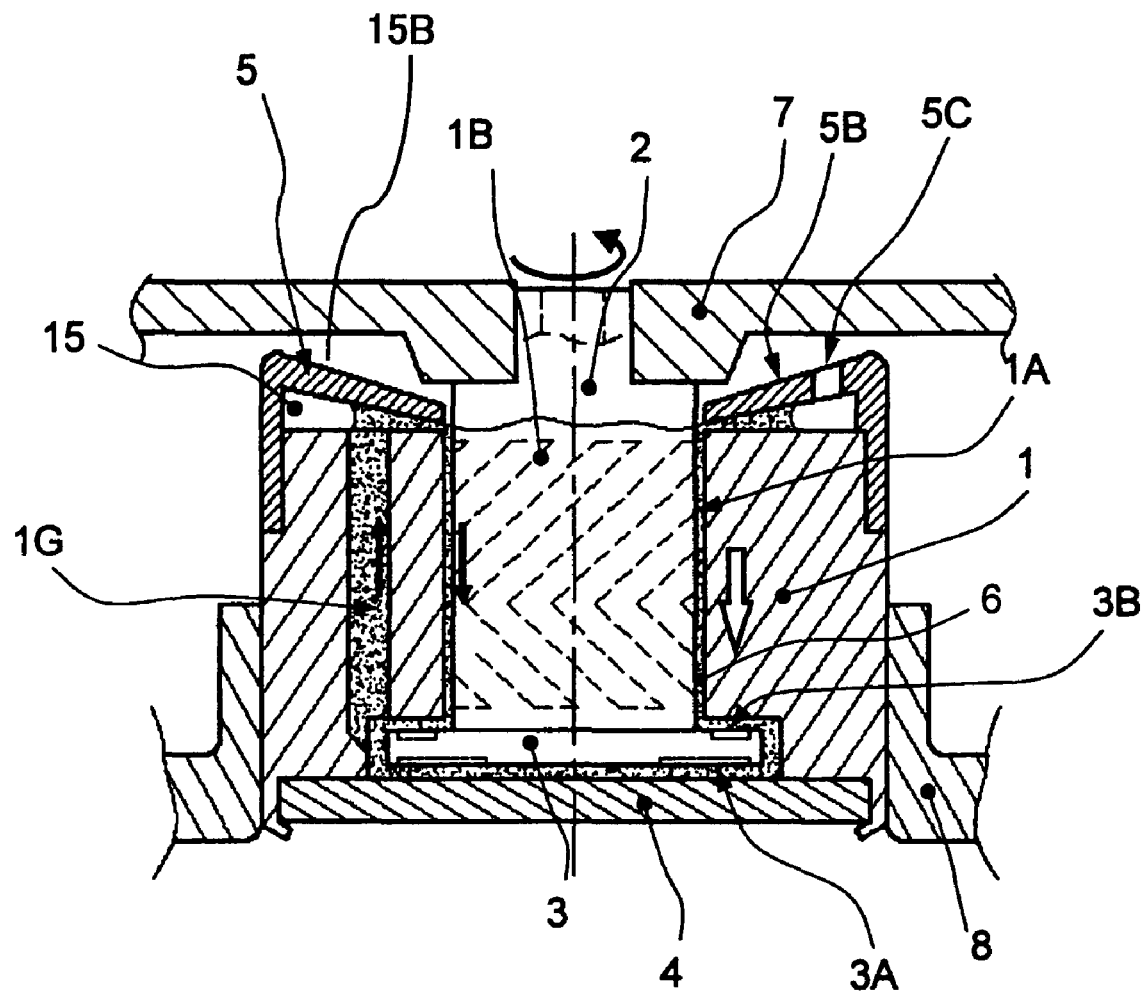
FIG. 6 is a detailed cross-sectional view of the hydrodynamic bearing device in Embodiment 1 of the present invention.
Figure 7:
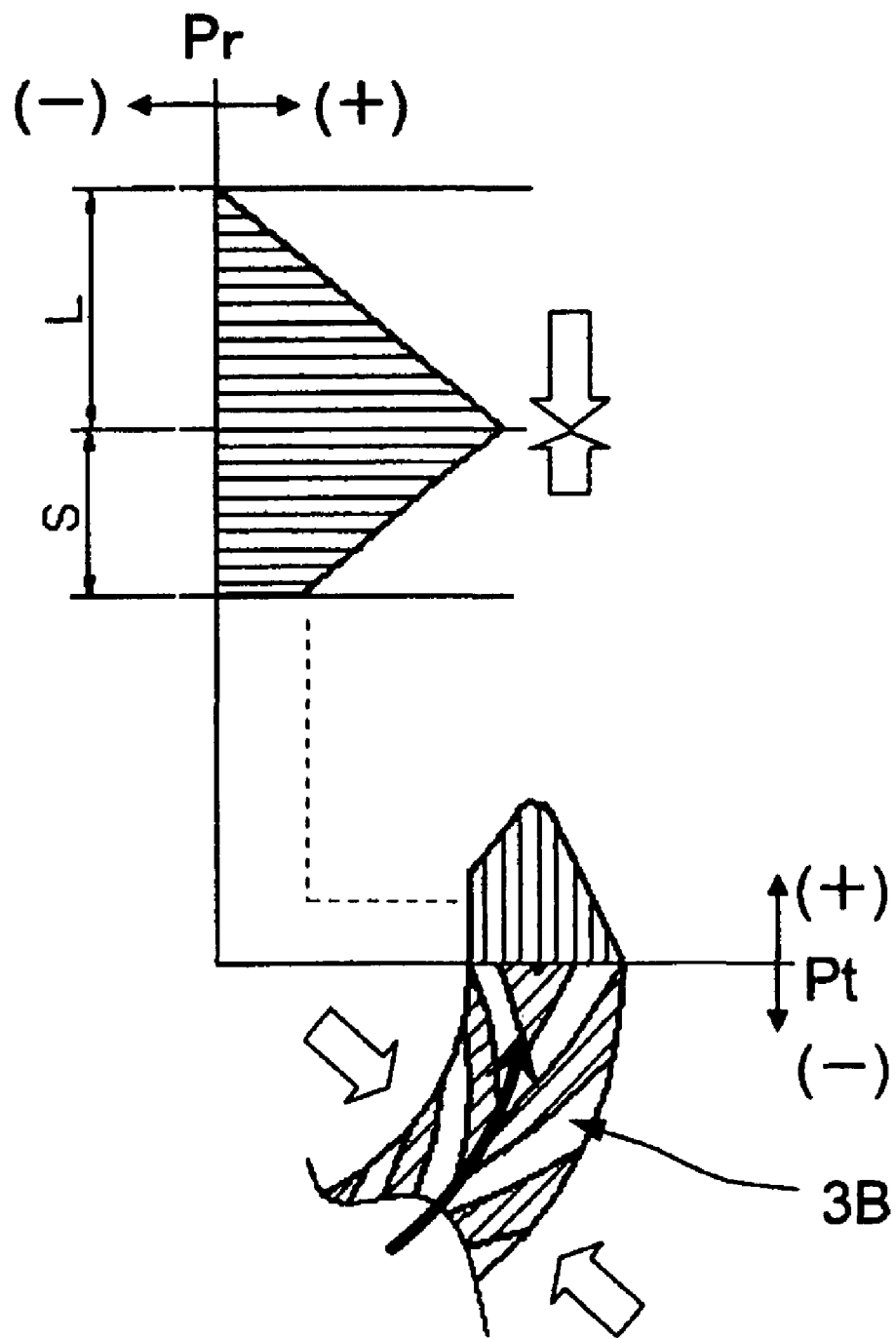
FIG. 7 is a pressure distribution diagram for the hydrodynamic bearing device in FIG. 6.

The operation of the hydrodynamic bearing type rotary device of Embodiment 1 of the present invention shown in FIG. 1 will now be described using FIGS. 1, 6, and 7. The groove pattern of the radial hydrodynamic groove 1B is a herringbone pattern. The groove pattern of the thrust hydrodynamic groove 3B is also a herringbone pattern. The groove patterns of the radial hydrodynamic groove 1B and the thrust hydrodynamic groove 3B are designed so that when the shaft 2 rotates, the pump force (also referred to as the circulating force or conveying force) of the radial hydrodynamic groove 1B and the pump force of the thrust hydrodynamic groove 3B combine to convey the lubricating oil 6 in the clearance of the tapered part 5B of the seal cap 5 through the bearing hole 1A towards the external peripheral surface of the flange 3, in the direction of the black arrows as shown in the drawings. The lubricating oil 6 flows into the communicating hole 1G via the thrust hydrodynamic groove 3B, and is circulated back into the tapered part 5B in the seal cap 5. The shaft 2 can thereby be rotated without coming into contact with the sleeve 1 or the thrust plate 4. As a result, data can be recorded and played back on the rotating recording disk 11 by a magnetic head or an optical head (not shown). In FIGS. 6 and 7, the radial hydrodynamic groove 1B has an asymmetrical herringbone pattern in which the top half shown in FIG. 7 (L in FIG. 7) is longer than the bottom half (S in FIG. 7). The thrust hydrodynamic groove 3B has a symmetrical herringbone pattern as shown in FIG. 7, and the rotation of the shaft 2 compresses and pressurizes the lubricating oil 6 in the radial bearings in the direction of the white arrow shown in FIG. 6, causing the lubricating oil 6 to flow and circulate towards the external peripheral surface of the flange 3. The groove pattern of the hydrodynamic grooves referred to herein is expressed by the following relation (30), for example.

$$Rm = \sqrt{\frac{Ro^2 + Ri^2}{2}} \quad (30)$$

Ri: Radius of the innermost periphery of the groove pattern
Rm: Radius of the apex of the groove pattern
Ro: Radius of the outermost periphery of the groove pattern The radial hydrodynamic groove 1B thereby creates a flow rate while compressing the oil in the thrust hydrodynamic groove 3B as shown in FIG. 7, thereby bringing about a pressure distribution such as is shown by Pr(+) in FIG. 7 between the radial bearing portion and the thrust bearing portion. A characteristic of such a pressure distribution is that there are no low-pressure parts in the bearing portion clearances. FIG. 6 shows no element for changing the pressure between the radial hydrodynamic groove 1B and the thrust hydrodynamic groove 3B. Therefore, the value on the lower end of the radial hydrodynamic distribution in FIG. 7 is harmonized with the value on the left end of the thrust hydrodynamic distribution (description of the dotted line in FIG. 7). The same applies for the following drawings. The inventors have manufactured numerous transparent hydrodynamic bearing type rotary devices and have continued visible observations of these hydrodynamic bearing type rotary devices while the devices are rotating. The result is a hydrodynamic bearing type rotary device designed so as not to have low-pressure parts, wherein air bubbles 15 trapped in the lubricating oil 6 in the bearing portion clearances move smoothly from the bearing portion clearances to a lubricating oil collector 15B and are expelled through the ventilation hole 5C or the clearance between the shaft 2 and the seal cap 5 to the outside of the bearing portion. Consequently, it was found experimentally that the oil film in the bearing portion clearances in the radial hydrodynamic groove 1B and thrust hydrodynamic groove 3B are prevented from breaking, and there is no concern over the bearing portions wearing.

Figure 26:
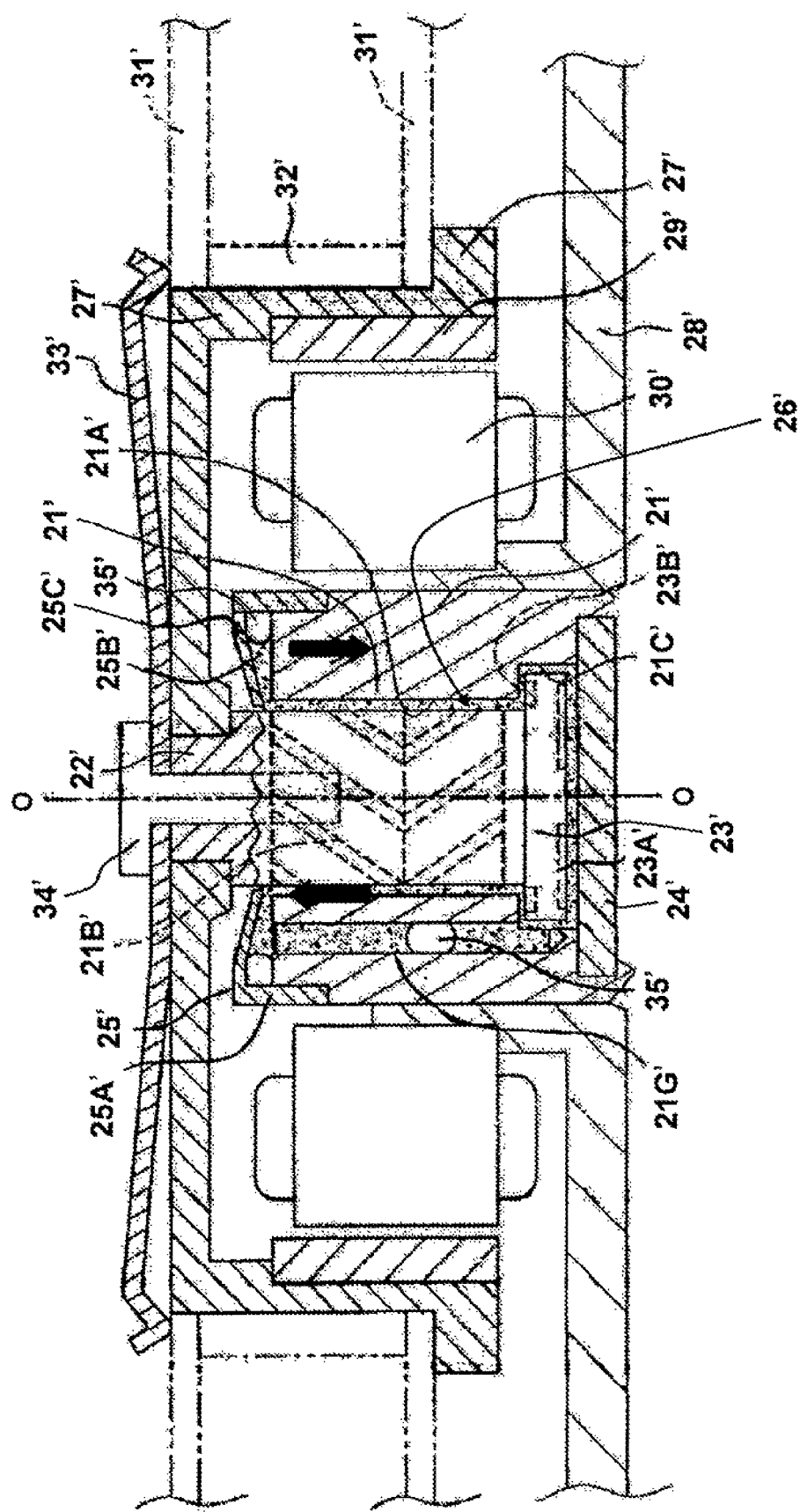
FIG. 26 is a cross-sectional view of a first conventional hydrodynamic bearing device.
Figure 27:
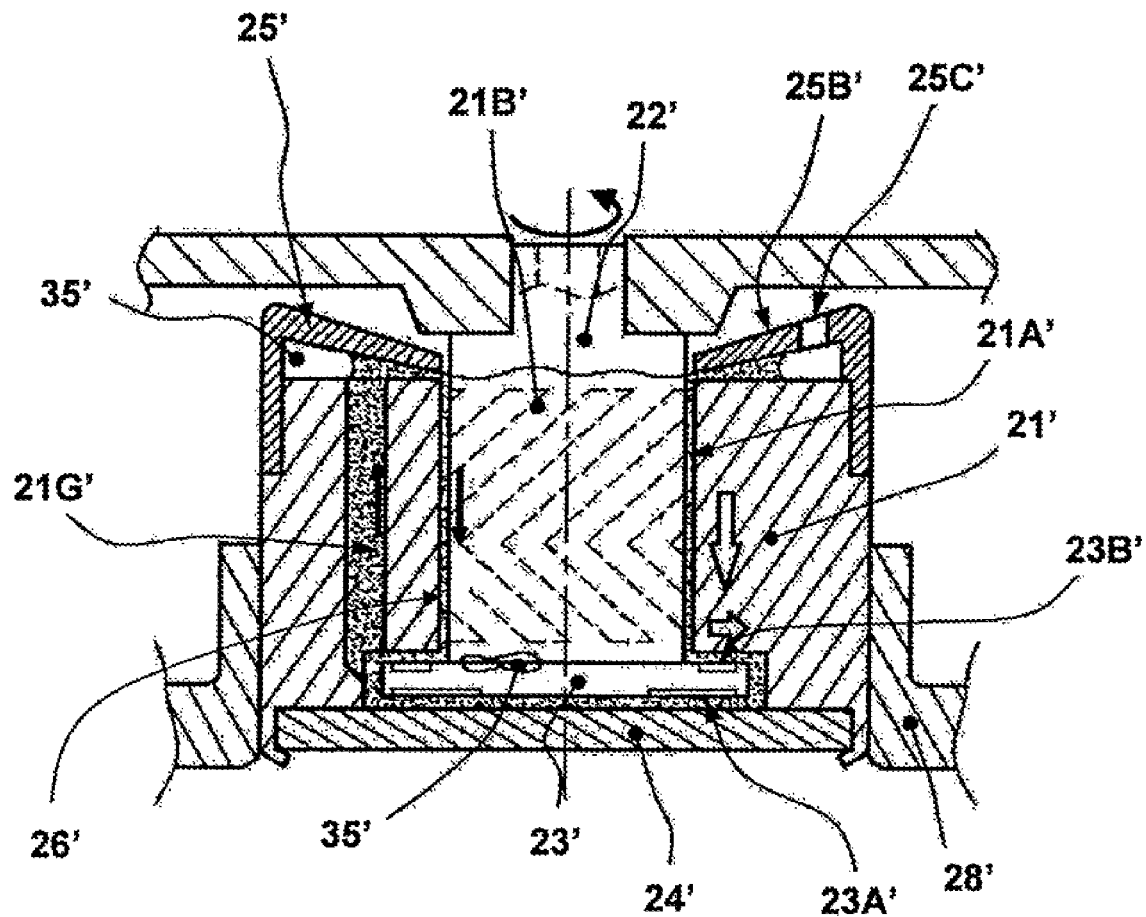
FIG. 27 is a detailed cross-sectional view of the hydrodynamic bearing device in FIG. 26.
Figure 28:
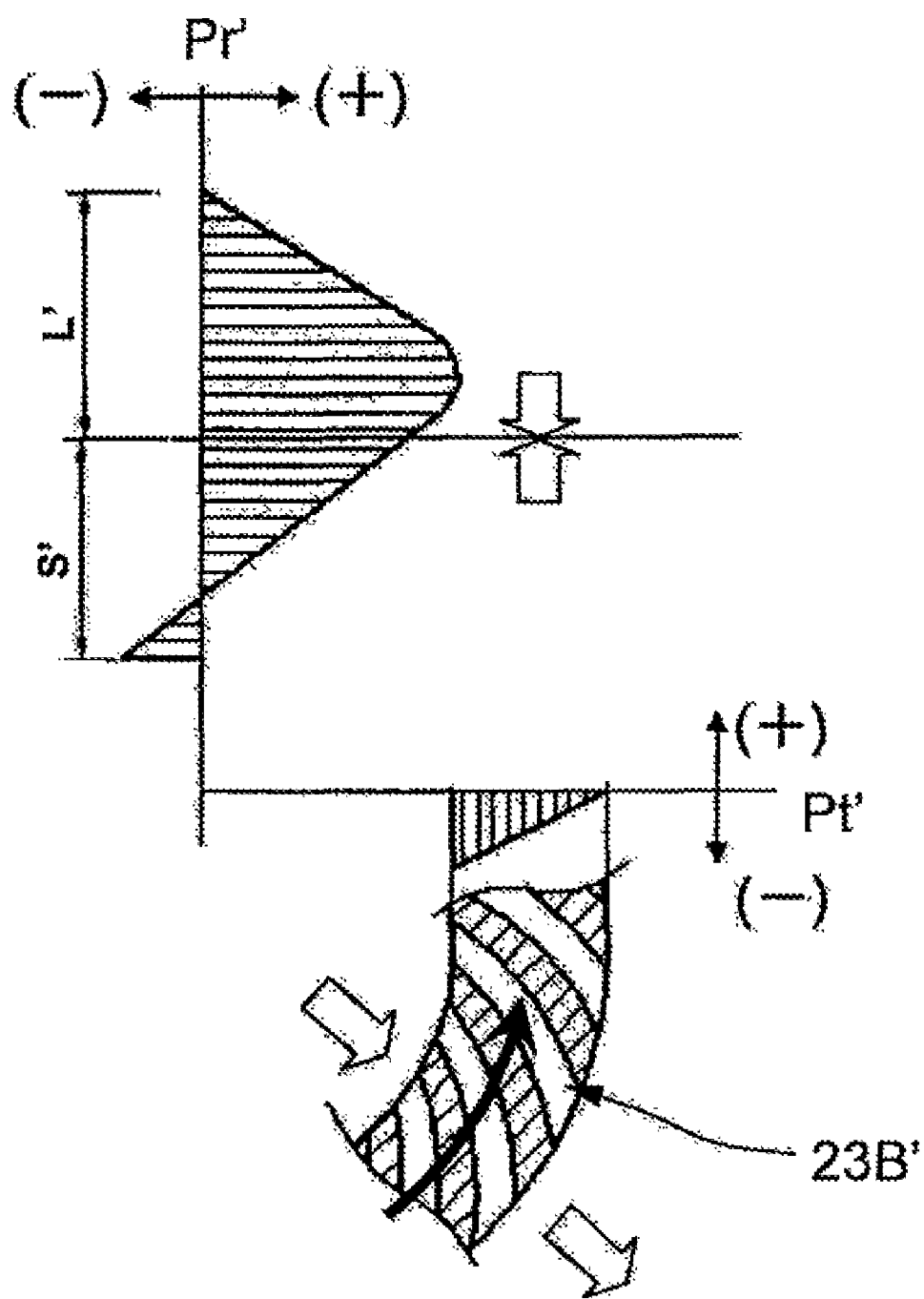
FIG. 28 is a pressure distribution diagram for the hydrodynamic bearing device in FIG. 26.
Figure 29:
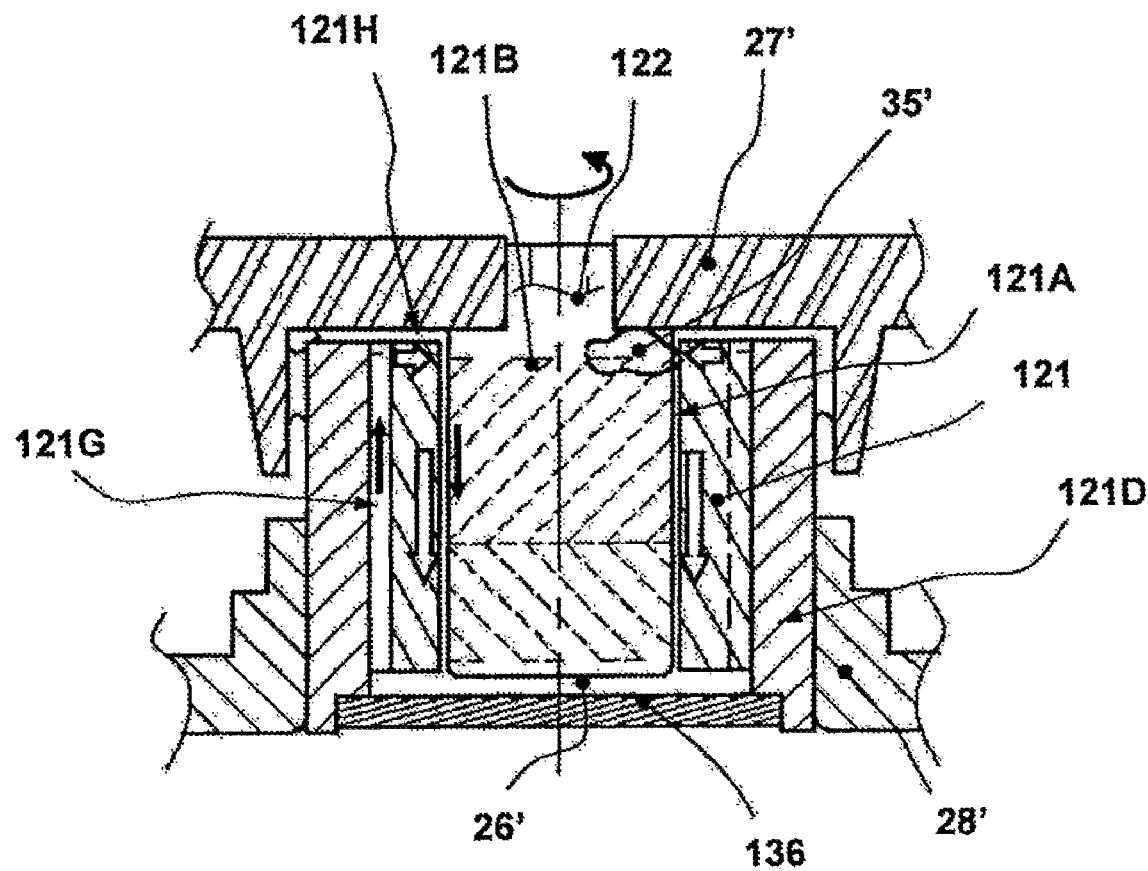
FIG. 29 is a cross-sectional view of a second conventional hydrodynamic bearing device.
Figure 30:
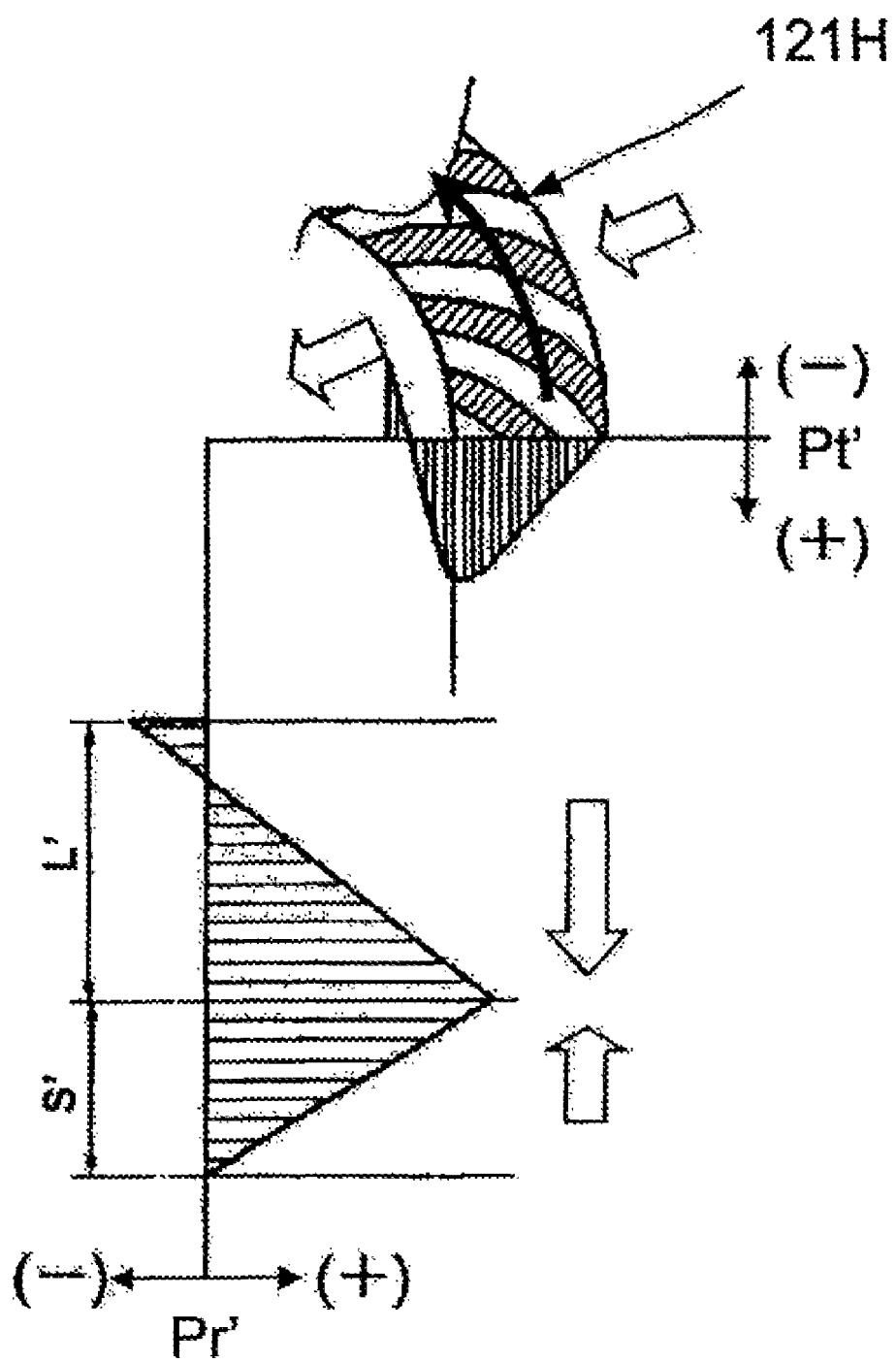
FIG. 30 is a pressure distribution diagram for the hydrodynamic bearing device in FIG. 29.
Figure 31:
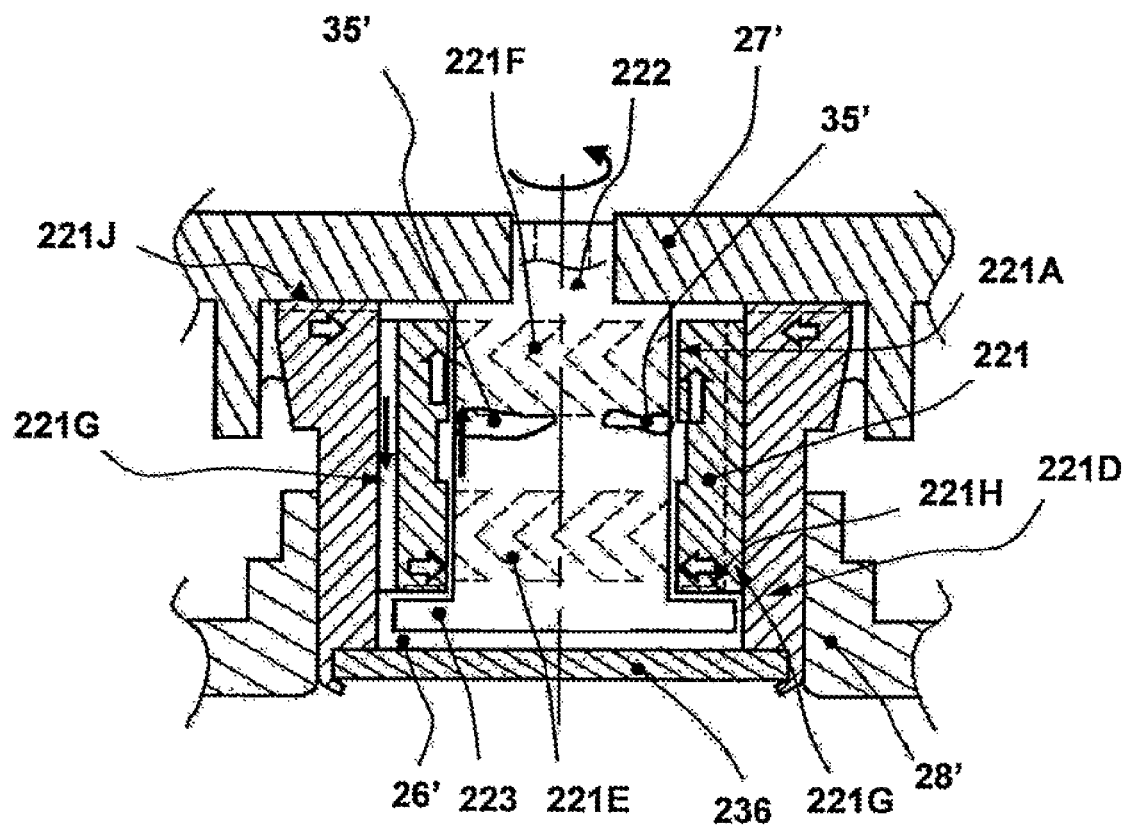
FIG. 31 is a cross-sectional view of a third conventional hydrodynamic bearing device.
Figure 32:
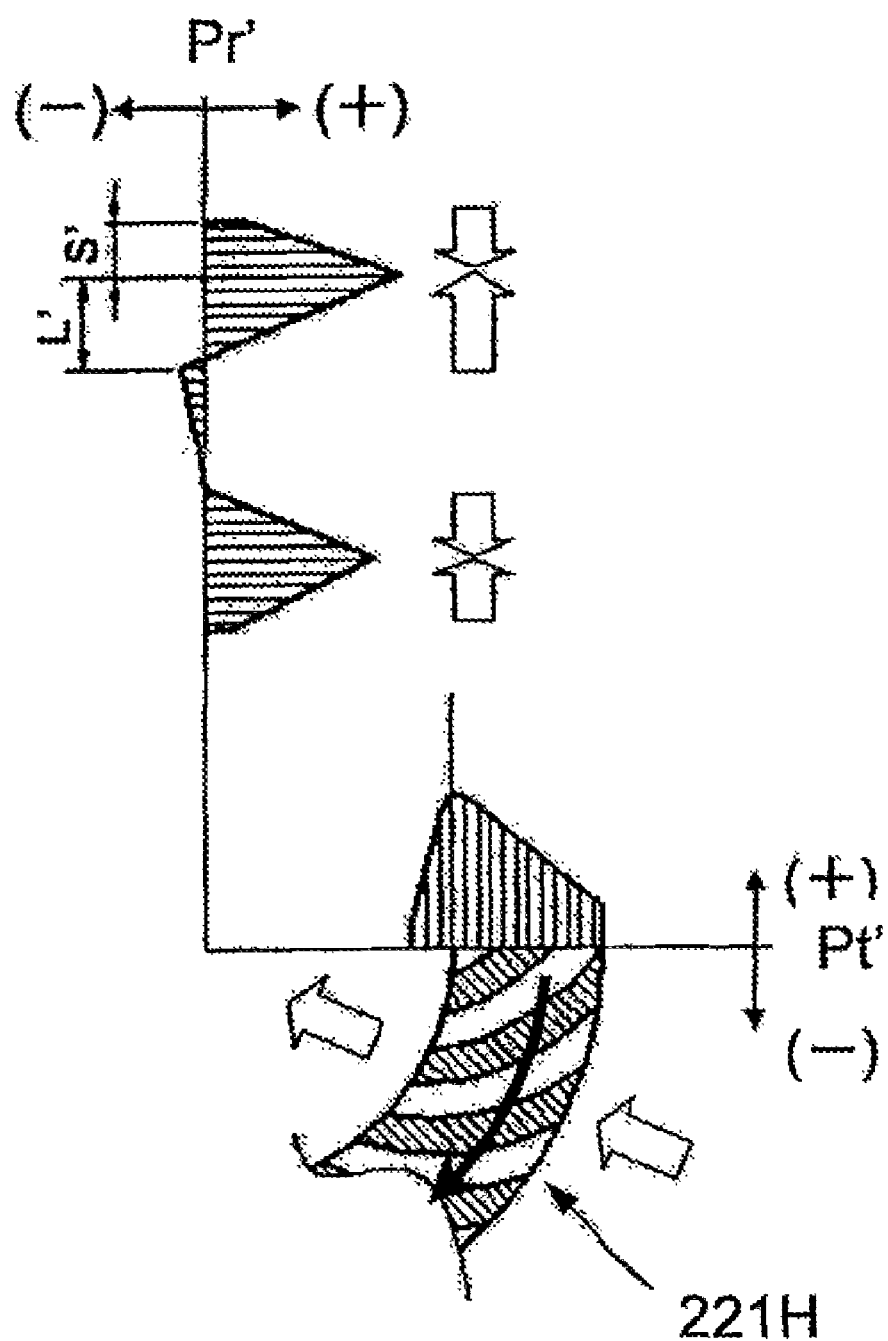
FIG. 32 is a pressure distribution diagram for the hydrodynamic bearing device in FIG. 31.
Figure 33:
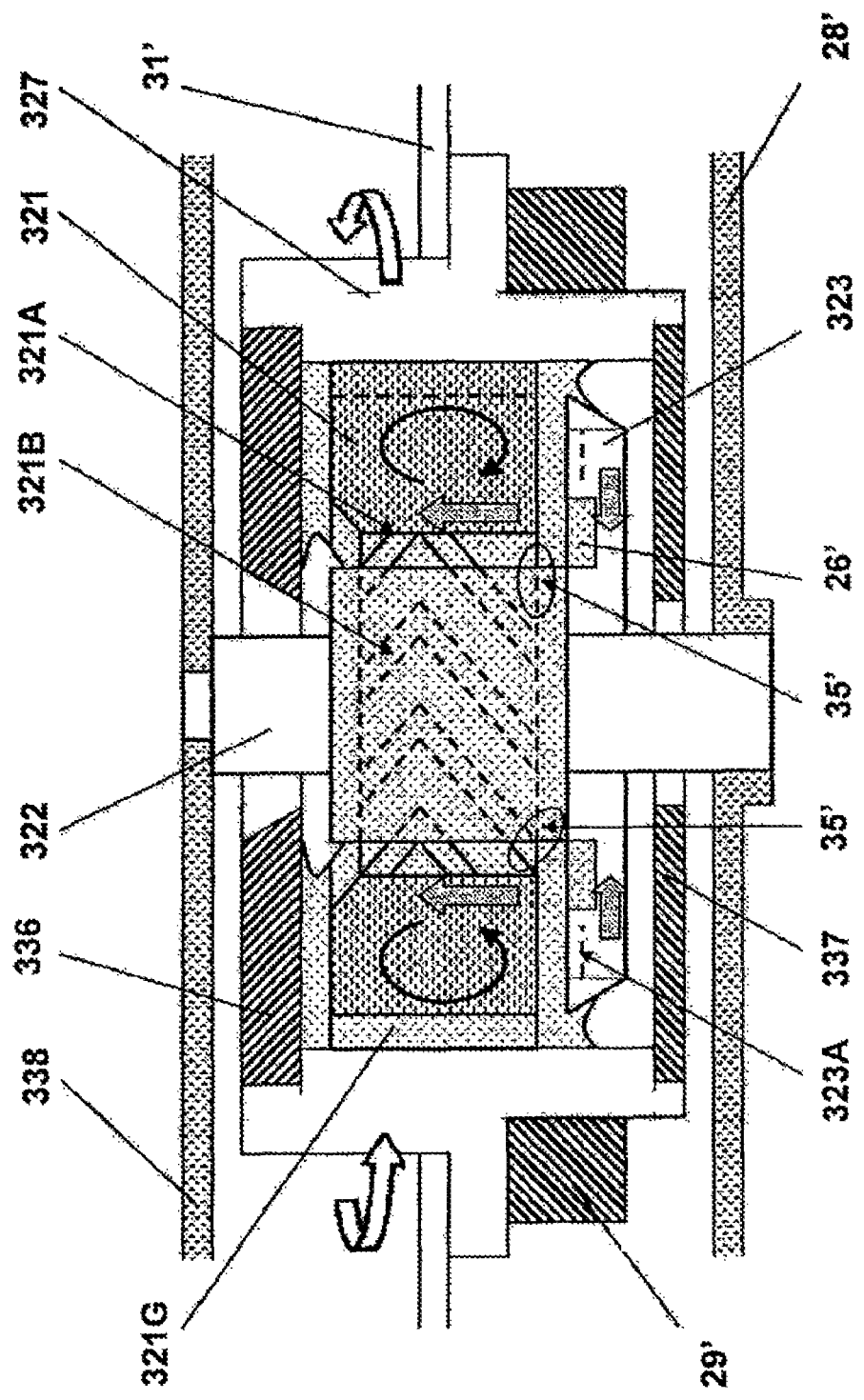
FIG. 33 is a detailed cross-sectional view of a fourth conventional hydrodynamic bearing device.
Figure 34:
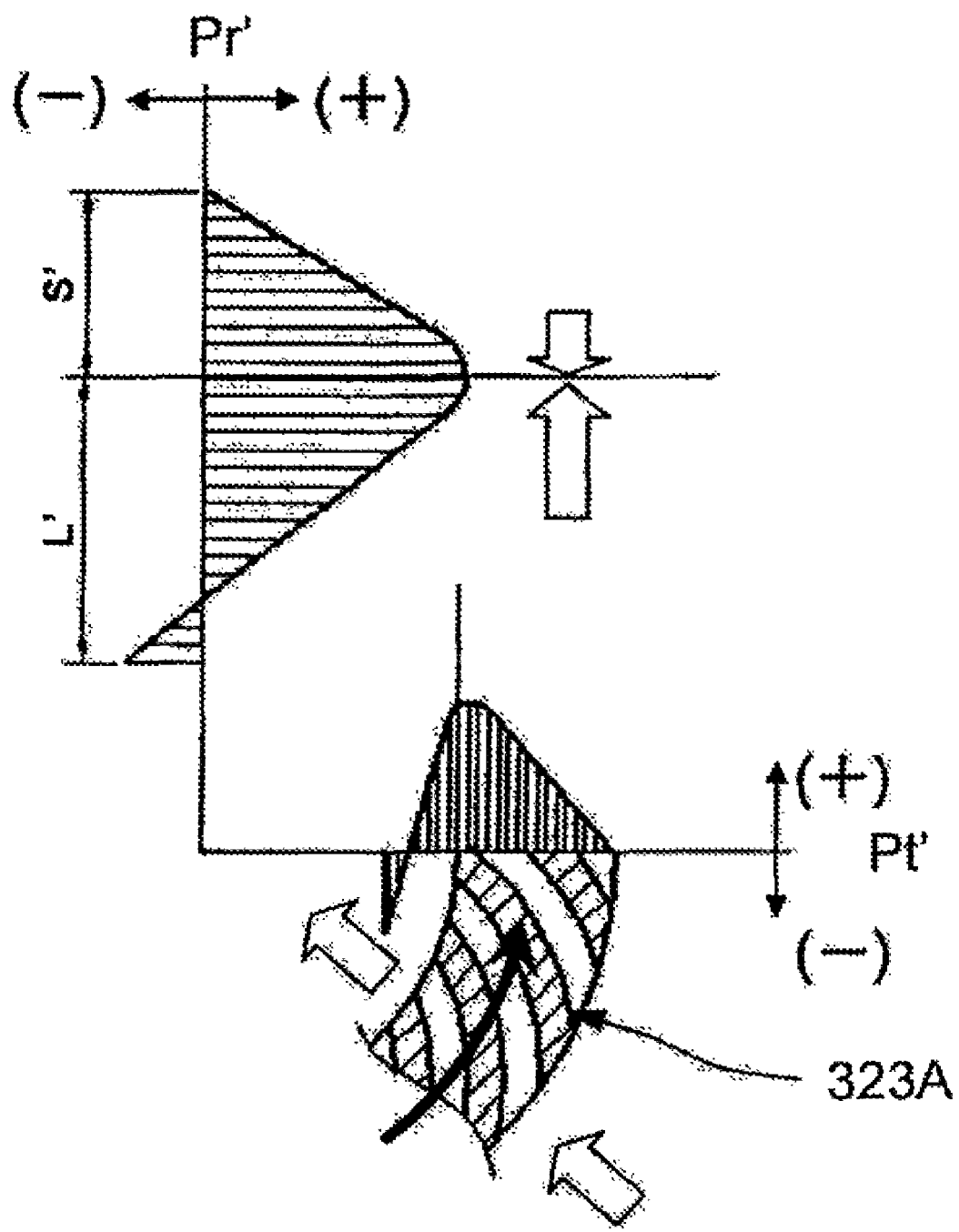
FIG. 34 is a pressure distribution diagram for the hydrodynamic bearing device in FIG. 33.
Figure 35:
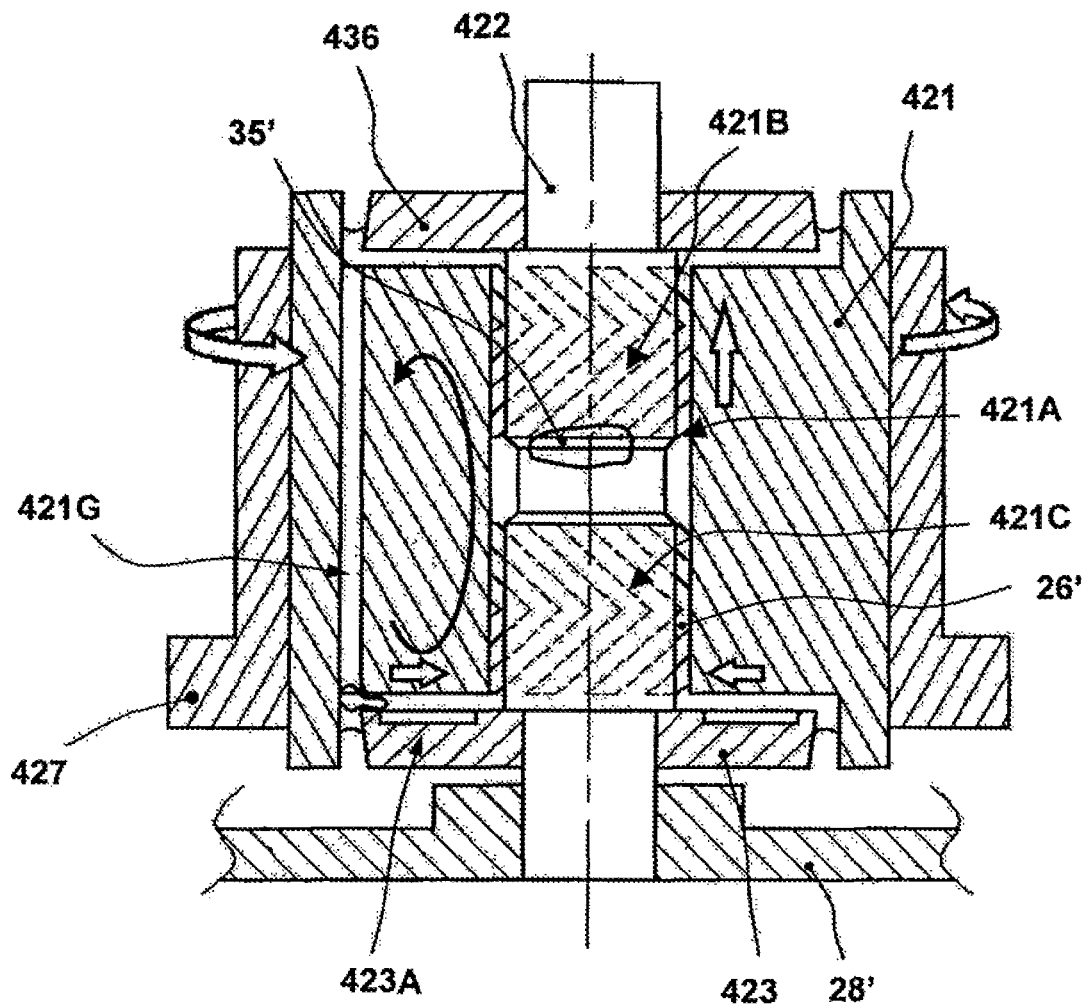
FIG. 35 is a detailed cross-sectional view of a fifth conventional hydrodynamic bearing device.
Figure 36:
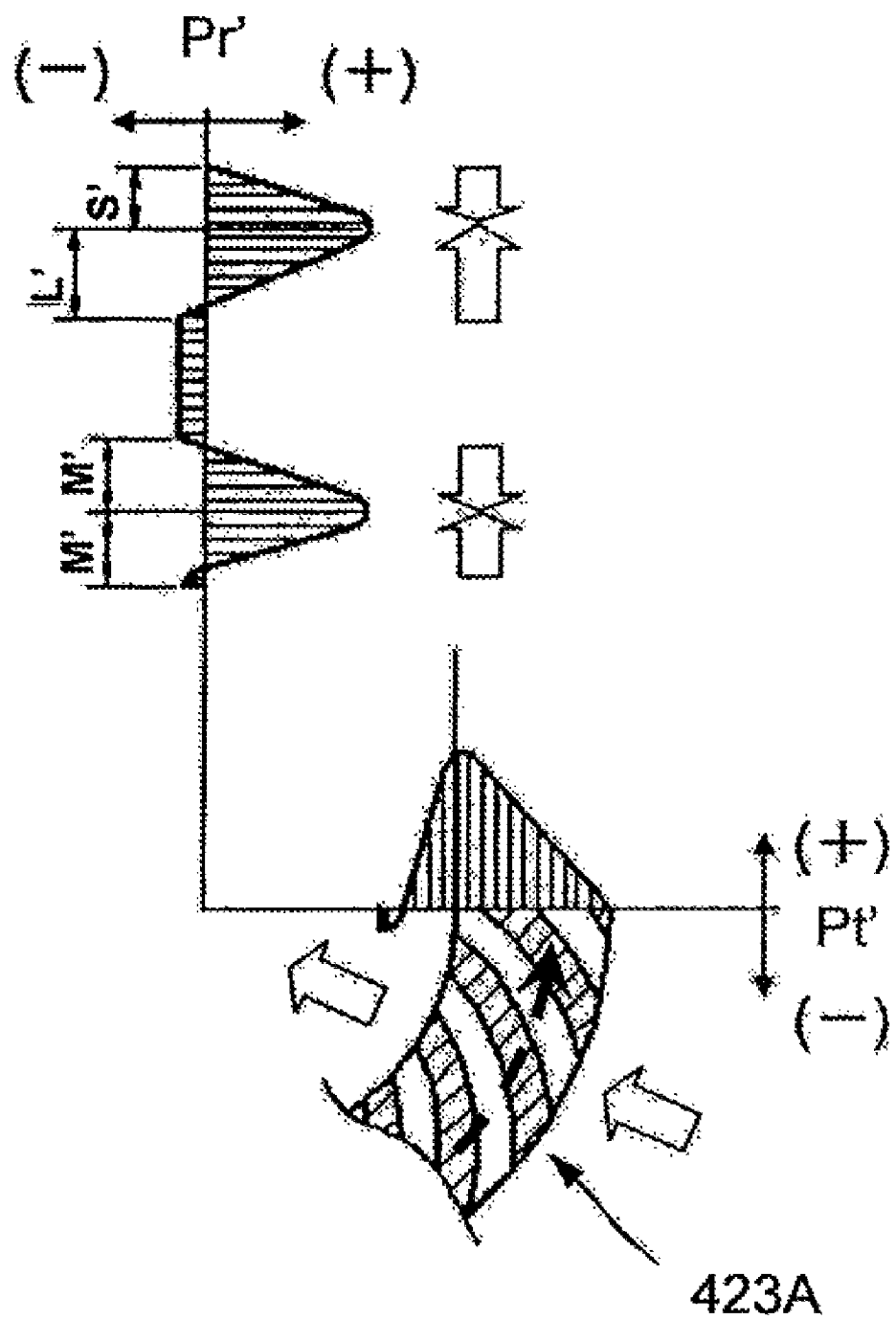
FIG. 36 is a pressure distribution diagram for the hydrodynamic bearing device in FIG. 35.

It was also found that in a hydrodynamic bearing type rotary device having low-pressure parts such as is shown in the conventional example in FIG. 26, air bubbles 15 collect in the low-pressure parts and are difficult to expel.

Thus, in the hydrodynamic bearing type rotary device of the present invention, bubbles can be prevented from forming because the bearing interior does not have low or negative pressure but rather pressure equal to or greater than the atmosphere. Even if air bubbles 15 do become trapped in the lubricating oil 6 in the bearing portion clearances, the bubbles can move smoothly from the bearing portion clearances to the lubricating oil collector 15B, and there is therefore no need for concern over the oil film breaking in the bearing portion clearances.

The four images are introduced hereinbelow.

FIGS. 2 through 5 are images showing the circulation channel of the lubricating oil 6, composed of the radial hydrodynamic groove 1B, the thrust hydrodynamic groove 3B, the communicating hole 1G, and an oil collector (in this case, the clearance between the sleeve 1 and the seal cap 5).

Figure 2:
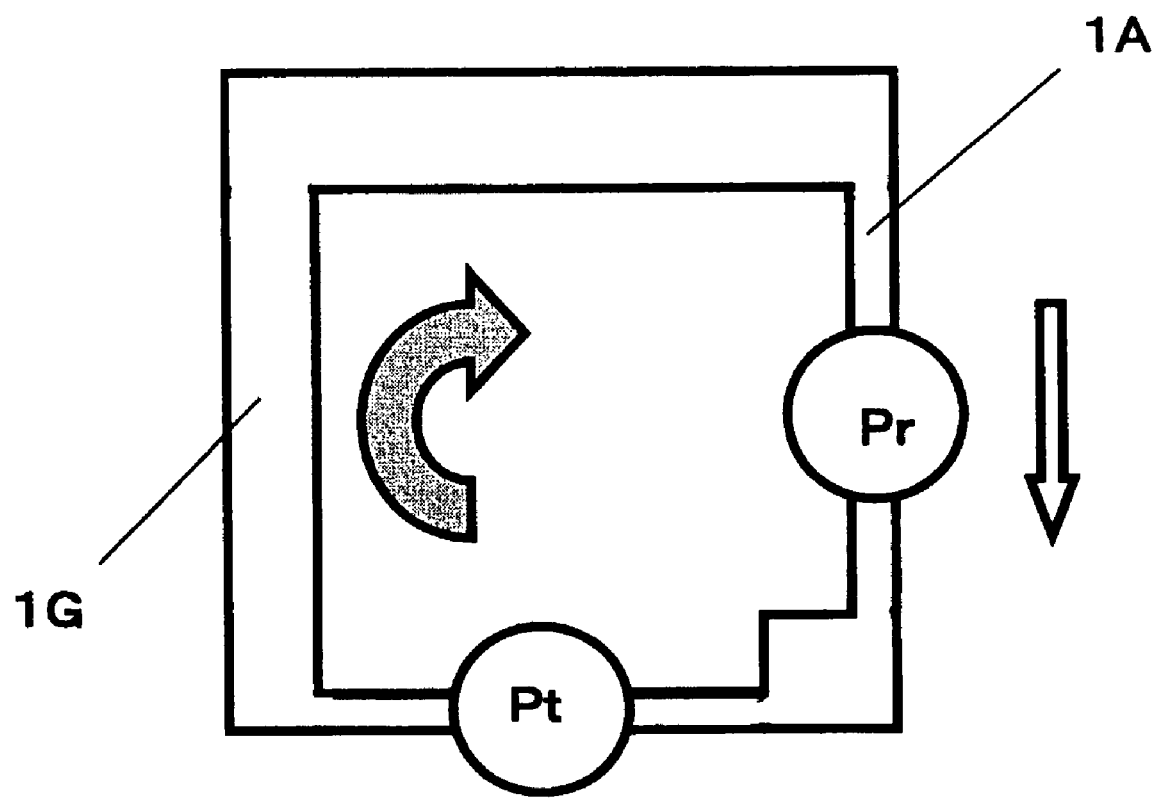
FIG. 2 is an image diagram showing the route of circulation of the lubricating oil in the present invention.

FIG. 2 is an image showing a case in which, during the rotation of the shaft or the sleeve, the radial hydrodynamic groove (Pr) pressurizes oil and pumps the oil in towards the thrust hydrodynamic groove (Pt) in the direction in which the oil flows, and pressure for lifting the bearing is created in the thrust hydrodynamic groove, but force for feeding the lubricating oil 6 into the flow channel is not created. The result of designing the hydrodynamic bearing type rotary device with such pressure-creating conditions is that the lubricating oil 6 circulates through the communicating hole 1G, and low-pressure parts can be prevented from forming in the bearing portion clearances. As a result, air bubbles 15 trapped in the lubricating oil 6 do not collect in low-pressure parts of the bearing portion clearances, but instead move smoothly from the bearing portion clearances to the lubricating oil collector 15B, and there is therefore no need for concern over the oil film breaking in the bearing portion clearances.

Figure 3:
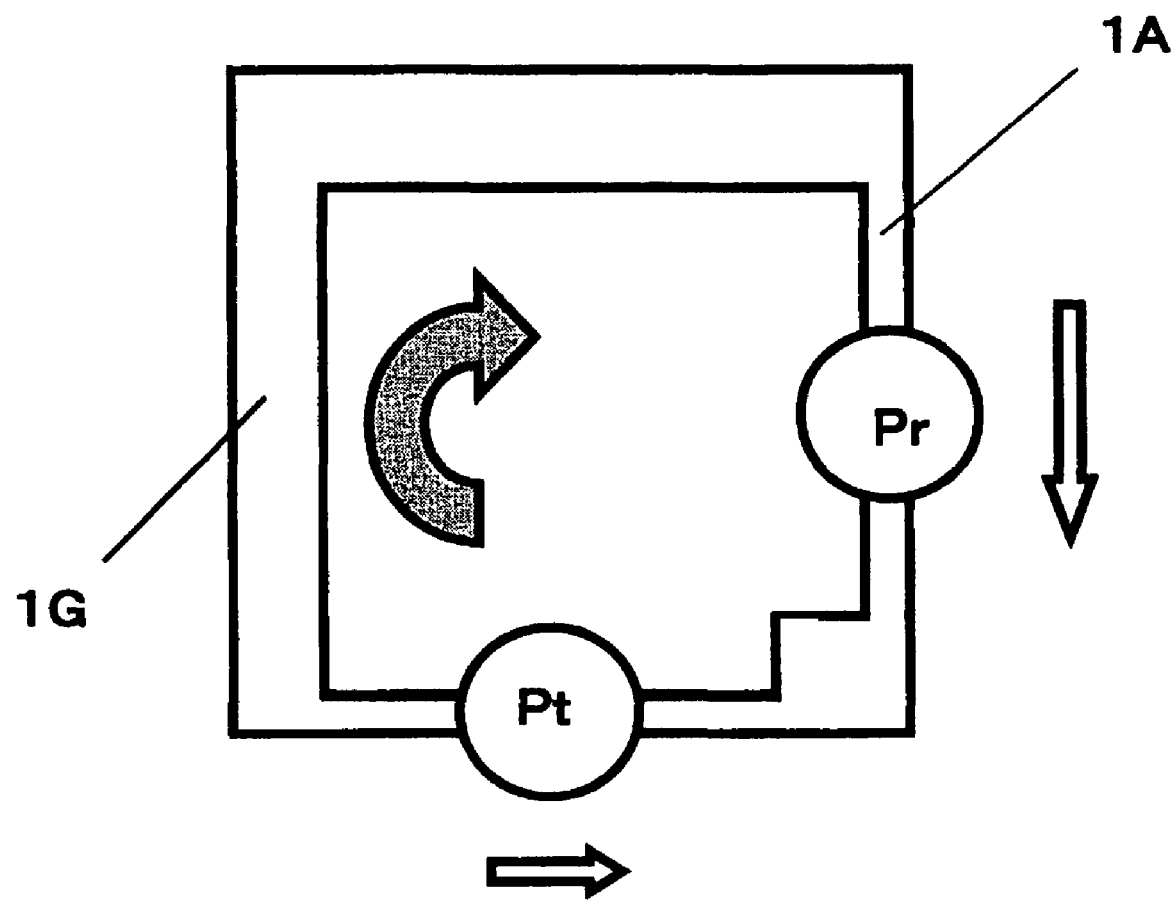
FIG. 3 is an image diagram showing the route of circulation of the lubricating oil in the present invention.

FIG. 3 is an image showing a case in which, during the rotation of the shaft or the sleeve, the radial hydrodynamic groove (Pr) uses sufficient force to pump the lubricating oil 6 in towards the thrust hydrodynamic groove (Pt) in the direction in which the oil flows, and the thrust hydrodynamic groove (Pt) creates a small amount of pump pressure in the direction opposite the oil flow, i.e., in a direction that applies pressure to the bearing portion clearances from the opposite direction. In this case, the design causes the force created by the radial hydrodynamic groove (Pr) to be greater than the force created by the thrust hydrodynamic groove (Pt), whereby the lubricating oil 6 can be made to flow from the radial hydrodynamic groove towards the thrust hydrodynamic groove. The result of designing the hydrodynamic bearing type rotary device with such pressure-creating conditions is that the lubricating oil 6 circulates through the communicating hole 1G, and low-pressure parts can be prevented from forming in the bearing portion clearances. As a result, air bubbles 15 trapped in the lubricating oil 6 do not collect in low-pressure parts of the bearing portion clearances, but instead move smoothly from the bearing portion clearances to the lubricating oil collector 15B, and there is therefore no need for concern over the oil film breaking in the bearing portion clearances.

Figure 4:
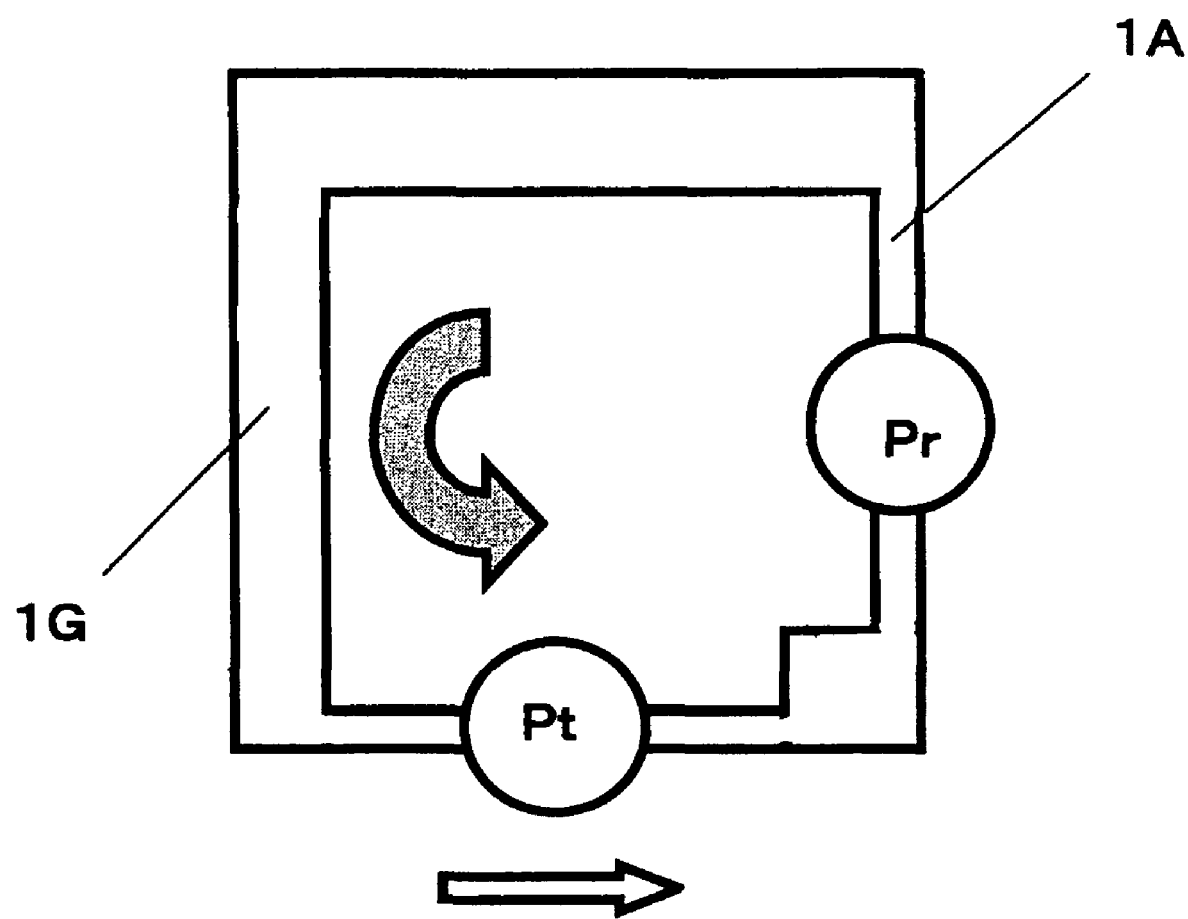
FIG. 4 is an image diagram showing the route of circulation of the lubricating oil in the present invention.

FIG. 4 is an image showing a case in which, during the rotation of the shaft or the sleeve, the thrust hydrodynamic groove (Pt) pumps the lubricating oil 6 in towards the radial hydrodynamic groove (Pr) in the direction in which the oil flows, and pressure for supporting the bearing load is created in the radial hydrodynamic groove (Pr), but force for feeding the lubricating oil 6 into the flow channel is not created. The result of designing the hydrodynamic bearing type rotary device with such pressure-creating conditions is that the lubricating oil 6 circulates through the communicating hole 1G, and low-pressure parts can be prevented from forming in the bearing portion clearances. As a result, air bubbles 15 trapped in the lubricating oil 6 do not collect in low-pressure parts of the bearing portion clearances, but instead move smoothly from the bearing portion clearances to the lubricating oil collector 15B, and there is therefore no need for concern over the oil film breaking in the bearing portion clearances.

Figure 5:
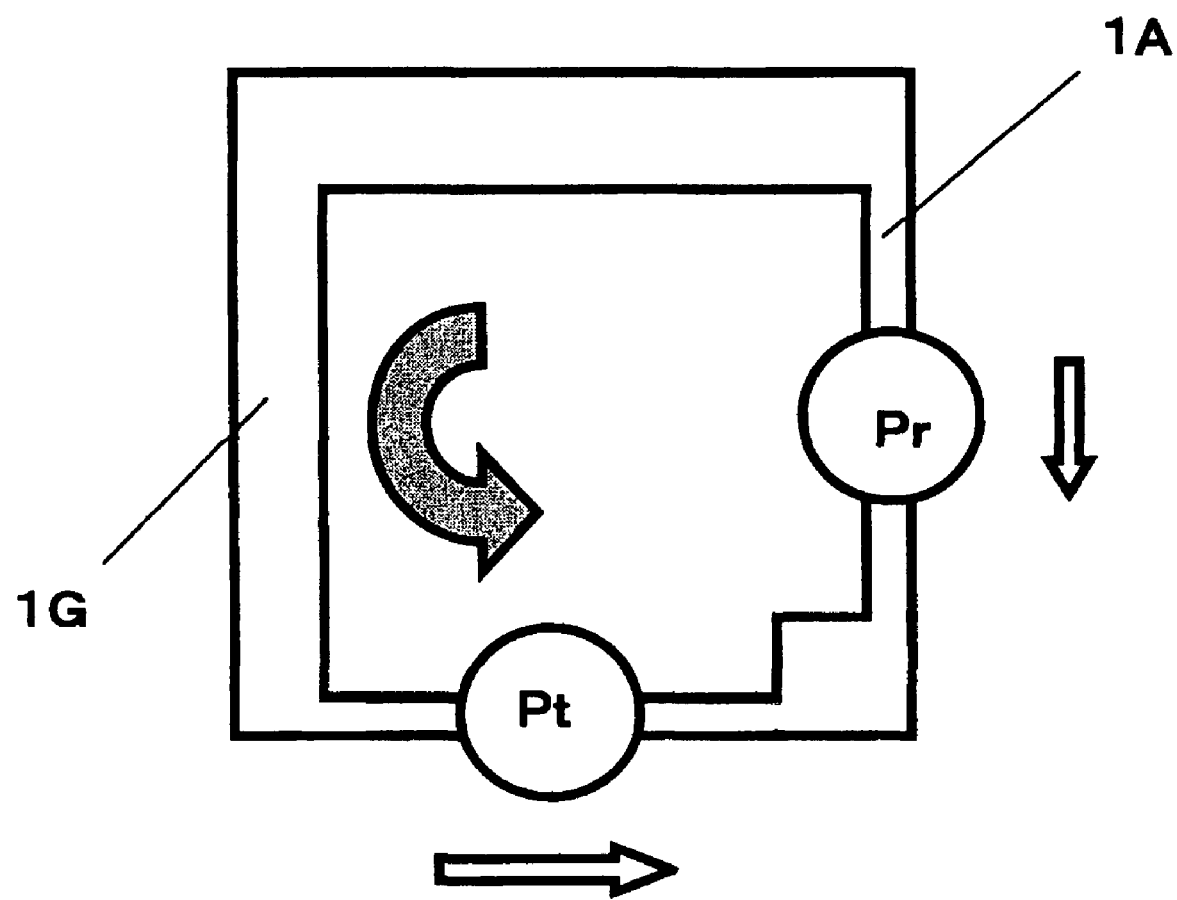
FIG. 5 is an image diagram showing the route of circulation of the lubricating oil in the present invention.

FIG. 5 is an image showing a case in which, during the rotation of the shaft or the sleeve, the thrust hydrodynamic groove (Pt) uses sufficient force to pump the lubricating oil in towards the radial hydrodynamic groove (Pr) in the direction in which the oil flows, and the radial hydrodynamic groove (Pr) creates a small amount of pump pressure in the direction opposite the oil flow, i.e., in a direction that applies pressure to the bearing portion clearances from the opposite direction. In this case, the design causes the force created by the thrust hydrodynamic groove (Pt) to be greater than the force created by the radial hydrodynamic groove (Pr), whereby the lubricating oil 6 can be made to flow from the thrust hydrodynamic groove towards the radial hydrodynamic groove. The result of designing the hydrodynamic bearing type rotary device with such pressure-creating conditions is that the lubricating oil 6 circulates through the communicating hole 1G, and low-pressure parts can be prevented from forming in the bearing portion clearances. As a result, air bubbles 15 trapped in the lubricating oil 6 do not collect in low-pressure parts of the bearing portion clearances, but instead move smoothly from the bearing portion clearances to the lubricating oil collector 15B, and there is therefore no need for concern over the oil film breaking in the bearing portion clearances.

As is demonstrated above, low-pressure parts can be prevented from forming in the bearing portion clearances by designing the hydrodynamic bearing type rotary device with the four design conditions shown in FIGS. 2 through 5. As a result, it is possible to construct a hydrodynamic bearing type rotary device wherein air bubbles 15 trapped in the lubricating oil 6 do not collect in low-pressure parts of the bearing portion clearances, but instead move smoothly from the bearing portion clearances to the lubricating oil collector 15B, and it is therefore possible to prevent the oil film from breaking in the bearing portion clearances.

Embodiment 2

Figure 8:
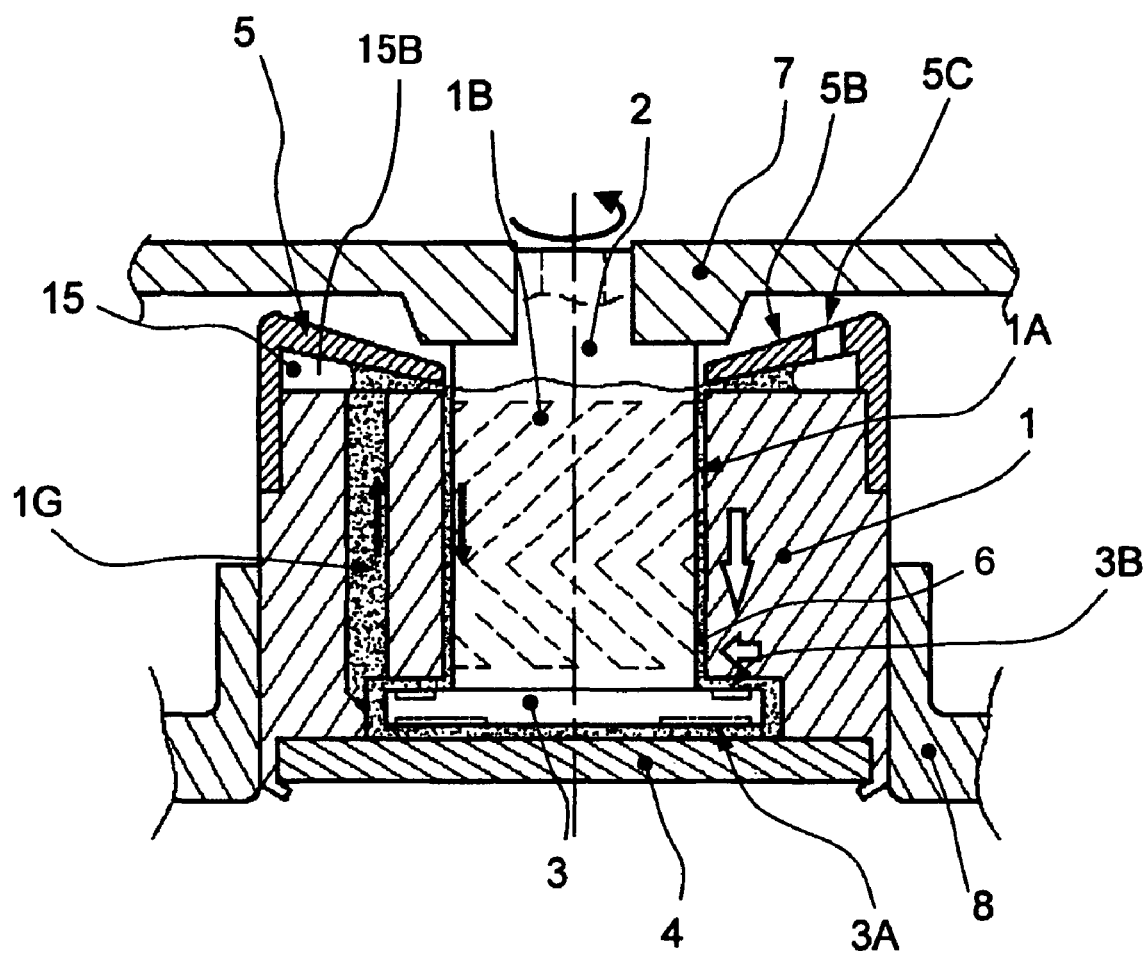
FIG. 8 is a detailed cross-sectional view of the hydrodynamic bearing device in Embodiment 2 of the present invention.
Figure 9:
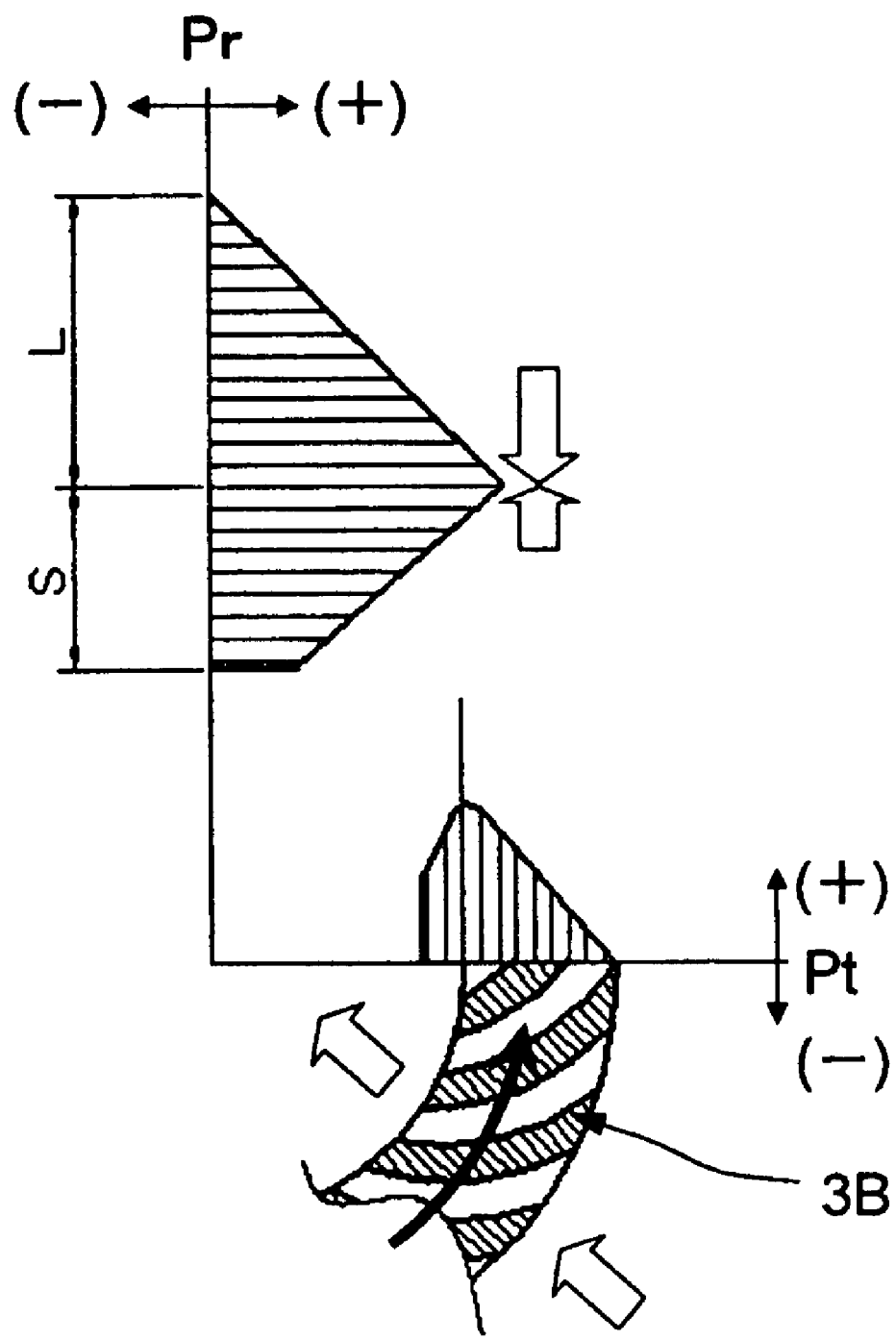
FIG. 9 is a pressure distribution diagram for the hydrodynamic bearing device in FIG. 8.

FIGS. 8 and 9 show the configuration of Embodiment 2 of the present invention. This configuration is identical to that of Embodiment 1 of the present invention shown in FIGS. 6 and 7, wherein the radial hydrodynamic groove 1B has an asymmetrical herringbone pattern in which the top half shown in FIG. 9 (L in FIG. 9) is longer than the bottom half (S in FIG. 9). The thrust hydrodynamic groove 3B has a spiral pattern as shown in FIG. 9, and the rotation of the shaft 2 creates pressure in a direction that pushes the flow channels of the radial hydrodynamic groove 1B and thrust hydrodynamic groove 3B together. Since the force of the radial hydrodynamic groove 1B that feeds the lubricating oil (lubricant) 6 into the flow channel is greater than the same force of the thrust hydrodynamic groove 3B, the lubricating oil 6 is made to flow and circulate as shown by the direction of the black arrow in FIG. 8 (at least at room temperature). This brings about a pressure distribution such as is shown in Pr(+) in FIG. 9 between the radial bearing portion and the thrust bearing portion. A characteristic of such a pressure distribution is that there are no low-pressure parts in the bearing portion clearances. Therefore, air bubbles 15 trapped in the lubricating oil 6 do not collect in low-pressure parts in the bearing portion clearances, but instead move smoothly from the bearing portion clearances to the lubricating oil collector 15B and are expelled through the ventilation hole 5C or the clearance between the shaft 2 and the seal cap 5 to the outside of the bearing. As a result, the oil film in the bearing portion clearances can be prevented from breaking, and there is no need for concern over the bearing portions being worn down.

The thrust hydrodynamic groove 3B was described as having a spiral pattern, but may also have an asymmetrical herringbone pattern. An asymmetrical herringbone pattern is expressed by the Equation (31) shown below, for example.

$$Rm < \sqrt{\frac{Ro^2 + Ri^2}{2}} \tag{31}$$

Ri: Radius of the innermost periphery of the groove pattern
Rm: Radius of the apex of the groove pattern Ro: Radius of the outermost periphery of the groove pattern Room temperature is 20±15°, as defined in JIS-8703.

Embodiment 3

Figure 10:
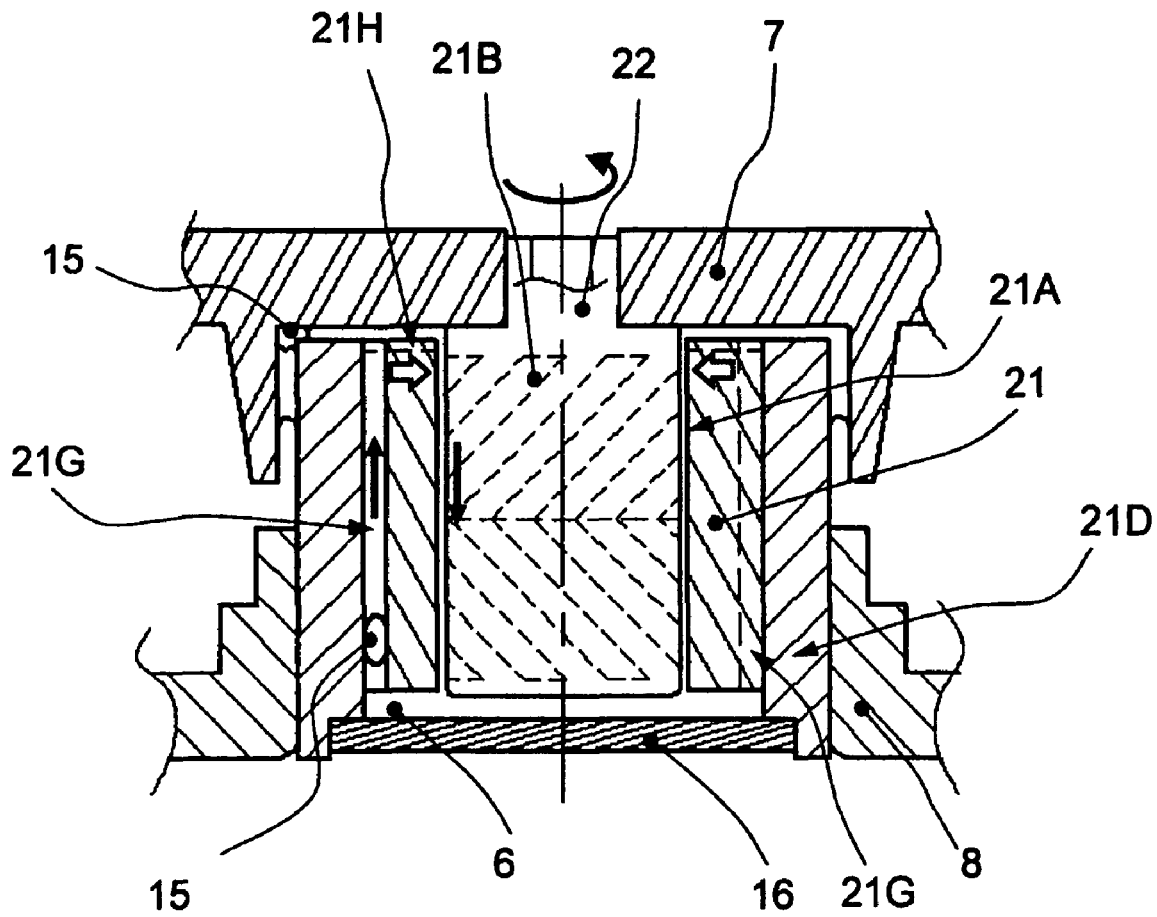
FIG. 10 is a detailed cross-sectional view of the hydrodynamic bearing device in Embodiment 3 of the present invention.
Figure 11:
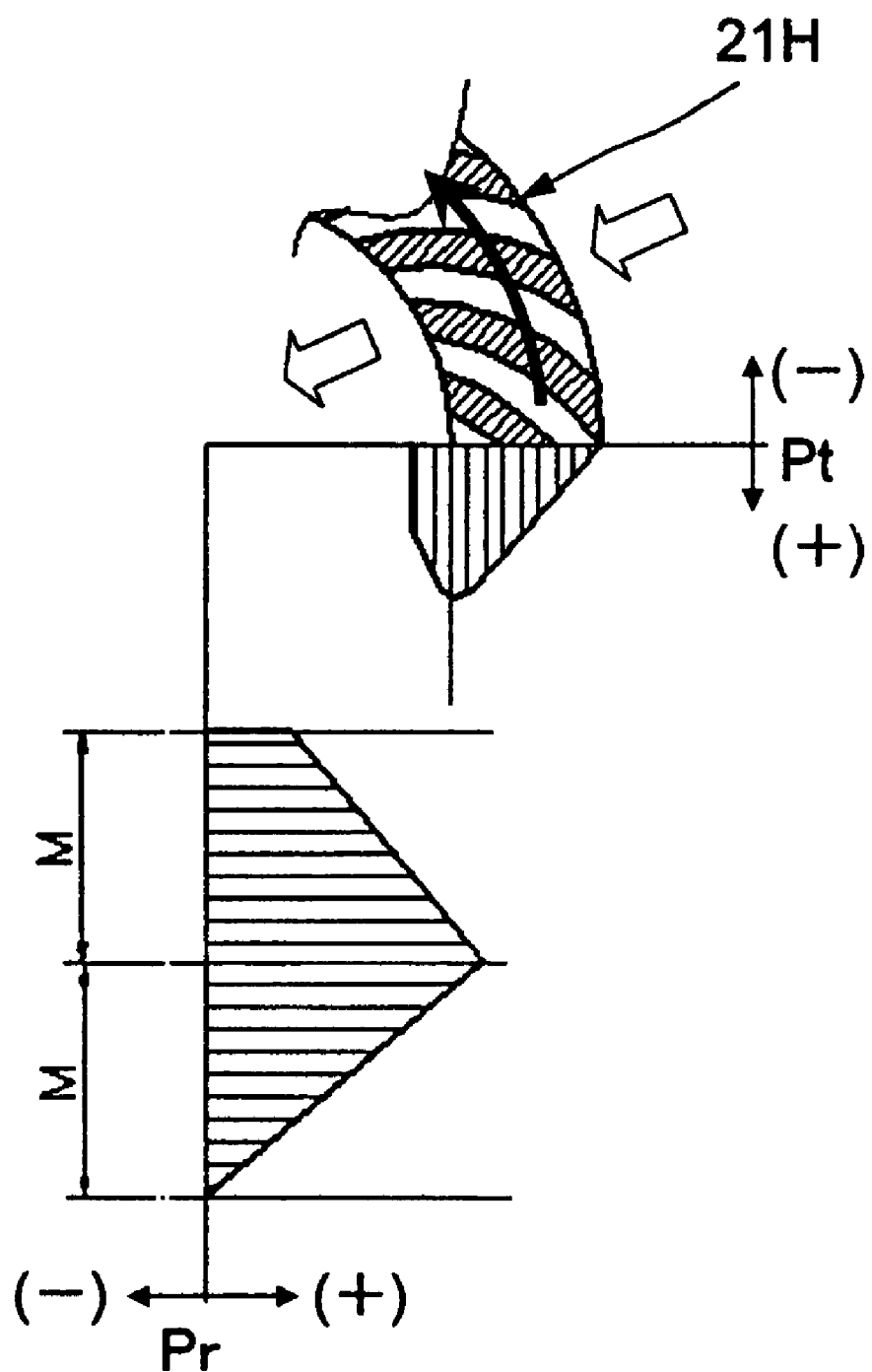
FIG. 11 is a pressure distribution diagram for the hydrodynamic bearing device in FIG. 10.

FIGS. 10 and 11 show Embodiment 3 of the present invention. The hydrodynamic bearing type rotary device of the present invention includes a sleeve 21 configured integrally with a second sleeve 21D, a shaft 22, a cover plate 16, lubricating oil (lubricant) 6, a base 8, and a hub 7, as shown in FIG. 10. The shaft 22 is rotatably inserted into a bearing hole 21A in the sleeve 21. A radial hydrodynamic groove 21B is formed in at least one of the external peripheral surface of the shaft 22 and the internal peripheral surface of the sleeve 21. A thrust hydrodynamic groove 21H is formed on at least one of the bottom surface of the hub 7 and the top surface of the sleeve 21. The cover plate 16 is fixed to the sleeve 21, the second sleeve 21D or a base 28. Bearing portion clearances in the vicinity of at least the hydrodynamic grooves 21B and 21H are filled with the lubricating oil 6. The pouch-shaped bearing portion clearances formed by the sleeve 21, the shaft 22, and the cover plate 16 are also entirely filled with the lubricating oil 6 as necessary. A communicating hole 21G is provided so as to communicate both ends of the bearing portions composed of the radial hydrodynamic groove 21B and the thrust hydrodynamic groove 21H. The numerical symbol 15 denotes an air bubble that is being expelled from the bearing portion interior.

FIGS. 10 and 11 are used herein to describe the operation of the hydrodynamic bearing type rotary device of Embodiment 3 of the present invention.

When the shaft 22 rotates, the thrust hydrodynamic groove 21H creates pressure as shown by Pt in FIG. 11, lifting the shaft 22. The radial hydrodynamic groove 21B creates pressure as shown by Pr in FIG. 11, causing the shaft 22 to rotate without contact. The groove pattern of the radial hydrodynamic groove 21B approximates a herringbone pattern. The groove pattern of the thrust hydrodynamic groove 21H is a spiral pattern. The groove patterns of the radial hydrodynamic groove 21B and the thrust hydrodynamic groove 21H are designed so that when the shaft 22 rotates, the pump force of the radial hydrodynamic groove 21B and the pump force of the thrust hydrodynamic groove 21H combine to convey the lubricating oil 6 in the direction of the black arrows shown in FIGS. 10 and 11. The lubricating oil 6 is then repeatedly circulated while flowing into the communicating hole 21G sequentially through the thrust hydrodynamic groove 21H and the bearing hole 21A.

The radial hydrodynamic groove 21B has a symmetrical herringbone pattern in which the top half (M in FIG. 11) and the bottom half (M in FIG. 11) are substantially equal in length, as shown in FIG. 11. The thrust hydrodynamic groove 21H also has a spiral pattern as shown in FIG. 11. The rotation of the shaft 22 causes the lubricating oil 6 in the radial hydrodynamic groove 21B and thrust hydrodynamic groove 21H to flow and circulate in the direction of the black arrow shown in FIG. 10. This brings about a pressure distribution such as is shown in Pr(+) in FIG. 11 between the radial bearing portion and the thrust bearing portion. A characteristic of such a pressure distribution is that there are no low-pressure parts in the bearing portion clearances. Therefore, air bubbles 15 trapped in the lubricating oil 6 are expelled smoothly through the clearance between the hub 7 and the second sleeve 21D to the outside. As a result, the oil film in the bearing portion clearances can be prevented from breaking, and there is no need for concern over the bearing portions being worn down.

The thrust hydrodynamic groove 21H was described as having a spiral pattern, but may also have an asymmetrical herringbone pattern.

Embodiment 4

Figure 12:
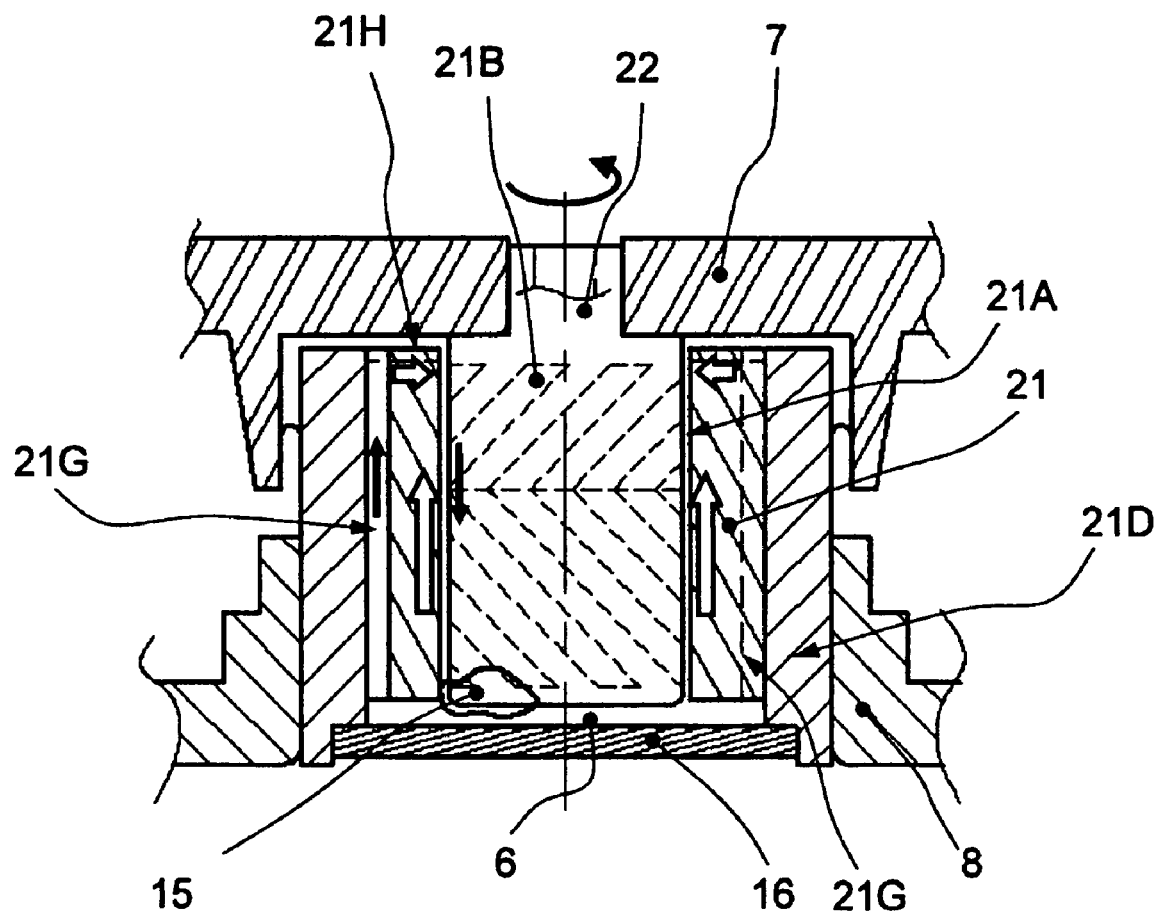
FIG. 12 is a detailed cross-sectional view of the hydrodynamic bearing device in Embodiment 4 of the present invention.
Figure 13:
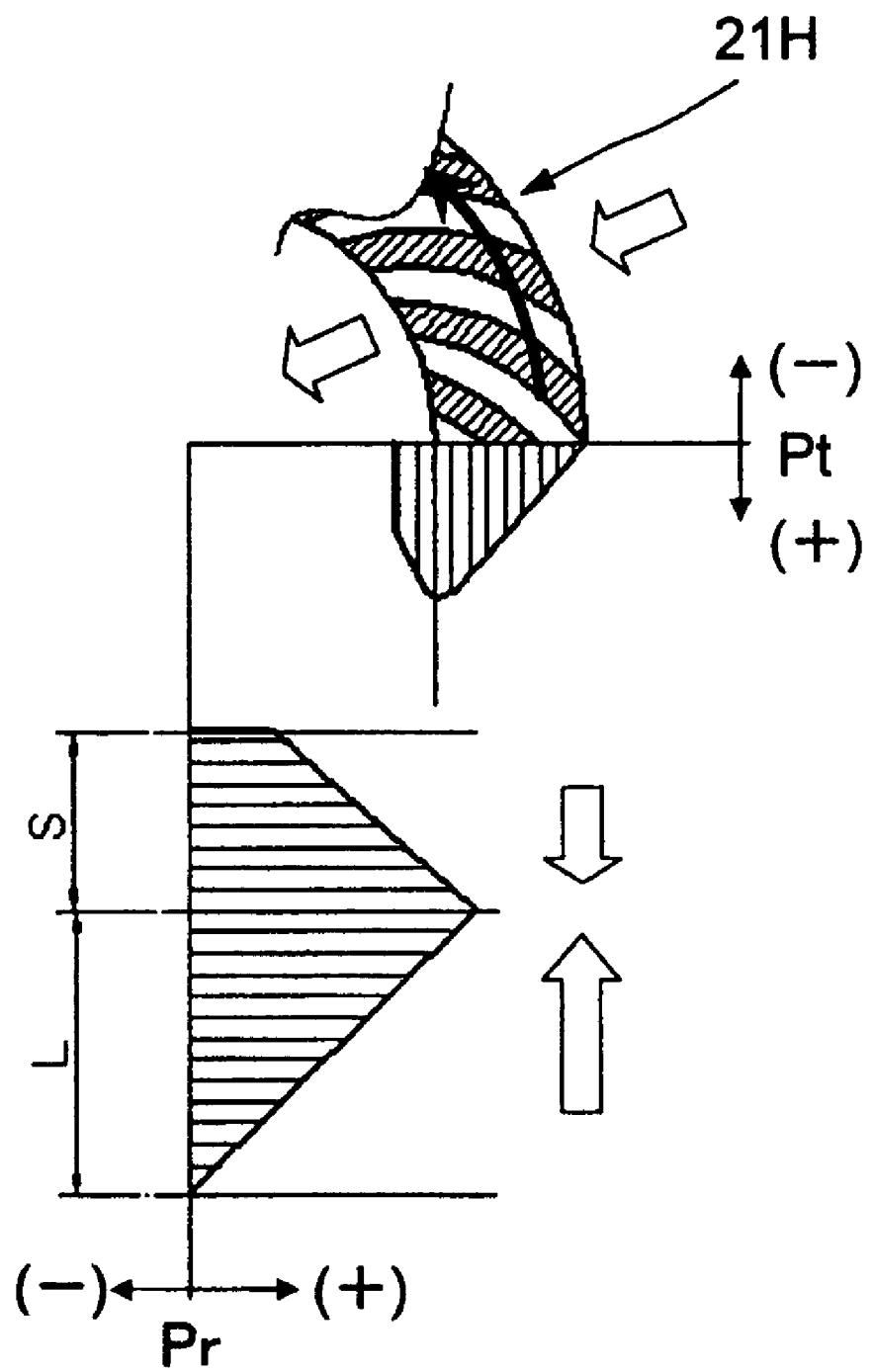
FIG. 13 is a pressure distribution diagram for the hydrodynamic bearing device in FIG. 12.

FIGS. 12 and 13 show the configuration of Embodiment 4 of the present invention. This configuration is identical to that of Embodiment 3 of the present invention shown in FIGS. 10 and 11, wherein the radial hydrodynamic groove 21B has an asymmetrical herringbone pattern in which the bottom half shown in FIG. 13 (L in FIG. 13) is longer than the top half (S in FIG. 13). The thrust hydrodynamic groove 21H has a spiral pattern as shown in FIG. 13, and the rotation of the shaft 22 creates pressure in a direction that pushes the flow channels of the radial hydrodynamic groove 21B and thrust hydrodynamic groove 21H together. Since the force of the radial hydrodynamic groove 21B that feeds the lubricating oil(lubricant) 6 is less than the same force of the thrust hydrodynamic groove 21H, the lubricating oil 6 is made to flow and circulate as shown by the direction of the black arrow in FIG. 12. This brings about a pressure distribution such as is shown in Pr(+) in FIG. 13 between the radial bearing portion and the thrust bearing portion. A characteristic of such a pressure distribution is that there are no low-pressure parts in the bearing portion clearances. Therefore, air bubbles 15 trapped in the lubricating oil 6 do not collect in low-pressure parts in the bearing portion clearances, but are expelled stochastically through the clearance between the second sleeve 21D and the hub 27 to the outside of the bearing portion. As a result, the oil film in the bearing portion clearances can be prevented from breaking, and there is no need for concern over the bearing portions being worn down.

The thrust hydrodynamic groove 21H was described as having a spiral pattern, but may also have an asymmetrical herringbone pattern.

Embodiment 5

Figure 14:
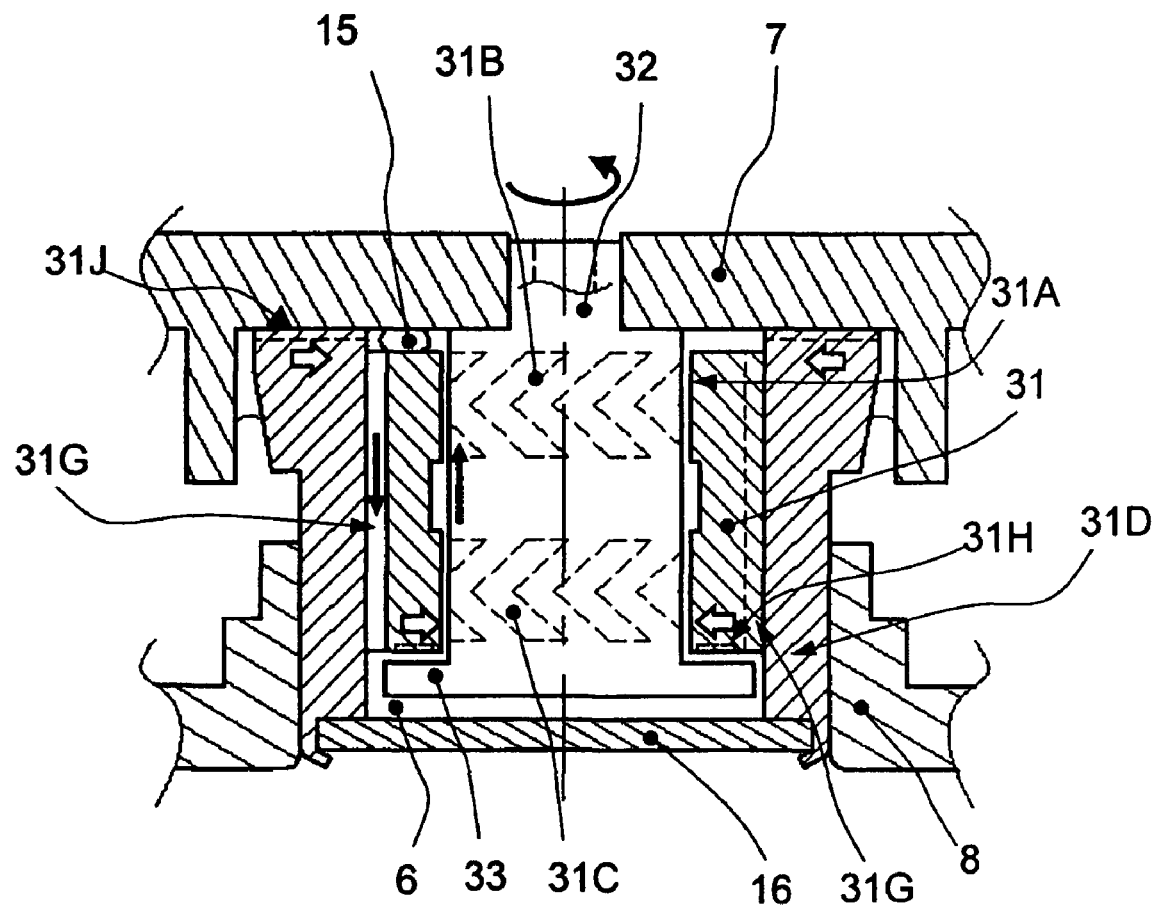
FIG. 14 is a detailed cross-sectional view of the hydrodynamic bearing device in Embodiment 5 of the present invention.
Figure 15:
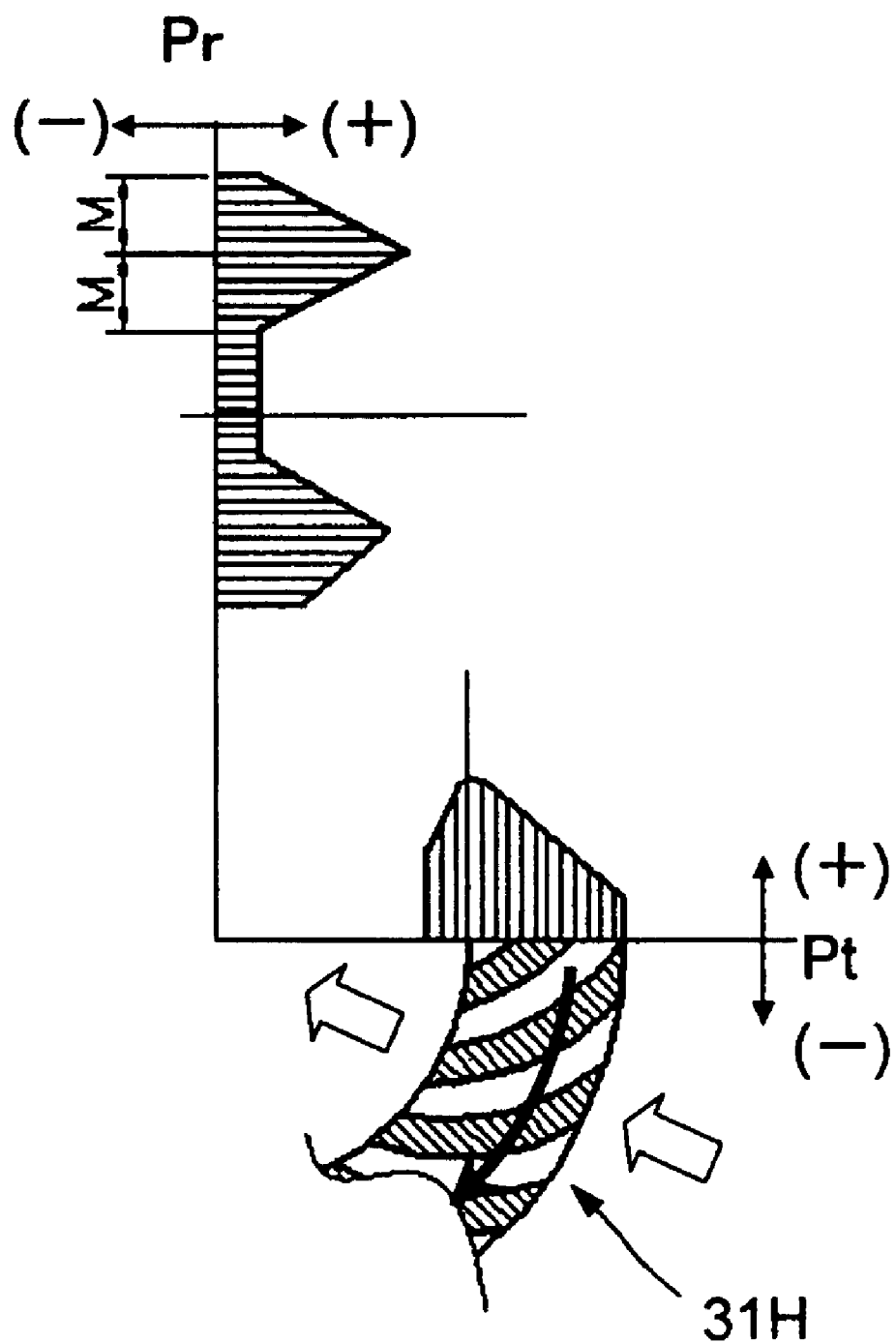
FIG. 15 is a pressure distribution diagram for the hydrodynamic bearing device in FIG. 14.

FIGS. 14 and 15 show Embodiment 5 of the present invention. The hydrodynamic bearing type rotary device of the present invention includes a sleeve 31 configured integrally with a second sleeve 31D, a shaft 32, a flange 33, a cover plate 16, lubricating oil(lubricant) 6, a base 8, and a hub 7, as shown in FIG. 14. The shaft 32 is integrated with the flange 33 and is rotatably inserted into a bearing hole 31A in the sleeve 31. Radial hydrodynamic grooves 31B and 31C are formed in at least one of the external peripheral surface of the shaft 32 and the internal peripheral surface of the sleeve 31. A main thrust hydrodynamic groove 31J is formed in at least one of the bottom surface of the hub 7 and the top surface of the second sleeve 31D. A sub-thrust hydrodynamic groove 31H is provided in at least one of the bottom surface of the sleeve 31 and the opposite surface of the flange 33. The cover plate 16 is fixed to the sleeve 31, the second sleeve 31D or the base 8. Bearing portion clearances in proximity to at least the hydrodynamic grooves 31B, 31C, 31J, and 31H are filled with lubricating oil 6. The pouch-shaped bearing portion clearances formed by the sleeve 31, the shaft 32, and the cover plate 16 are also entirely filled with lubricating oil 6 as necessary. A communicating hole 31G is provided to communicate both ends of a bearing portion composed of the radial hydrodynamic grooves 31B and 32C and the sub-thrust hydrodynamic groove 31H. The numerical symbol 15 denotes an air bubble that is being expelled from the interior of the bearing portion.

FIGS. 14 and 15 are used herein to describe the operation of the hydrodynamic bearing type rotary device of Embodiment 5 of the present invention. When the shaft 32 rotates, the sub-thrust hydrodynamic groove 31H creates pressure as shown by Pt in FIG. 15, lifting the shaft 32. The radial hydrodynamic groove 31B creates pressure as shown by Pr, causing the shaft 32 to rotate without contact. The groove pattern of the radial hydrodynamic groove 31B approximates a herringbone pattern. The groove pattern of the sub-thrust hydrodynamic groove 31H approximates a spiral pattern. The groove patterns of the radial hydrodynamic groove 31B and the sub-thrust hydrodynamic groove 31H are designed so that when the shaft 32 rotates, the pump force of the radial hydrodynamic groove 31B and the pump force of the sub-thrust hydrodynamic groove 31H combine to convey the lubricating oil 6 in the direction of the black arrow shown in FIG. 14. The lubricating oil 6 is then repeatedly circulated while flowing into the communicating hole 31G sequentially through the sub-thrust hydrodynamic groove 31H and the bearing hole 31A.

The radial hydrodynamic groove 31B has a symmetrical herringbone pattern in which the top half (M in FIG. 15) and the bottom half (M in FIG. 15) are substantially equal in length, as shown in FIG. 15. The sub-thrust hydrodynamic groove 31H also has a spiral pattern as shown in FIG. 15. The rotation of the shaft 32 causes the lubricating oil 6 in the radial hydrodynamic groove 31B and sub-thrust hydrodynamic groove 31H to flow and circulate. This brings about a pressure distribution such as is shown in Pr(+) in FIG. 15 between the radial bearing portion and the thrust bearing portion. A characteristic of such a pressure distribution is that there are no low-pressure parts in the bearing portion clearances. Therefore, air bubbles 15 trapped in the lubricating oil 6 are expelled smoothly through the clearance between the hub 7 and the second sleeve 31D to the outside. As a result, the oil film in the bearing portion clearances can be prevented from breaking, and there is no need for concern over the bearing portions being worn down.

The thrust hydrodynamic groove 31H was described as having a spiral pattern, but may also have an asymmetrical herringbone pattern.

Embodiment 6

Figure 16:
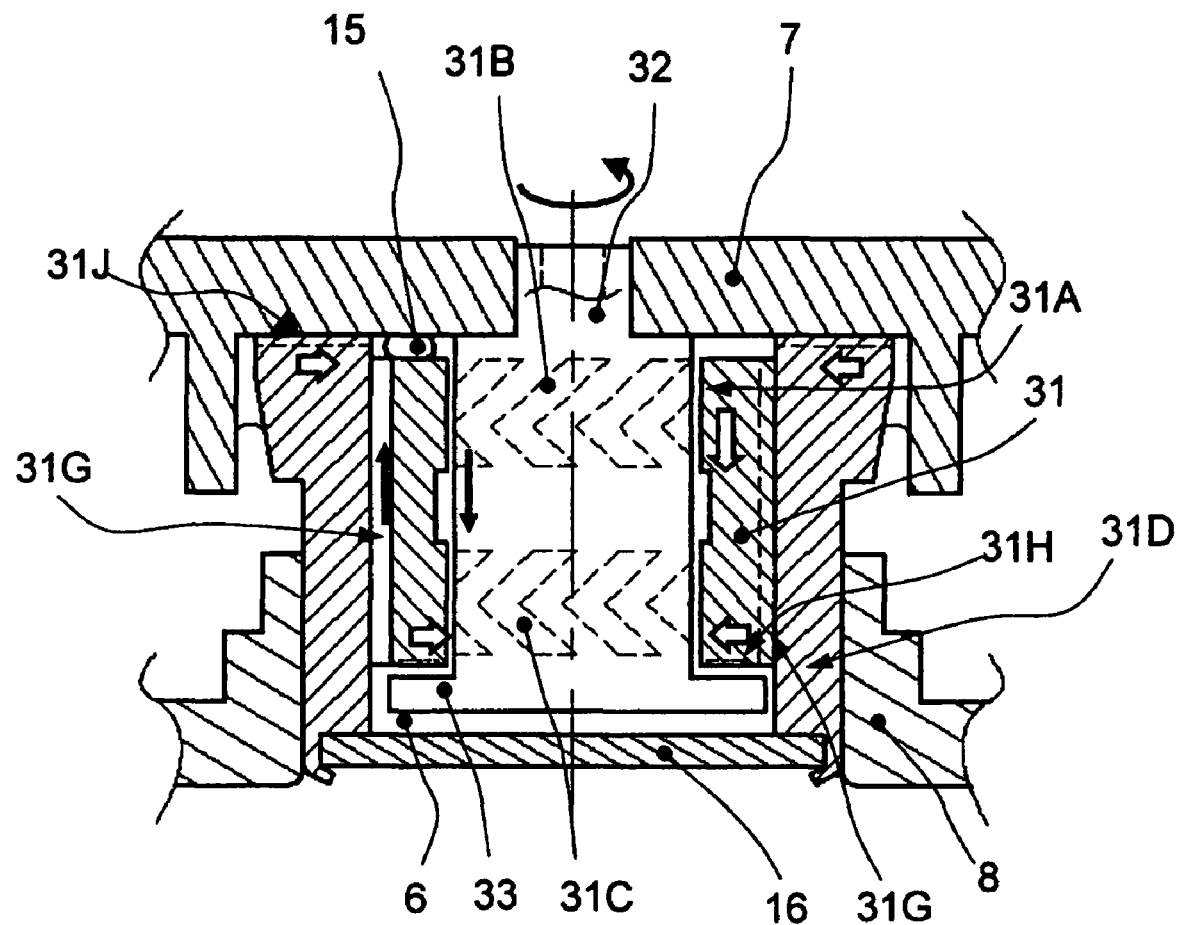
FIG. 16 is a detailed cross-sectional view of the hydrodynamic bearing device in Embodiment 6 of the present invention.
Figure 17:
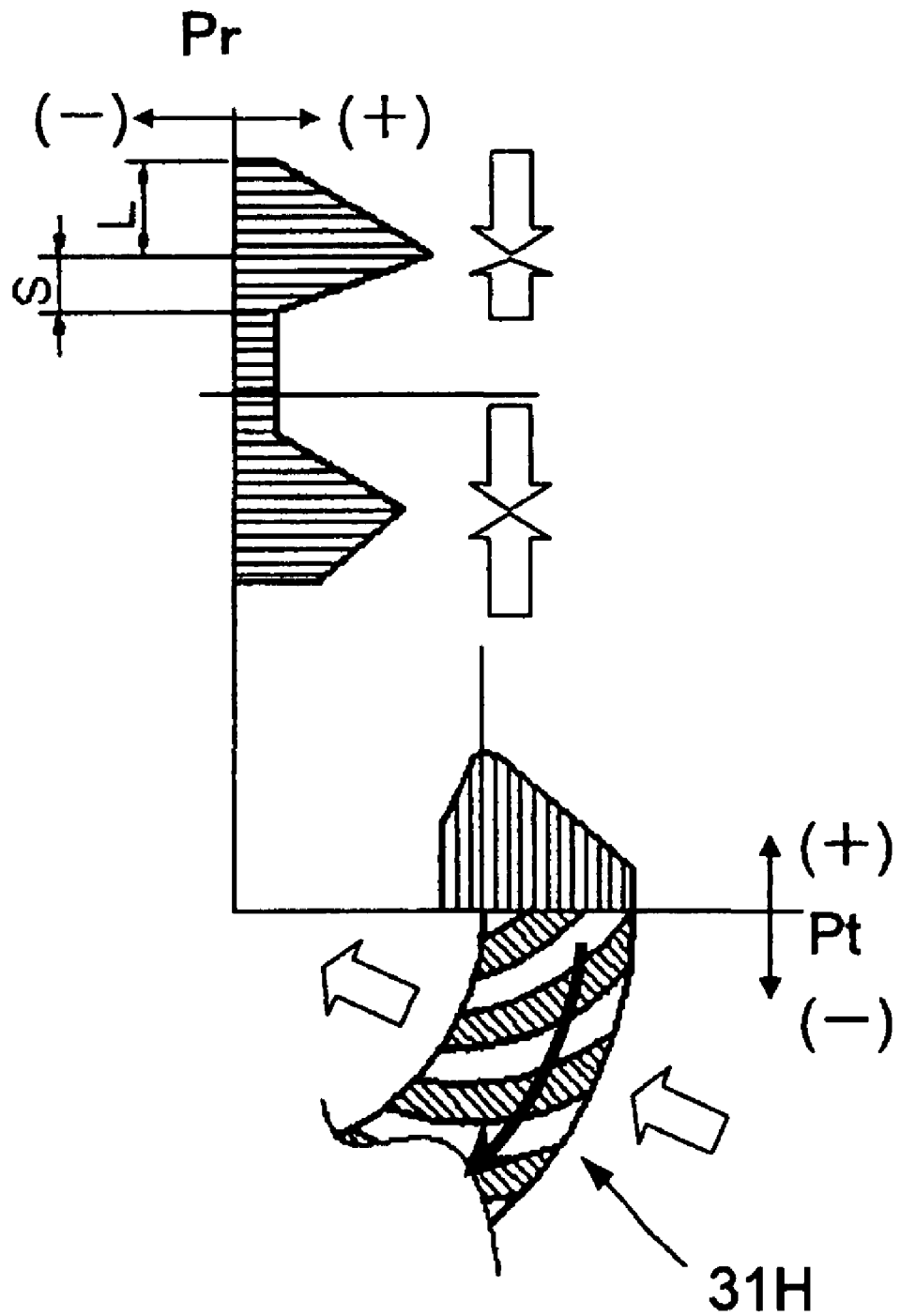
FIG. 17 is a pressure distribution diagram for the hydrodynamic bearing device in FIG. 16.

FIGS. 16 and 17 show the configuration of Embodiment 6 of the present invention. This configuration is identical to that of Embodiment 5 of the present invention shown in FIGS. 14 and 15, wherein the radial hydrodynamic groove 31B has an asymmetrical herringbone pattern in which the top half shown in FIG. 17 (L in FIG. 17) is longer than the bottom half (S in FIG. 17). The sub-thrust hydrodynamic groove 31H has a spiral pattern as shown in FIG. 17, and the rotation of the shaft 32 causes the lubricating oil (lubricant) 6 to flow and circulate in the direction of the black arrows shown in FIG. 16. This brings about a pressure distribution such as is shown in Pr(+) in FIG. 17 between the radial bearing portion and the thrust bearing portion. A characteristic of such a pressure distribution is that there are no low-pressure parts in the bearing portion clearances. Therefore, air bubbles 15 trapped in the lubricating oil 6 do not collect in low-pressure parts in the bearing portion clearances, but are instead expelled through the clearance between the hub 7 and the second sleeve 31D to the outside. As a result, the oil film in the bearing portion clearances can be prevented from breaking, and there is no need for concern over the bearing portions being worn down.

The sub-thrust hydrodynamic groove 31H was described as having a spiral pattern, but may also have an asymmetrical herringbone pattern.

Embodiment 7

Figure 18:
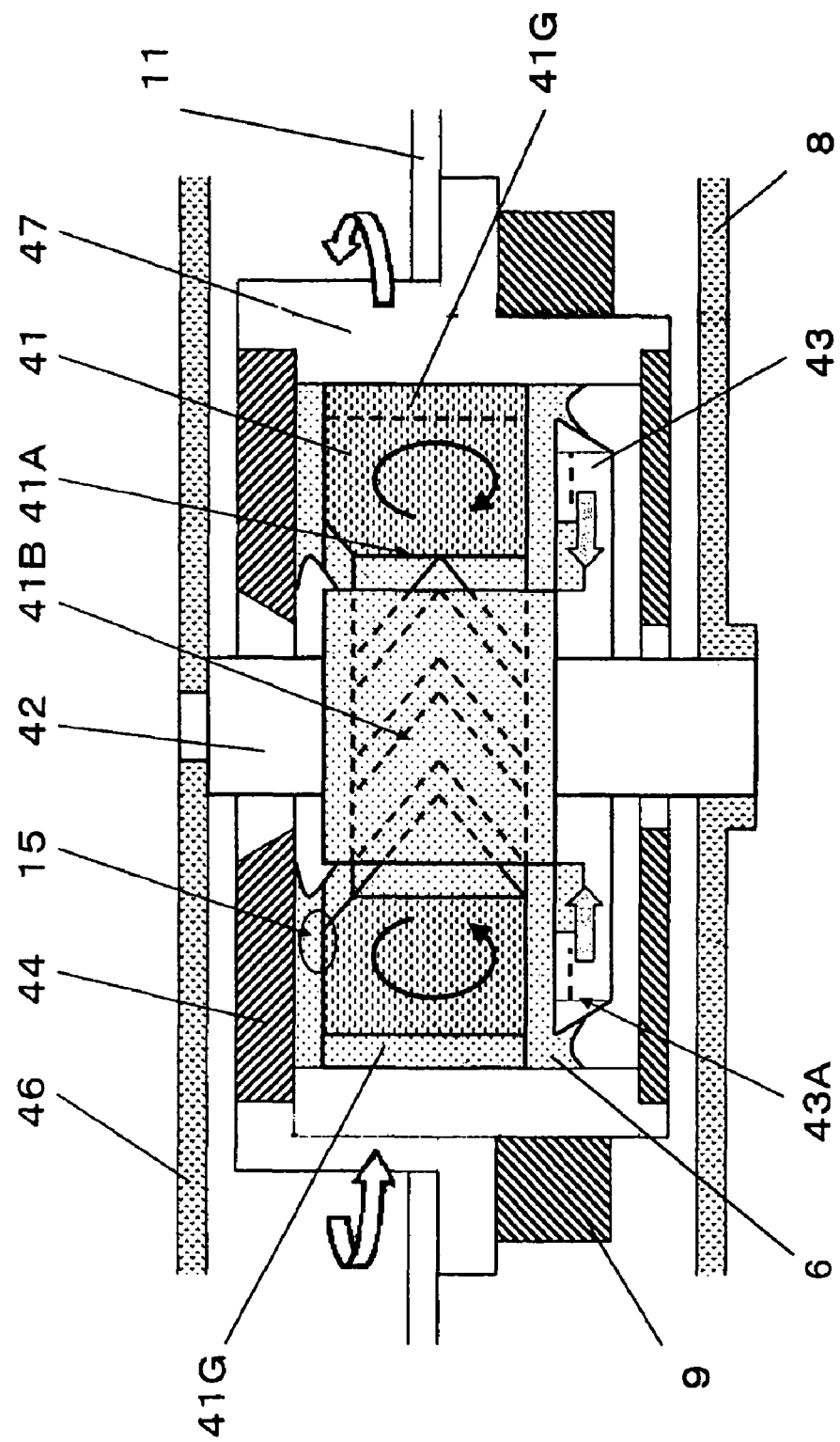
FIG. 18 is a detailed cross-sectional view of the hydrodynamic bearing device in Embodiment 7 of the present invention.
Figure 19:
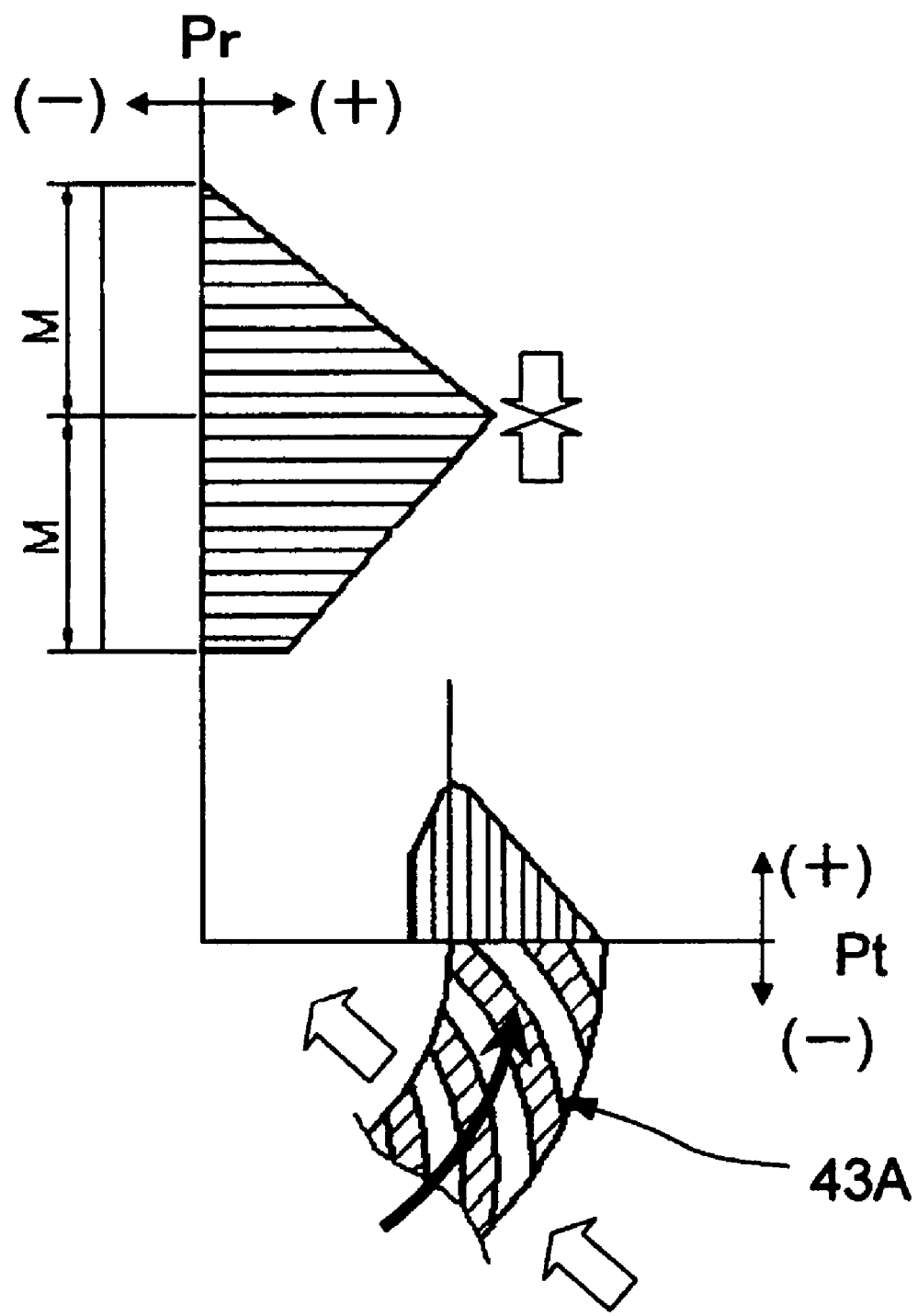
FIG. 19 is a pressure distribution diagram for the hydrodynamic bearing device in FIG. 18.

FIGS. 18 and 19 show the configuration of Embodiment 7 of the present invention. The hydrodynamic bearing type rotary device of the present invention includes a shaft 42, a flange 43, a sleeve 41, lubricating oil (lubricant) 6, a top cover 44, a hub 47, and a base 8, as shown in FIG. 18. A recording disk 11 and a rotor magnet 9 are attached to the hub 47. A lid 46 is attached to the base 8. The shaft 42 is integrated with the flange 43, and the shaft 42 is inserted into a bearing hole 41A in the sleeve 41 and is capable of rotating relative to the bearing hole. The flange 43 faces the bottom surface of the sleeve 41 and forms a bearing portion. A radial hydrodynamic groove 41B is formed in at least one of the external peripheral surface of the shaft 42 and the internal peripheral surface of the sleeve 41. A thrust hydrodynamic groove 43A is provided in at least one of the bottom surface of the sleeve 41 and the top surface of the flange 43. The top cover 44 forms a clearance with the sleeve 41 and is fixed to either the sleeve 41 or the hub 47. The shaft 42 is fixed to the base 8. The disk 11 and the rotor magnet 9 are attached to the hub 47. A stator (not shown) is fixed to the base 8 at a position that faces the external peripheral surface of the rotor magnet 9. The rotor magnet 9 generates suction force in the axial direction, which is downward in FIG. 18, pushing the sleeve 41 toward the flange 43 with a force of about 10 to 50 grams. The bearing portion clearances formed by the sleeve 41, the shaft 42, and the top cover 44 are entirely filled with lubricating oil 6 as necessary. A communicating hole 41G is provided to communicate both ends of a bearing portion composed of the radial hydrodynamic groove 41B and the thrust hydrodynamic groove 43A. The numerical symbol 15 denotes an air bubble trapped inside the bearing portion.

The following is a description of the operation of the hydrodynamic bearing type rotary device of Embodiment 7 of the present invention shown in FIGS. 18 and 19. When the sleeve 41 rotates, the thrust hydrodynamic groove 43A creates pressure as shown by Pt in FIG. 19, lifting the sleeve 41. The radial hydrodynamic groove 41B creates pressure as shown by Pr in FIG. 19, causing the sleeve 41 to rotate without contact. The groove pattern of the radial hydrodynamic groove 41B approximates a herringbone pattern. The groove pattern of the thrust hydrodynamic groove 43A approximates a spiral pattern. The groove patterns of the radial hydrodynamic groove 41B and the thrust hydrodynamic groove 43A are designed so that the pump force of the radial hydrodynamic groove 41B and the pump force of the thrust hydrodynamic groove 43A combine to circulate the lubricating oil 6 in the direction of the black arrows shown in FIG. 18. The lubricating oil 6 is then repeatedly circulated while flowing into the communicating hole 41G through the thrust hydrodynamic groove 43A and the bearing hole 41A.

The radial hydrodynamic groove 41B has a symmetrical herringbone pattern in which the top half (M in FIG. 19) and the bottom half (M in FIG. 19) are substantially equal in length, as shown in FIG. 19. The thrust hydrodynamic groove 43A also has a spiral pattern as shown in FIG. 19. The rotation of the sleeve 41 causes the radial hydrodynamic groove 41B and the thrust hydrodynamic groove 43A to bring about a pressure distribution such as is shown in Pr(+) in FIG. 19 between the radial bearing portion and the thrust bearing portion. A characteristic of such a pressure distribution is that there are no low-pressure parts in the bearing portion clearances. Therefore, air bubbles 15 trapped in the lubricating oil 6 do not collect in low-pressure parts in the bearing portion clearances, but are instead expelled smoothly through the clearance between the shaft 42 and the top cover 44 to the outside. As a result, the oil film in the bearing portion clearances can be prevented from breaking, and there is no need for concern over the bearing portions being worn down.

The thrust hydrodynamic groove 43A was described as having a spiral pattern, but may also have an asymmetrical herringbone pattern.

Embodiment 8

Figure 20:
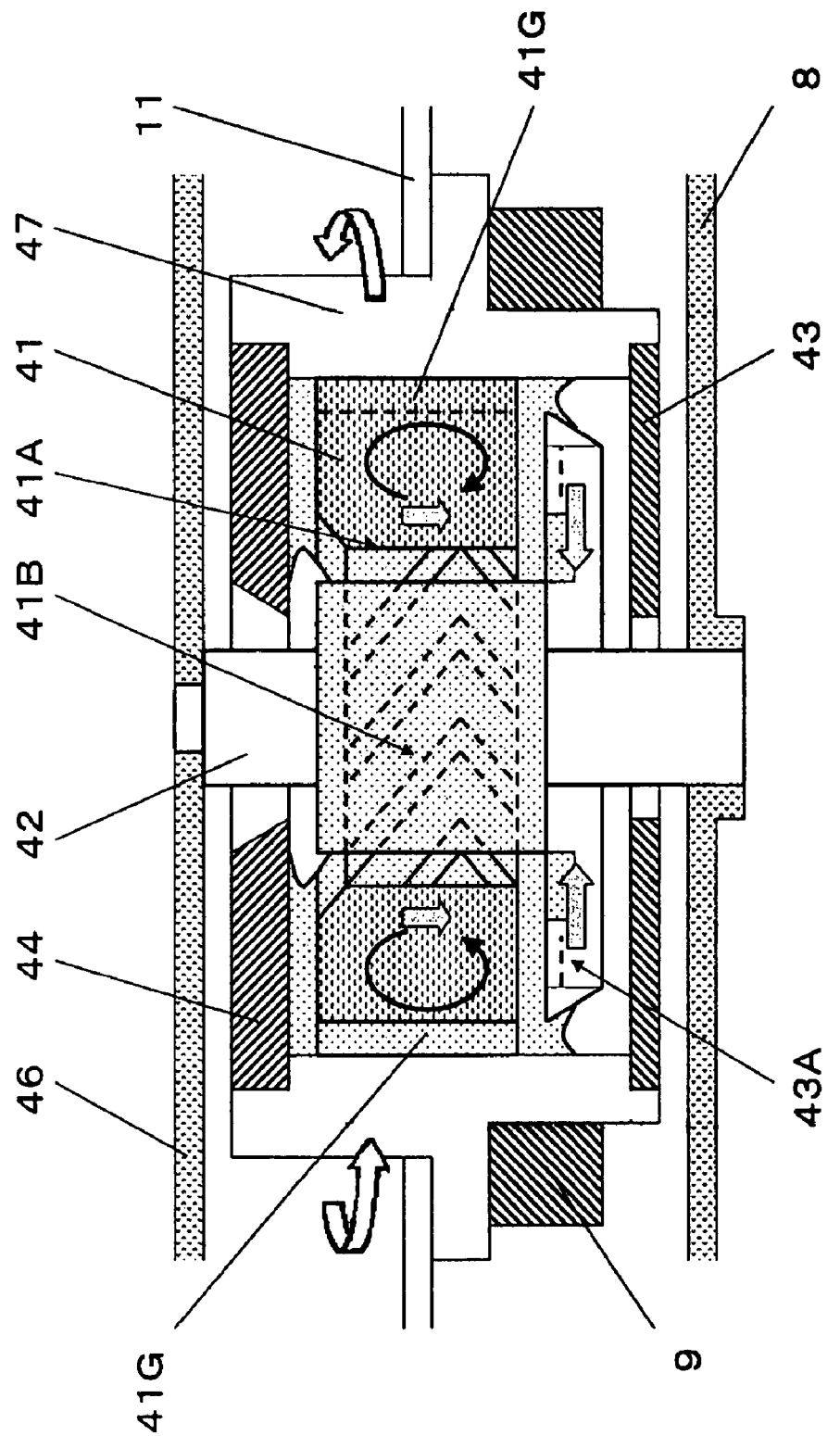
FIG. 20 is a detailed cross-sectional view of the hydrodynamic bearing device in Embodiment 8 of the present invention.
Figure 21:
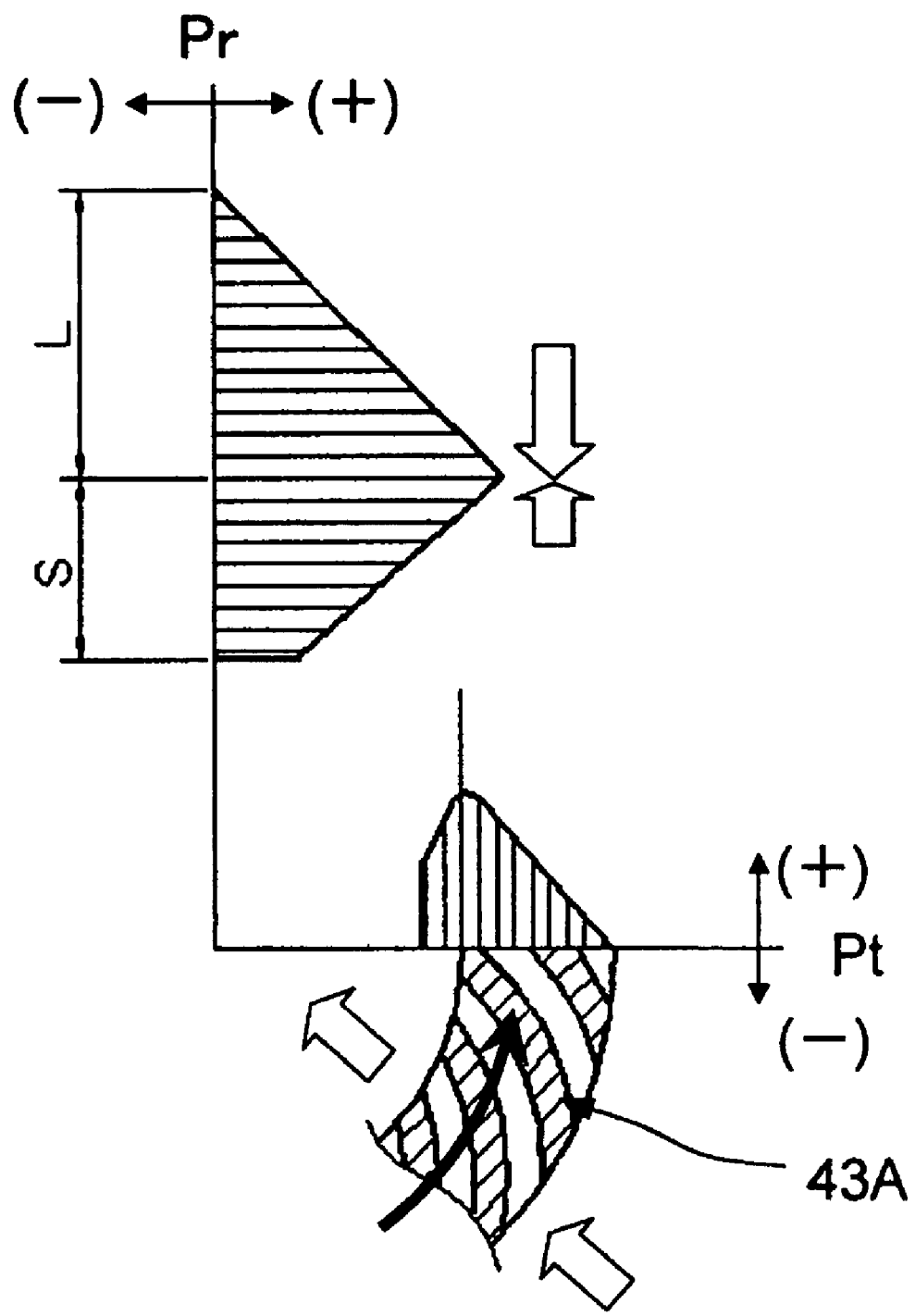
FIG. 21 is a pressure distribution diagram for the hydrodynamic bearing device in FIG. 20.

FIGS. 20 and 21 show the configuration of Embodiment 8 of the present invention, and this configuration is substantially identical to that of Embodiment 7 of the present invention in FIGS. 18 and 19. The radial hydrodynamic groove 41B has an asymmetrical herringbone pattern in which the top half (L in FIG. 21) is longer than the bottom half (S in FIG. 21) as shown in FIG. 21. The thrust hydrodynamic groove 43A has a spiral pattern as shown in FIG. 21. The rotation of the shaft 42 creates pressure in a direction that pushes the flow channels of the radial hydrodynamic groove 41B and the thrust hydrodynamic groove 43A together. Since the force of the radial hydrodynamic groove 41B that feeds lubricating oil (lubricant) 6 is less than the same force of the thrust hydrodynamic groove 43A, the radial hydrodynamic groove 41B causes the lubricating oil 6 to flow and circulate in the direction of the black arrow shown in FIG. 21. The radial hydrodynamic groove 41B and the thrust hydrodynamic groove 43A thereby bring about a pressure distribution such as is shown in Pr(+) in FIG. 21 between the radial bearing portion and the thrust bearing portion. A characteristic of such a pressure distribution is that there are no low-pressure parts in the bearing portion clearances. Therefore, air bubbles 15 trapped in the lubricating oil 6 are expelled smoothly from the bearing portion clearances through the clearance between the shaft 42 and the top cover 44 to the outside. As a result, the oil film in the bearing portion clearances can be prevented from breaking, and there is no need for concern over the bearing portions being worn down.

The thrust hydrodynamic groove 43A was described as having a spiral pattern, but may also have an asymmetrical herringbone pattern.

Embodiment 9

Figure 22:
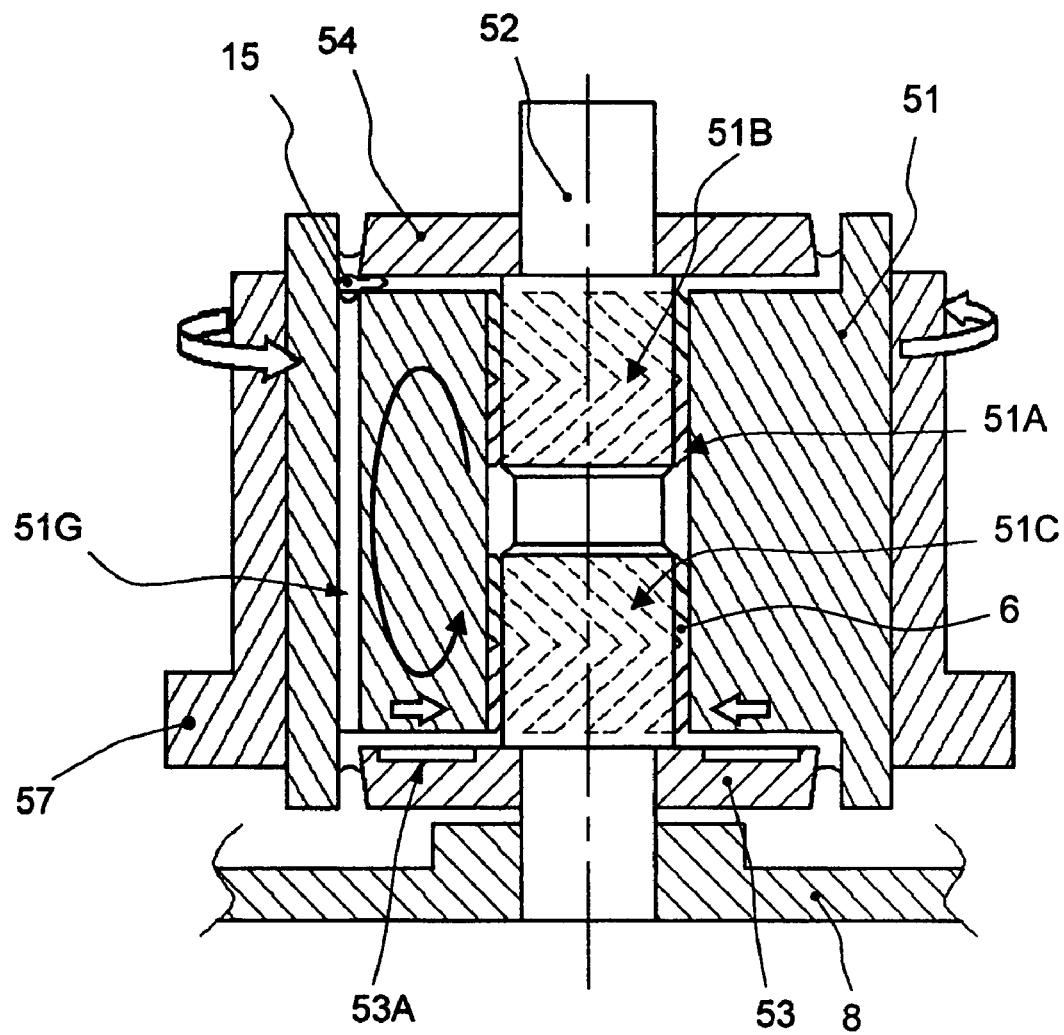
FIG. 22 is a detailed cross-sectional view of the hydrodynamic bearing device in Embodiment 9 of the present invention.
Figure 23:
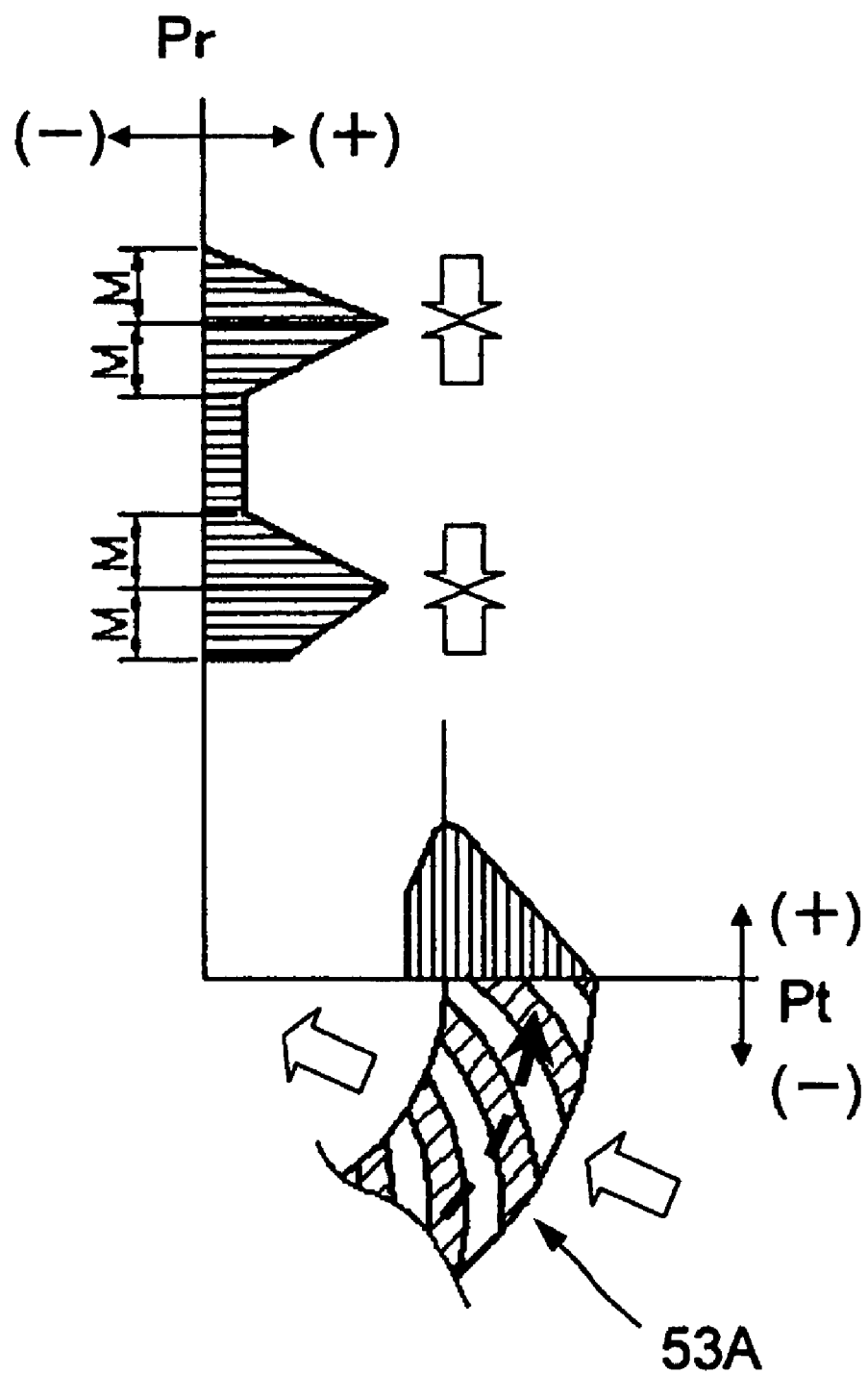
FIG. 23 is a pressure distribution diagram for the hydrodynamic bearing device in FIG. 22.

FIGS. 22 and 23 show the structure of Embodiment 9 of the present invention. The hydrodynamic bearing type rotary device of the present invention includes a shaft 52, a flange 53, a sleeve 51, lubricating oil (lubricant) 6, a top cover 54, a hub 57, and a base 8, as shown in FIG. 22. The shaft 52 is integrated with the flange 53, and the shaft 52 is inserted into a bearing hole 51A in the sleeve 51 and is capable of rotating relative to the bearing hole. The flange 53 faces the bottom surface of the sleeve 51 and forms a bearing portion. Radial hydrodynamic grooves 51B and 51C are formed in at least one of the external peripheral surface of the shaft 52 and the internal peripheral surface of the sleeve 51. A thrust hydrodynamic groove 53A is provided in at least one of the bottom surface of the sleeve 51 and the top surface of the flange 53. The top cover 54 forms a clearance with the sleeve 51 and is fixed to either the sleeve 51 or the hub 57. The shaft 52 is fixed to the base 8. A disk (not shown) and a rotor magnet (not shown) are attached to the hub 57. A stator (not shown) is fixed to the base 8 at a position that faces a rotor magnet. The bearing portion clearances formed by the sleeve 51, the shaft 52, and the top cover 54 are entirely filled with lubricating oil 6 as necessary. A communicating hole 51G is provided to communicate both ends of a bearing portion composed of the radial hydrodynamic grooves 51B and 51C and the thrust hydrodynamic groove 53A. The numerical symbol 15 denotes an air bubble that is being expelled from inside the bearing portion.

The following is a description of the operation of the hydrodynamic bearing type rotary device of shown in FIGS. 22 and 23. When the sleeve 51 rotates, the thrust hydrodynamic groove 53A creates pressure as shown by Pt in FIG. 23, lifting and rotating the sleeve 51. The radial hydrodynamic grooves 51B and 51C create pressure as shown by Pr in FIG. 23, causing the sleeve 51 to rotate without contact. The groove patterns of the radial hydrodynamic groove 51B and 51C are something of herringbone patterns. The groove pattern of the thrust hydrodynamic groove 53A approximates a spiral pattern. The groove patterns of the radial hydrodynamic grooves 51B and 51C and the thrust hydrodynamic groove 53A are designed so that the pump force of the radial hydrodynamic grooves 51B and 51C and the pump force of the thrust hydrodynamic groove 53A combine to circulate the lubricating oil 6 in the direction of the black arrow shown in FIG. 22. The lubricating oil 6 is then repeatedly circulated while flowing into the communicating hole 51G through the thrust hydrodynamic groove 53A and the bearing hole 51A.

The radial hydrodynamic groove 51B has a symmetrical herringbone pattern in which the top half (M in FIG. 23) and the bottom half (M in FIG. 23) are substantially equal in length, as shown in FIG. 23. The thrust hydrodynamic groove 53A also has a spiral pattern as shown in FIG. 23. The rotation of the sleeve 51 causes the radial hydrodynamic grooves 51B and 51C and the thrust hydrodynamic groove 53A to bring about a pressure distribution such as is shown in Pr(+) in FIG. 23 between the radial bearing portion and the thrust bearing portion. A characteristic of such a pressure distribution is that there are no low-pressure parts in the bearing portion clearances. Therefore, air bubbles 15 trapped in the lubricating oil 6 are expelled smoothly through the clearance between the external peripheral surface of the top cover 54 and the opposite surface of the sleeve 51 to the outside. As a result, the oil film in the bearing portion clearances can be prevented from breaking, and there is therefore no need for concern over the bearing portions being worn down.

The thrust hydrodynamic groove 53A was described as having a spiral pattern, but may also have an asymmetrical herringbone pattern.

Embodiment 10

Figure 24:
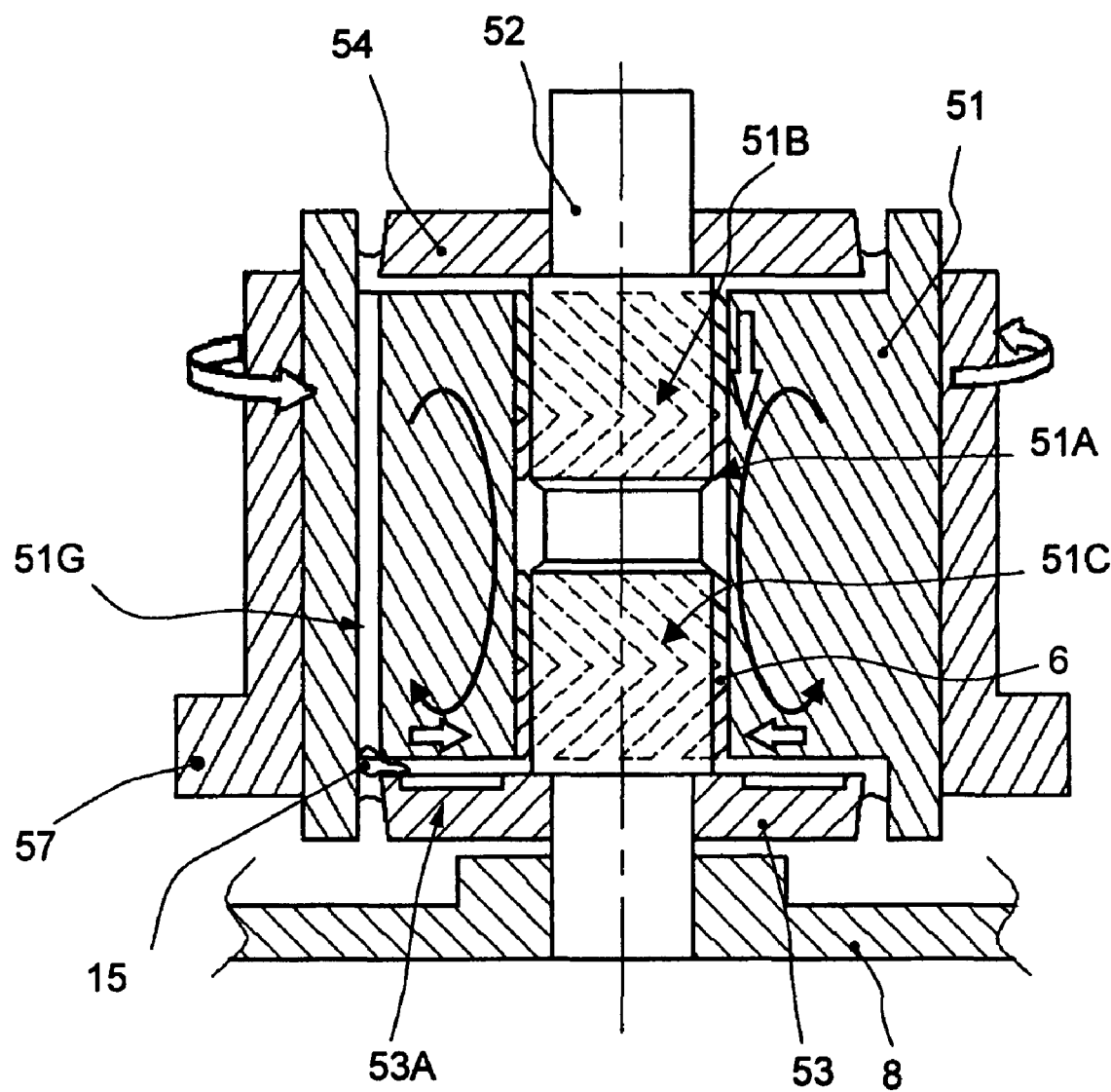
FIG. 24 is a detailed cross-sectional view of the hydrodynamic bearing device in Embodiment 10 of the present invention.
Figure 25:
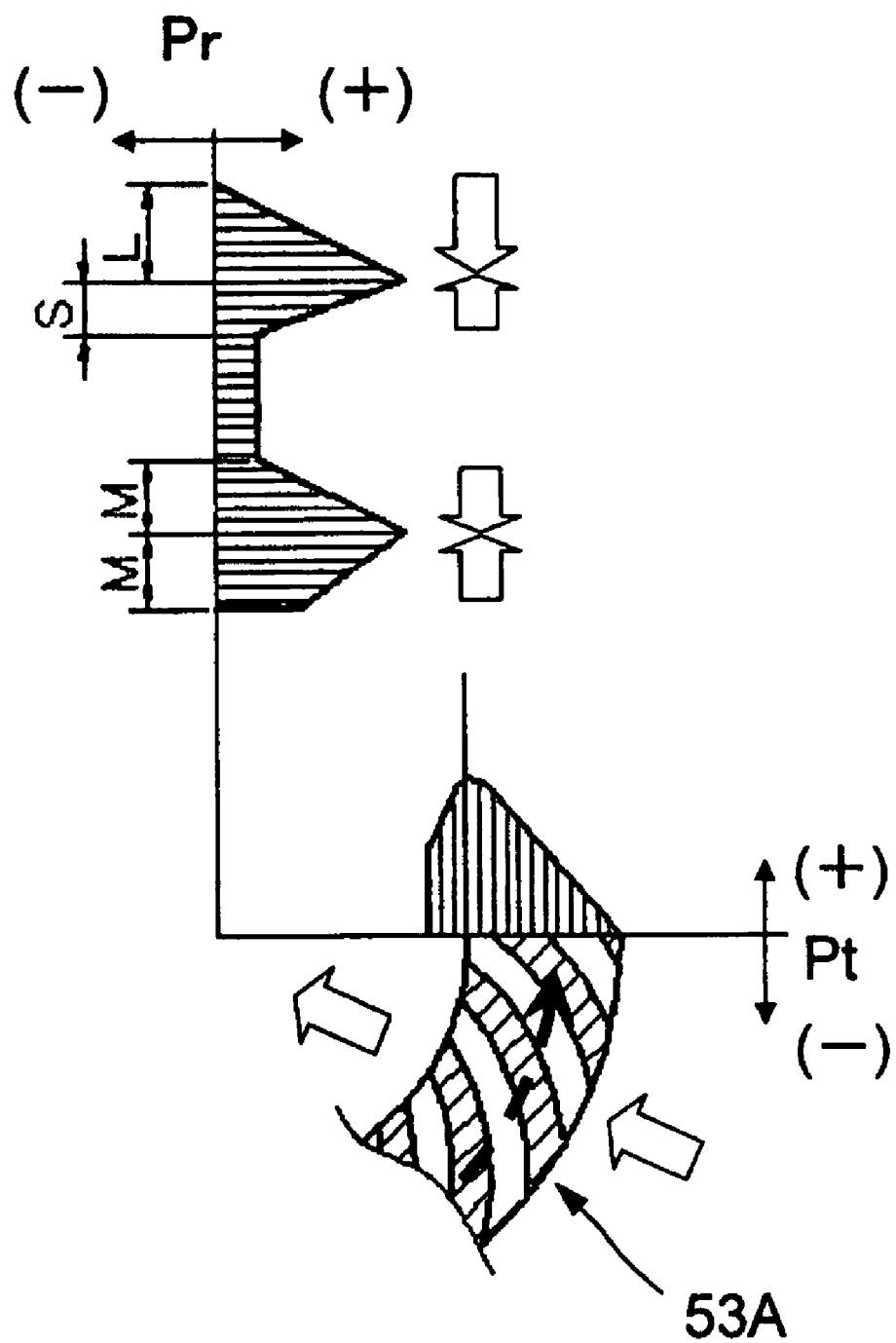
FIG. 25 is a pressure distribution diagram for the hydrodynamic bearing device in FIG. 24.

FIGS. 24 and 25 show Embodiment 10 of the present invention, wherein the configuration is identical to that of the Embodiment of the present invention shown in FIGS. 22 and 23. The radial hydrodynamic groove 51B has an asymmetrical herringbone pattern in which the top half (L in FIG. 25) is longer than the bottom half (S in FIG. 25) as shown in FIG. 25. The thrust hydrodynamic groove 53A has a spiral pattern as shown in FIG. 25. The rotation of the shaft 52 creates pressure in a direction that pushes the flow channels of the radial hydrodynamic groove 51B and the thrust hydrodynamic groove 53A together. Since the force of the radial hydrodynamic groove 51B that feeds lubricating oil is greater than the same force of the thrust hydrodynamic groove 53A, the radial hydrodynamic groove 51B causes the lubricating oil 6 to flow and circulate in the direction of the black arrows shown in FIG. 24. This brings about a pressure distribution such as is shown in Pr(+) in FIG. 25 between the radial bearing portion and the thrust bearing portion. A characteristic of such a pressure distribution is that there are no low-pressure parts in the bearing portion clearances. Therefore, air bubbles 15 trapped in the lubricating oil 6 are expelled smoothly from the clearance between the external peripheral surface of the flange 53 and the opposite surface of the sleeve 51 to the outside. As a result, the oil film in the bearing portion clearances can be prevented from breaking, and there therefore is no need for concern over the bearing portions being worn down.

The thrust hydrodynamic groove 53A was described as having a spiral pattern, but may also have an asymmetrical herringbone pattern.

Embodiments 1 through 10 of the present invention were described above in sequence, and the following is a description of the relationship between these Embodiments and the flow channel images in FIGS. 2 through 5.

In FIG. 2, while the hydrodynamic bearing type rotary device is rotating, the radial hydrodynamic groove 1B pressurizes oil towards the thrust hydrodynamic groove 3B and pumps in the oil in the direction in which the oil flows. The Embodiment in FIG. 6 corresponds to this type of device.

In FIG. 3, the hydrodynamic bearing type rotary device is designed so that while the device is rotating, the radial hydrodynamic groove 1B and the thrust hydrodynamic groove pump in oil in directions that push against each other, and the radial hydrodynamic groove 1B pressurizes oil towards the thrust hydrodynamic groove 3B to increase the force of oil flow. The Embodiments in FIGS. 8, 16, and 24 correspond to this type of device.

In FIG. 4, while the hydrodynamic bearing type rotary device is rotating, the thrust hydrodynamic groove 3B feeds oil in towards the radial hydrodynamic groove 1B, and the Embodiments in FIGS. 10, 14, 18, and 22 correspond to this type of device.

In FIG. 5, the hydrodynamic bearing type rotary device is designed so that while the device is rotating, the thrust hydrodynamic groove 3B and the radial hydrodynamic groove 1B pump in oil in directions that push against each other, and the thrust hydrodynamic groove 3B feeds oil in towards the radial hydrodynamic groove 1B to increase the force of oil flow. The Embodiments in FIGS. 12 and 20 correspond to this type of device.

Embodiment 11

FIGS. 38 through 41 describe the capillary pressure function in the Embodiments of the present invention shown in FIGS. 1 through 25, and the range of optimum design of this function in the present invention. In the cross-sectional view of FIG. 1 and also the images showing the circulation channel of lubricating oil (lubricant) shown in FIGS. 2 through 5, r denotes the clearance of the radial bearing portion, S denotes the clearance of the thrust bearing portion, and the cross-sectional shape of the communicating hole 1G is denoted by either the rectangular shape (width U×clearance t) shown in FIG. 44 or the substantially cylindrical shape (diameter dp) shown in FIG. 45. Lubricating oil (lubricant) 6 is retained at least in the clearance r, the clearance S, and the communicating hole 1G.

The present invention is configured so that the values of capillary pressure coefficients (Pr, Pt, Pp) in the clearance r, the clearance S, and the communicating hole 1G satisfy the relationships Pr>Pp and Pt>Pp.

Figure 42:
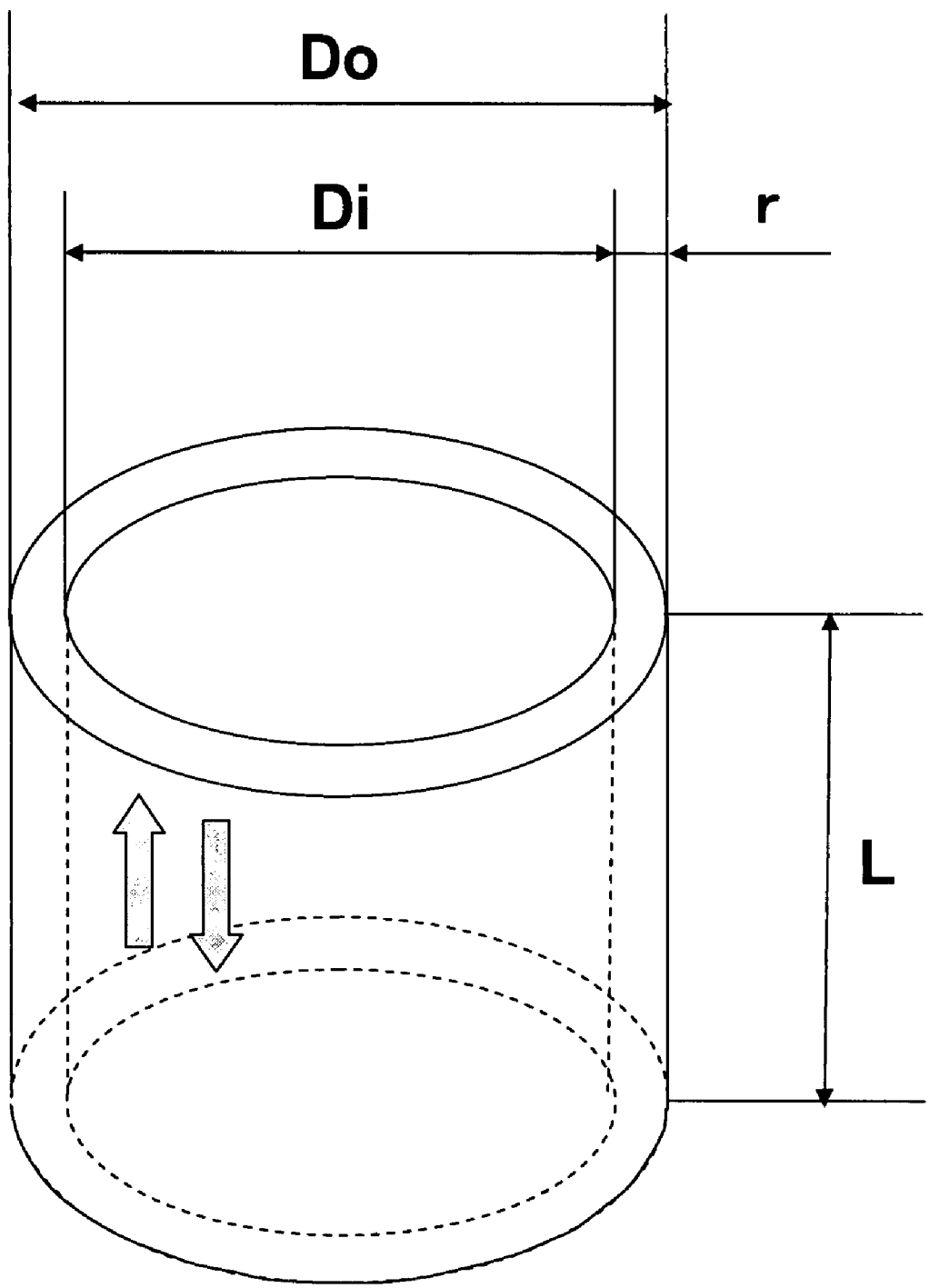
FIG. 42 is a descriptive diagram of the circulation routes in the radial bearing portion of the present invention.

The capillary pressure function Pr is defined by the Equation (6) derived from the following Equations (1) through (5), when the clearance r of the radial bearing portion has a substantially cylindrical shape as shown in FIG. 42.

$$Fro = \pi \times Do \times \gamma \times \cos\theta \quad (1)$$

$$Fri = \pi \times Di \times \gamma \times \cos\theta \quad (2)$$

$$Di = Do - 2 \times r \quad (3)$$

$$Fr = Fro + Fri \quad (4)$$

$$Ar = \pi \times (Do^2 - Di^2)/4 \quad (5)$$

$$Pr = Fr/Ar \quad (6)$$

γ: surface tension of lubricating oil [N/m]
θ: contact angle of lubricating oil [radian]
Do: outside diameter of cylinder [m]
r: oil film thickness (lubricant film thickness) on cylinder [m]
Pr: capillary pressure function [Pa]

Figure 43:
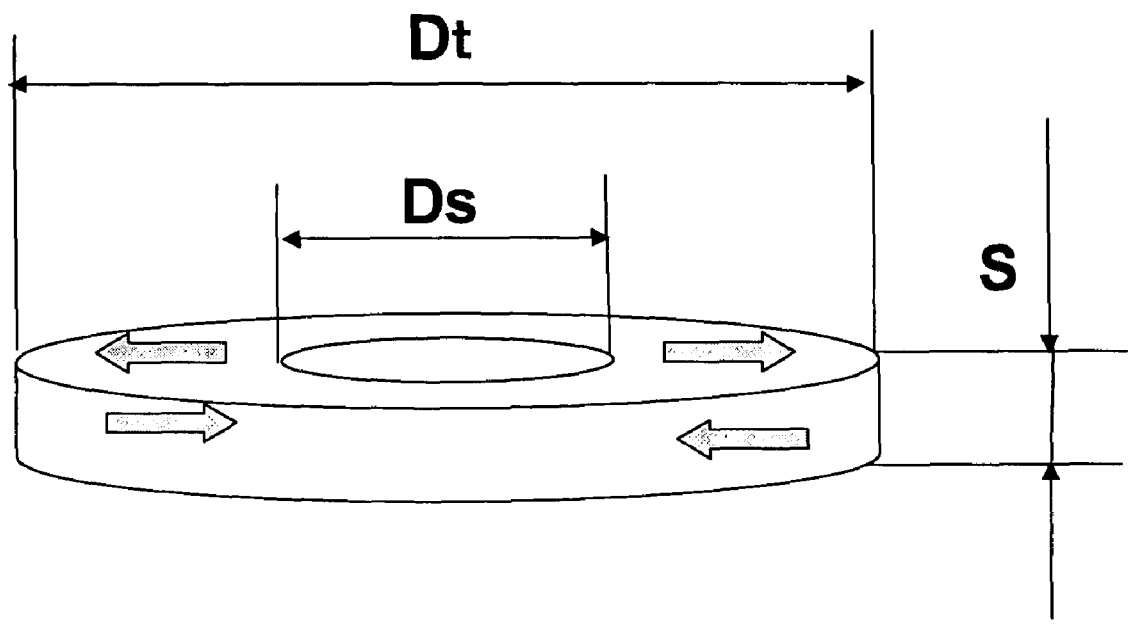
FIG. 43 is a descriptive diagram of the circulation routes in the thrust bearing portion of the present invention.

The capillary pressure function Pr of the clearance S is defined by the Equation (9) derived from the following Equations (7) and (8) when the clearance S of the thrust bearing portion has a substantially thin, round plate shape as shown in FIG. 43.

$$Ft = 2\pi \times Dt \times \gamma \times \cos\theta \quad (7)$$

$$At = \pi \times Dt \times S \quad (8)$$

$$\text{Capillary pressure function: } Pt = Ft/At \quad (9)$$

Dt: outside diameter of thrust bearing portion [m]
S: oil film thickness (lubricant film thickness) in thrust bearing portion (amount of thrust lift) [m]
Pt: capillary pressure function [Pa]

It is assumed herein that the communicating hole 1G has a cross-sectional shape resembling either a rectangle or a cylinder.

Figure 44:
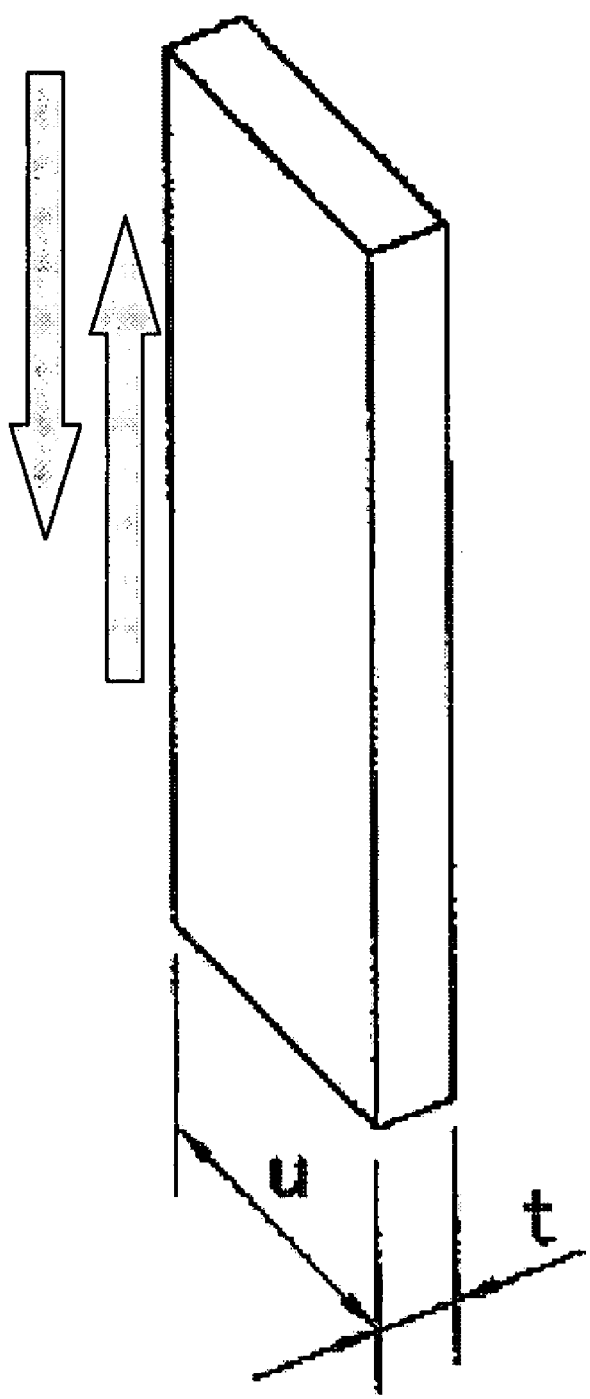
FIG. 44 is a descriptive diagram of the communicating holes in the circulation route of the present invention.

In view of this, the capillary pressure function Pr of the communicating hole 1G is defined by the Equations (12) and (13) derived from the Equations (10) and (11) shown below, when the cross-sectional shape of the communicating hole 1G is substantially rectangular as shown in FIG. 44, or when the cross-sectional shape has, e.g., a D-cut shape with a curve length u and a thickness t.

$$Fp1 = 2 \times (u+t) \times \gamma \times \cos\theta \quad (10)$$

$$Ap1 = u \times t \quad (11)$$

$$\text{Capillary pressure function: } Pp1 = Fp1/Ap1 \quad (12)$$

$$= 2 \times \gamma \times \cos\theta \times (u+t)/(u \times t) \quad (13)$$

u: Width of cross section (length of curve) [m]
t: Opposite end dimension of cross section (thickness) [m]
Pp1: Capillary pressure function [Pa]

Figure 45:
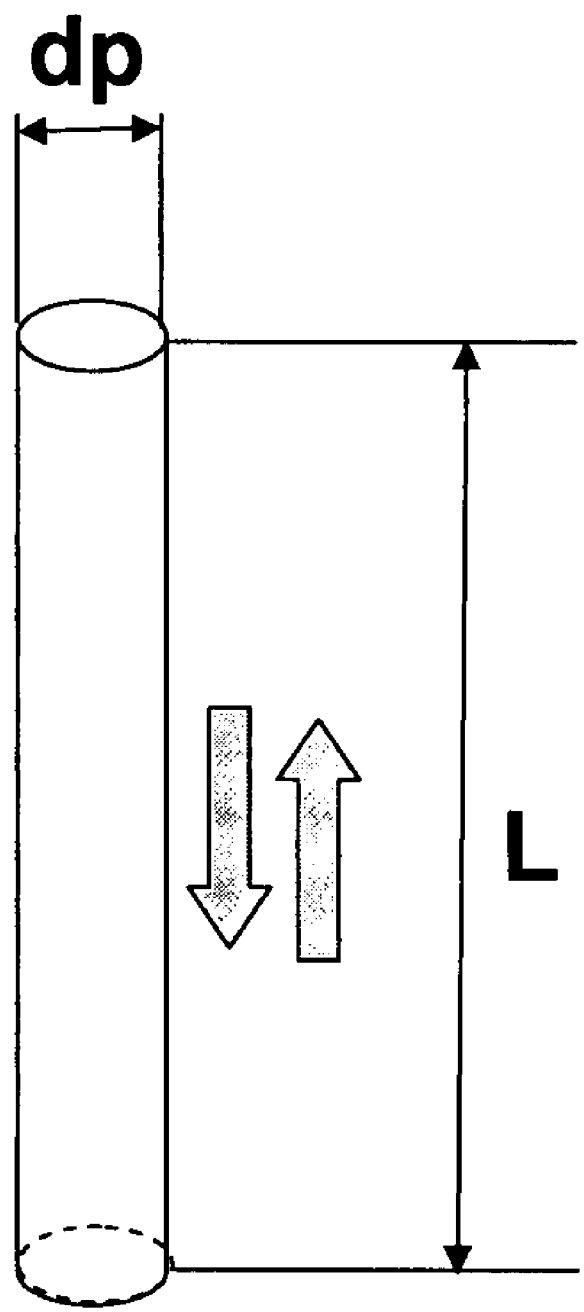
FIG. 45 is a descriptive diagram of the communicating holes in the circulation route of the present invention.

The capillary pressure function Pr of the communicating hole 1G is defined by the Equations (16) and (17) derived from the Equations (14) and (15) shown below, when the cross-sectional shape of the communicating hole 1G is a substantially cylindrical hole as shown in FIG. 45.

$$Fp2 = \pi \times dp \times \gamma \times \cos\theta \quad (14)$$

$$Ap2 = \pi \times dp^2/4 \quad (15)$$

$$\text{Capillary pressure function: } Pp2 = Fp2/Ap2 \quad (16)$$

$$= 4 \times \gamma \times \cos\theta/dp \quad (17)$$

dp: Inside diameter of communicating hole [m]
Pp2: Capillary pressure function [Pa]

In cases in which one hydrodynamic bearing type rotary device includes a communicating hole 1G having two cross-sectional shapes, the device is designed so that the values of the capillary pressure functions satisfy the relationships Pr>Pp, Pt>Pp1, and Pt>Pp2.

The phenomenon of trapping and expulsion of air 15 was observed in the conventional hydrodynamic bearing type rotary device shown in FIG. 26. As a result, in cases in which the communicating hole 21G' was too thin, the air 15 was observed to have a tendency to collect in the clearance r, the clearance S, or between these two clearances. However, the expulsion of air in the clearances cannot be described only in terms of the size of the clearance dimensions, and it was difficult to estimate the likelihood of the air 15 being expelled or of the air 15 being retained in the interior. The hydrodynamic groove patterns or the direction in which pressure is created must be stipulated in order to expel the air 15 more accurately, but the conditions for expelling the air have not been understood numerically. Therefore, conventional hydrodynamic bearing type rotary devices have not had optimum designs.

Figure 38:
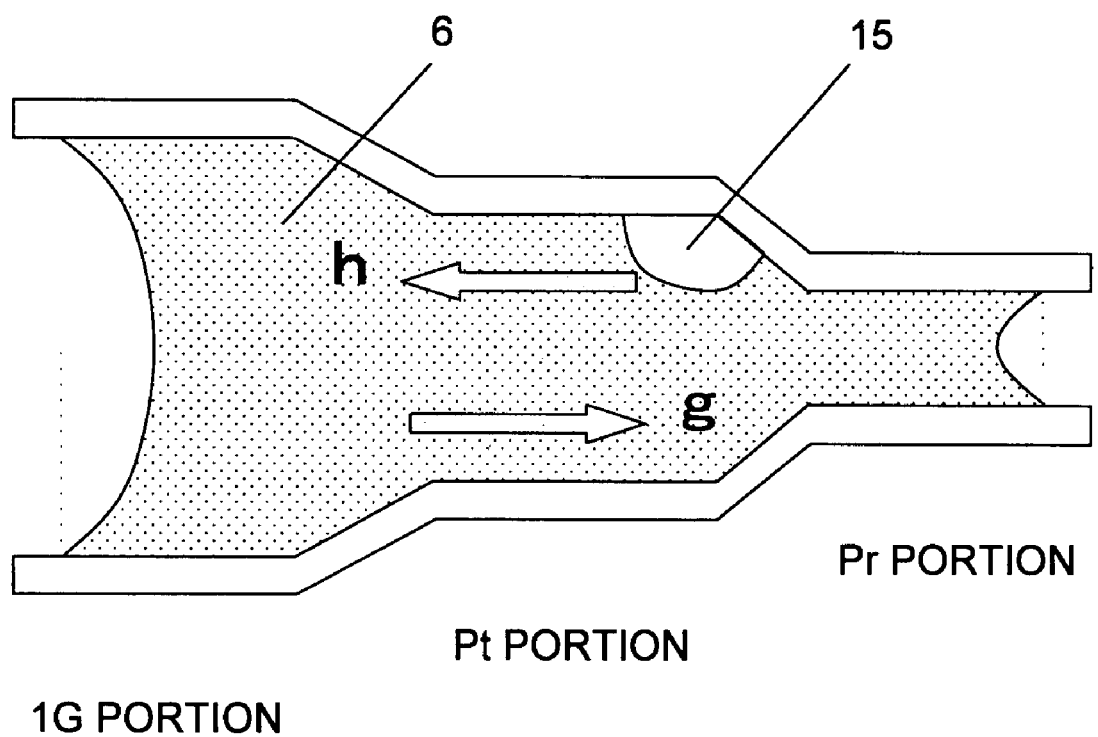
FIG. 38 is a descriptive diagram of the clearances in the circulation routes in the present invention.
Figure 39:
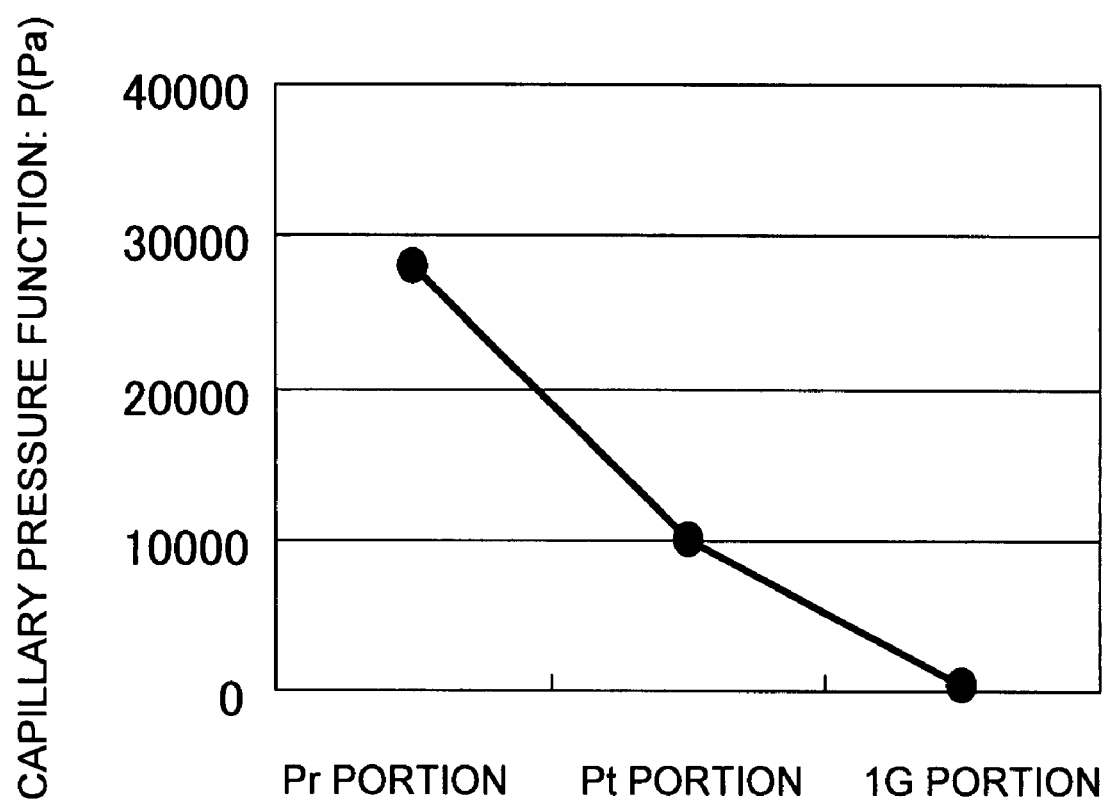
FIG. 39 is a descriptive diagram of the capillary pressure differences in the circulation routes in the present invention.

According to the present invention, the relationship of the sizes of capillary pressure in the clearance r of the radial bearing portion, the clearance S of the thrust bearing portion, and the communicating hole 1G is such that the pressure in the communicating hole 1G is sufficiently less than in the clearance r of the radial bearing portion and the clearance S of the thrust bearing portion, as shown in FIGS. 38 and 39. Therefore, the intention is for lubricating oil 6 to move to Pr (bearing interior), and the lubricating oil is less likely to leak out from the clearance r or the clearance S. Furthermore, air bubbles 15 are not retained in the interior, but instead are easily expelled through the communicating hole 1G to the outside.

Specifically, observational experiments have made it clear that as a result of configuring the device so that the values of the capillary pressure functions (Pr, Pt, and Pp described above) in the clearance r, the clearance S, and the communicating hole 1G satisfy the relationships Pr>Pp and Pt>Pp, lubricating oil 6 containing air that flows into the bearings is expelled the most smoothly through nearby openings via the communicating hole 1G.

Figure 40:
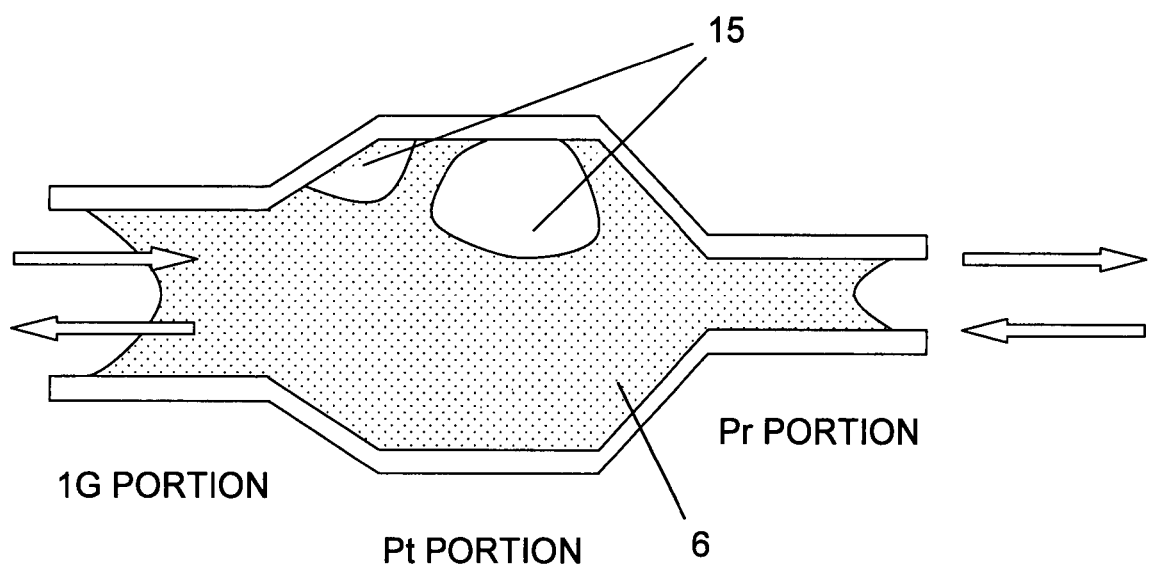
FIG. 40 is a descriptive diagram of the clearances in the circulation routes in the present invention.
Figure 41:
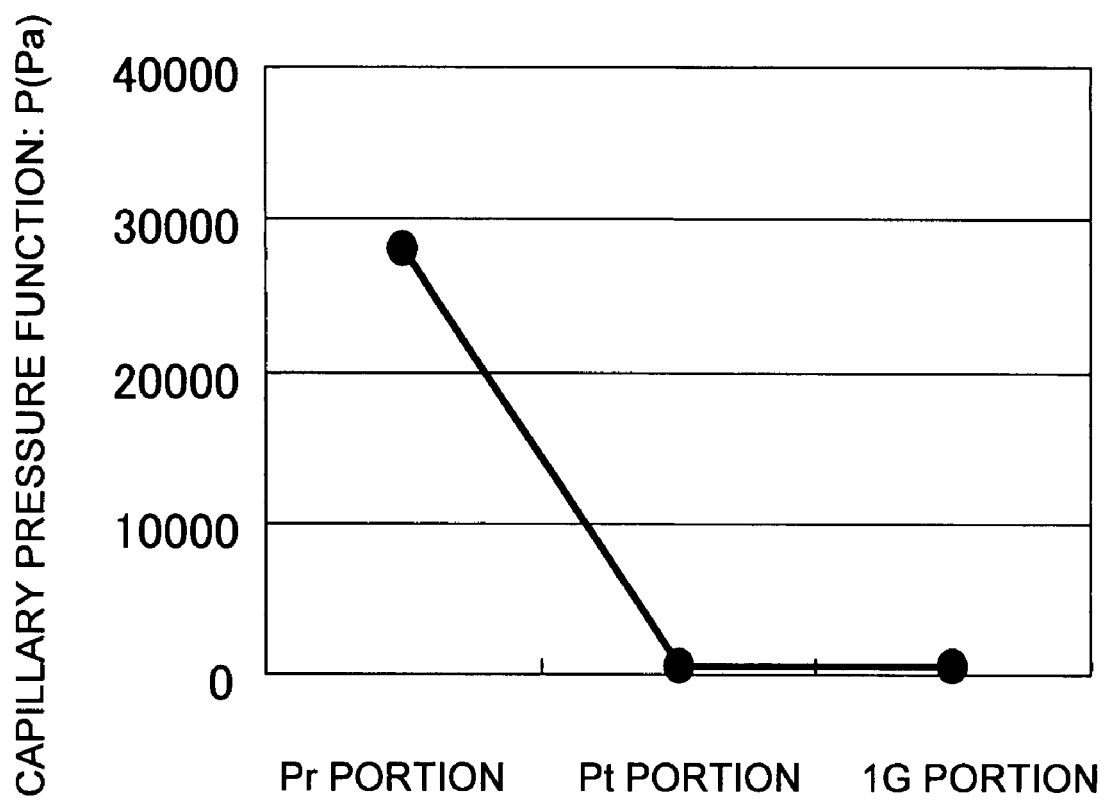
FIG. 41 is a descriptive diagram of the capillary pressure differences in the circulation routes in the present invention.

For the hydrodynamic bearing type rotary device in FIG. 26, FIG. 40 is an image showing the circulation channel for lubricating oil, and FIG. 41 shows the values of the capillary pressure functions. It is thereby possible to confirm through observation that in a conventional hydrodynamic bearing type rotary device, air bubbles 15 accumulate in the bearing portion clearances and are difficult to expel. Air is smoothly expelled and the bearing portion clearances are filled satisfactorily with lubricating oil 6 as a result of maintaining an appropriate difference in capillary pressure between the clearance portions as described above, and furthermore as a result of establishing a size relationship between the capillary pressure functions of the communicating hole 1G and the clearances. Air bubble expulsion can be facilitated not merely by stipulating the size relationship between the dimensions of the bearing portion clearances, but also by stipulating the values of the capillary pressure functions of the bearing portion clearances.

Shown below are specifically adapted case examples of the values of the capillary pressure functions (Pr, Pt, and Pp described above) of the clearance r, the clearance S, and the communicating hole 1G.

| | | | |
|---|---|---|---|
| Oil surface tension | $\gamma$ | N/m | 0.028800 |
| Oil contact angle (on polished glass) | $\theta$ | rad | 0.226900 |
| Equations (1)-(6) | | | |
| Outside diameter of cylinder | Do | m | 0.003000 |
| Oil film thickness in cylinder | rg | m | 0.00000200 |
| | Di | | 0.002996 |
| | Fro | | 0.000264476 |
| | Fri | | 0.000264124 |
| | Fr | | 0.0005286 |
| | Ar | | 1.8837E−08 |
| Function | Pr | Pa | 28061.8 |
| Equations (7)-(9) | | | |
| Outside diameter of thrust bearing portion | Dt | m | 0.004800 |
| Oil film thickness in thrust bearing portion | S | m | 0.00001000 |
| | Ft | | 0.000846324 |
| | At | | 1.50796E−07 |
| Function | Pt | | 5612.4 |
| Equations (10)-(13) | | | |
| Width of cross section | u | m | 0.001200 |
| Clearance of cross section | t | m | 0.00015000 |
| | Fp1 | | 7.57669E−05 |
| | Ap1 | | 0.00000018 |
| Function | Pp1 | Pa | 420.9 |
| Equations (14)-(17) | | | |
| Inside diameter of communicating hole | dp | m | 0.000380 |
| | Fp2 | | 3.35003E−05 |
| | Ap2 | | 1.13411E−07 |
| Function | Pp2 | Pa | 295.4 |

Figure 46:
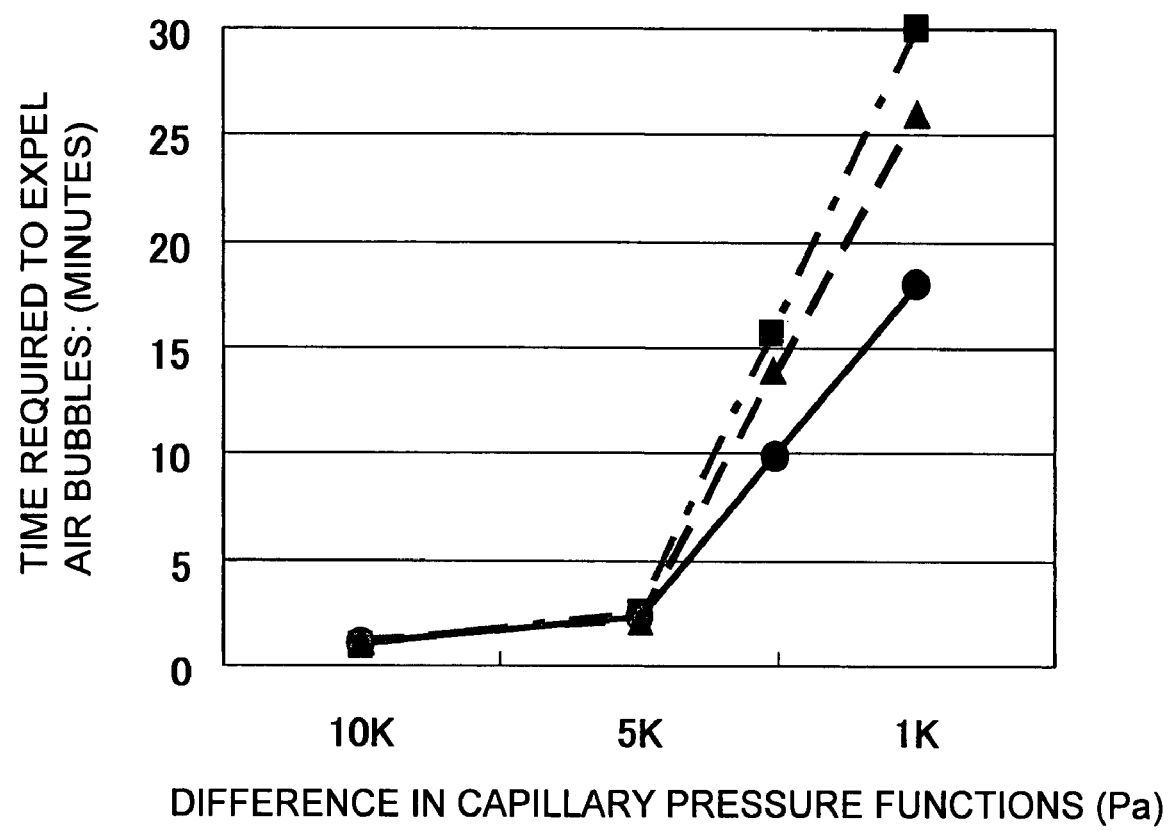
FIG. 46 is a descriptive diagram of the time at which air bubbles are expelled in the present invention.

FIG. 46 shows the results of rotating a hydrodynamic bearing type rotary device after air bubbles are temporarily trapped in the bearing portions, and observing how many minutes are taken for the air bubbles to be expelled from the bearing portion clearances. This observation was conducted with prototypes (three) designed so that the pressure differences (Pr−Pp) between the capillary pressure functions shown in FIG. 39 in the Embodiment of the present invention in FIG. 1 were 10000 (10 k), 5000 (5 k), and 1000 (1 k).

It was possible to confirm from these results that a satisfactory hydrodynamic bearing type rotary device is obtained in which air bubbles in the bearing portions are quickly expelled within approximately three minutes and do not remain in the interior, as a result of designing the dimensions of the bearing portions so that the pressure difference (Pr−Pp) between the capillary pressure functions Pr, Pt, and Pp defined in the Equations (1) through (17) is 5000 or greater.

In the present invention, the sleeve 1 is configured from pure iron, stainless steel, a copper alloy, or the like. The shaft 2 is configured from stainless steel, high-manganese chrome steel, or the like, and the diameter thereof is 2 to 5 mm. A low-viscosity ester-based oil is used for the lubricating oil 6. The rotational speed is 3600 to 15000 rotations per minute.

In FIGS. 6, 8, 22, and 24, one communicating hole 1G and 51G is provided, but the results are the same if a plurality of communicating holes 1G are provided.

In the Equations (1) through (17), the surface tension ($\gamma$) of the lubricating oil 6 is measured using a method typically referred to as the ring method. The angle of contact ($\theta$) of the lubricating oil 6 was typically determined using a method in which 0.5 mL of lubricating oil 6 was spread gently over a polished glass plate, and the diameter and height thereof were measured using a microscope.

Figure 37:
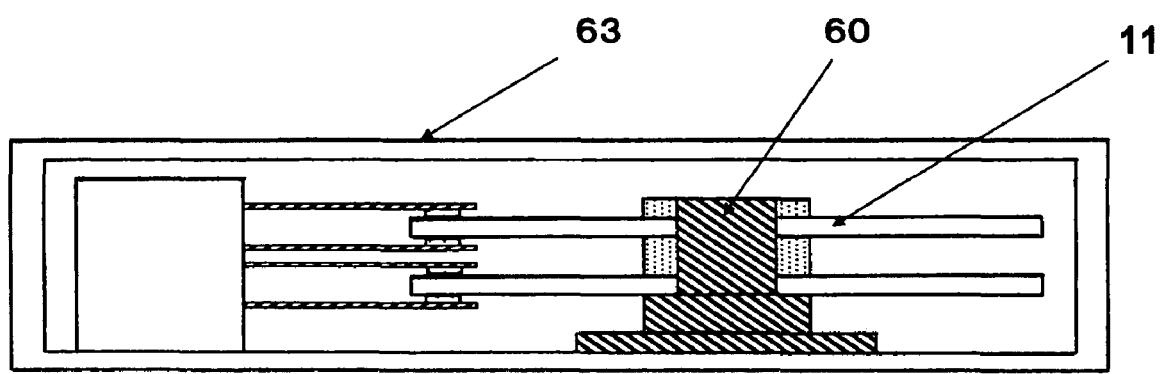
FIG. 37 is a cross-sectional view of a recording and reproducing apparatus having a hydrodynamic bearing type rotary device.

As a result of applying the hydrodynamic bearing type rotary device 60 described above to a hard disk device, optical disk device, or other typical recording and reproducing apparatus 63 as shown in FIG. 37, not only is rotation performance satisfactory and reliable due to no air bubbles collecting in the bearing portions and no oil film deficiencies in the bearing portion clearances, but the lubricating oil 6 is satisfactorily maintained in the bearing portion clearances, whereby the formation of gas known as oil mist can be prevented and the reliability of recording and playback can be improved.

Air is completely expelled after, e.g., about two minutes rotation, even if air gets trapped in during the manufacturing step of pouring lubricating oil 6 into the clearances of the fluid bearings, and even in cases in which the oil operation is unreliable and air is inside the bearings. Therefore, new and valid effects are obtained in cases of large-scale production in which high-performance rotation is achieved, and extremely favorable merits in terms of a recording and reproducing apparatus can be obtained.

INDUSTRIAL APPLICABILITY

Radial hydrodynamic grooves and thrust hydrodynamic grooves form communicating channels; have communicating holes designed to communicate the groove end of the radial hydrodynamic groove on the side opposite the thrust hydrodynamic grooves with the groove end of the thrust hydrodynamic groove on the side opposite the radial hydrodynamic grooves; have a circulation route composed of the communicating hole, the radial hydrodynamic groove, and the thrust hydrodynamic groove; and circulate lubricating oil by a pump force of the hydrodynamic groove. According to The hydrodynamic bearing type rotary device of the present invention, it is possible to attain a long-lasting hydrodynamic bearing type rotary device in which lubricating oil is circulated by pressure applied by a hydrodynamic groove positioned upstream to a bearing portion, ceasing the formation of low-pressure parts from the bearing portion, preventing the accumulation of air bubbles, and thereby preventing the occurrence of oil film breakage at the radial hydrodynamic groove and the thrust hydrodynamic groove.

What is claimed is:

1. A hydrodynamic bearing type rotary device, comprising:
  a shaft;
  a sleeve having a bearing hole in which the shaft is relative-rotatably inserted with a clearance;
  a hub attached to one of the sleeve and the shaft, said one of the sleeve and the shaft being a rotating member;
  a radial bearing portion having a radial hydrodynamic groove formed in at least one of an external peripheral surface of the shaft and an internal peripheral surface of the sleeve;
  a thrust bearing portion having a thrust hydrodynamic groove formed with at least one of a surface of the sleeve opposite the hub and a surface of the hub opposite the sleeve, or with at least one of a surface of the sleeve opposite the shaft and a surface of the shaft opposite the sleeve;
  a communicating hole allowing fluid communication between a groove end of the radial hydrodynamic groove on a side opposite the thrust hydrodynamic groove and a groove end of the thrust hydrodynamic groove on a side opposite the radial hydrodynamic groove, a cross section of the communicating hole being a substantially rectangular shape or a D-cut shape; and
  lubricant for filling the radial bearing portion, the thrust bearing portion, and the communicating hole;
  wherein the groove pattern of at least one of the radial hydrodynamic groove and the thrust hydrodynamic groove creates a conveying force for conveying the lubricant from the thrust bearing portion to the radial bearing portion or from the radial bearing portion to the thrust bearing portion, and is formed in such a manner that the magnitude of the conveying force created in the radial hydrodynamic groove and the magnitude of the conveying force created in the thrust hydrodynamic groove differ; and
  wherein the relationships Pr>Pp1 and Pt>Pp1 are satisfied, where Pr is a capillary pressure function at the clearance of the radial bearing portion, Pt is a capillary pressure function at the clearance of the thrust bearing portion, and Pp1 is a capillary pressure function at the communicating hole, and Pr, Pt, and Pp1 are defined as follows:

$$Pr = (\pi \times Do \times \gamma \times \cos\theta + \pi \times Di \times \gamma \times \cos\theta)/(\pi \times (Do^2 - Di^2)/4)$$

Pr: capillary pressure function at the clearance of the radial bearing portion [Pa]
γ: surface tension of lubricant [N/m]
θ: contact angle of lubricant [radians]
Do: outside diameter of cylinder [m]

$$Di = Do - 2 \times r$$

r: lubricant film thickness on cylinder [m]

$$Pt = 2\pi \times Dt \times \gamma \times \cos\theta/(\pi \times Dt \times S)$$

Pt: capillary pressure function at the clearance of the thrust bearing portion [Pa]
Dt: outside diameter of thrust bearing portion [m]
S: lubricant film thickness in thrust bearing portion $$Pp1 = (2 \times (u+t) \times \gamma \times \cos\theta)/(u \times t)$$

$$= 2 \times \gamma \times \cos\theta \times (u+t)/(u \times t)$$

Pp1: capillary pressure function at the communicating hole [Pa]
u: width of cross section [m]
t: opposite end dimension of cross section [m].

2. The hydrodynamic bearing type rotary device according to claim 1, wherein the capillary pressure function Pr at the radial bearing portion clearance and the capillary pressure function Pp1 at the communicating hole satisfy the relationship Pr−Pp1>5000.

3. The hydrodynamic bearing type rotary device according to claim 1, wherein the shaft is configured integrally with a substantially disc-shaped flange portion of a wider diameter than the shaft at the closed end of the sleeve; and
  wherein the thrust hydrodynamic groove is formed on at least one of the surface of the sleeve opposite the flange and the surface of the flange opposite the sleeve.

4. A recording and reproducing apparatus, comprising the hydrodynamic bearing type rotary device of claim 1.

5. A hydrodynamic bearing type rotary device, comprising:
  a shaft;
  a sleeve having a bearing hole in which the shaft is relative-rotatably inserted with a clearance;
  a hub attached to one of the sleeve and the shaft, said one of the sleeve and the shaft being a rotating member;
  a radial bearing portion having a radial hydrodynamic groove formed in at least one of an external peripheral surface of the shaft and an internal peripheral surface of the sleeve;
  a thrust bearing portion having a thrust hydrodynamic groove formed with at least one of a surface of the sleeve opposite the hub and a surface of the hub opposite the sleeve, or with at least one of a surface of the sleeve opposite the shaft and a surface of the shaft opposite the sleeve;

a communicating hole allowing fluid communication between a groove end of the radial hydrodynamic groove on a side opposite the thrust hydrodynamic groove and a groove end of the thrust hydrodynamic groove on a side opposite the radial hydrodynamic groove, a cross section of the communicating hole being a substantially round shape; and lubricant for filling the radial bearing portion, the thrust bearing portion, and the communicating hole;

wherein the groove pattern of at least one of the radial hydrodynamic groove and the thrust hydrodynamic groove creates a conveying force for conveying the lubricant from the thrust bearing portion to the radial bearing portion or from the radial bearing portion to the thrust bearing portion, and is formed in such a manner that the magnitude of the conveying force created in the radial hydrodynamic groove and the magnitude of the conveying force created in the thrust hydrodynamic groove differ; and wherein the relationships Pr>Pp2 and Pt>Pp2 are satisfied, where Pr is a capillary pressure function at the clearance of the radial bearing portion, Pt is a capillary pressure function at the clearance of the thrust bearing portion, and Pp2 is a capillary pressure function at the communicating hole, and Pr, Pt, and Pp2 are defined as follows:

$$Pr = (\pi \times Do \times \gamma \times \cos\theta + \pi \times Di \times \gamma \times \cos\theta)/(\pi \times (Do^2 - Di^2)/4)$$

Pr: capillary pressure function at the clearance of the radial bearing portion [Pa]

γ: surface tension of lubricant [N/m]

θ: contact angle of lubricant [radians]

Do: outside diameter of cylinder [m]

$$Di = Do - 2 \times r$$

r: lubricant film thickness on cylinder [m]

$$Pt = 2\pi \times Dt \times \gamma \times \cos\theta/(\pi \times Dt \times S)$$

Pt: capillary pressure function at the clearance of the thrust bearing portion [Pa]

Dt: outside diameter of thrust bearing portion [m]

S: lubricant film thickness in thrust bearing portion $$Pp2 = \pi \times dp \times \gamma \times \cos\theta/(\pi \times dp^2/4) =$$

$$= 4 \times \gamma \times \cos\theta/dp$$

Pp2: capillary pressure function at the communicating hole [Pa]

dp: Inside diameter of communicating hole [m].

6. The hydrodynamic bearing type rotary device according to claim 5, wherein the capillary pressure function Pr at the radial bearing portion clearance and the capillary pressure function Pp2 at the communicating hole satisfy the relationship Pr−Pp2>5000.

7. The hydrodynamic bearing type rotary device according to claim 5, wherein the shaft is configured integrally with a substantially disc-shaped flange portion of a wider diameter than the shaft at the closed end of the sleeve; and wherein the thrust hydrodynamic groove is formed on at least one of the surface of the sleeve opposite the flange and the surface of the flange opposite the sleeve.

8. A recording and reproducing apparatus, comprising the hydrodynamic bearing type rotary device of claim 5.

* * * * *